United States Patent
Flynn et al.

(10) Patent No.: US 7,296,006 B2
(45) Date of Patent: Nov. 13, 2007

(54) METHOD OF INFERRING ROTORCRAFT GROSS WEIGHT

(75) Inventors: Timothy D. Flynn, Vergennes, VT (US); Robert Alan Hess, Vergennes, VT (US); Barbara Noble, Shelburne, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 367 days.

(21) Appl. No.: 10/779,365

(22) Filed: Feb. 13, 2004

(65) Prior Publication Data

US 2004/0193386 A1    Sep. 30, 2004

Related U.S. Application Data

(63) Continuation-in-part of application No. 10/631,934, filed on Jul. 31, 2003, now Pat. No. 7,203,716.

(60) Provisional application No. 60/453,113, filed on Mar. 7, 2003, provisional application No. 60/449,182, filed on Feb. 21, 2003, provisional application No. 60/429,053, filed on Nov. 25, 2002.

(51) Int. Cl.
*G06F 15/18* (2006.01)
*G06J 1/00* (2006.01)
*G06N 3/00* (2006.01)

(52) U.S. Cl. .............................. 706/37; 706/15; 706/16

(58) Field of Classification Search ................... 706/37, 706/15, 16; 702/173
See application file for complete search history.

(56) References Cited

U.S. PATENT DOCUMENTS

| | | | | |
|---|---|---|---|---|
| 5,606,505 | A | * | 2/1997 | Smith et al. ................... 701/99 |
| 5,751,609 | A | | 5/1998 | Schaefer, Jr. et al. |
| 5,890,101 | A | | 3/1999 | Schaefer, Jr. et al. |
| 5,901,272 | A | | 5/1999 | Schaefer, Jr. et al. |
| 5,987,397 | A | * | 11/1999 | McCool et al. ............. 702/173 |
| 6,332,105 | B1 | * | 12/2001 | Calise et al. ................... 701/3 |
| 6,466,888 | B1 | * | 10/2002 | McCool et al. ............. 702/144 |
| 6,473,746 | B1 | | 10/2002 | Zakrzewski |

OTHER PUBLICATIONS

M. Idan et al, In-Flight Weight and Balance Identification Using Neural Networkd, Aug. 2003, Israel Institute of Technology, AIAA-2003-5787, p. 1 only.*
Robert J. Mack, A Rapid Empirical Method for Estimating the Gross Takeoff Weight of a High Speed Civil Transport, Dec. 1999, NASA, TM-1999-209535, 1-15.*

(Continued)

*Primary Examiner*—Joseph P Hirl
(74) *Attorney, Agent, or Firm*—Muirhead and Saturnelli, LLC

(57) ABSTRACT

Described are systems and methods for determining the gross weight of an aircraft. A flight regime is determined based on one or more inputs. A neural net is selected based on a flight regime. The neural net inputs may include derived values. A first estimate of the gross weight is produced by the selected neural net. The first estimate is used, along with other inputs, with a Kalman filter to produce a final gross weight estimate. The Kalman filter blends or fuses together its inputs to produce the final gross weight estimate.

104 Claims, 33 Drawing Sheets

OTHER PUBLICATIONS

Kishan Mehrotra et al, Elements of Artificial Neural Networks, MIT, 1997, Cover and title page only.*

Miguel A. Morales et al, Feasibility of Aircraft Gross Weight Estimation Using Artificial Neural Networks, May 2001, American Helicopter Society 57th Annual Forum.*

Marcello R. Napolitano et al, Kalman Filters and Neural-Network Schemes for Sensor Validation in Flight Control Systems, IEEE, 1998, 596-611.*

John G. Moffatt, Helicopter Gross Weight Determination from Monitored Parameters, Mar. 1996, U.S. Army Aviation and Troop Command, 1-26.*

Flight State Recognition with Neural Networks—A Step to an Overall Usage Monitoring System by E. Brand and B. Krumme, Eurocopter Deutschland, GMBH, Munchen, Germany.

Virtual Sensors—A Real-Time Neural Network-Based Intelligent Performance and Emissions Prediction System for On-Board Diagnostics and Engine Control by Chris Atkinson and Mike Traver, West Virginia University and Theresa Long and Emil Hanzevack, NeuroDyne, Inc.

Helicopter Gross Weight Determination from Monitored Parameters by John G. Moffatt, prepared for Aviation Applied Technology Directorate, U.S. Army Aviation and Troop Command, Fort Eustis, VA, Mar. 1996.

MH-47E Structural Usage Monitoring System (SUMS) Fleet Demonstration Results by Eric Robeson, presented at the American Helicopter Society 56th Annual Forum, Virginia Beach, VA, May 2-4, 2000.

The IMD HUMS as a Toll for Rotorcraft Health Management and Diagnostics by Robert Hess, Alan Duke and David Kogut, BFGoodrich Aerospace Fuel and Utility Systems, Vergennes, VT ©2001 IEEE.

Voronoi Diagrams—A Survey of a Fundamental Geometric Data Structure by Franz Aurenhammer, ACM Computing Surveys, vol. 23, No. 3, Sep. 1991.

Neural Network Development Foundations for Low Airspeed Prediction by Miguel A. Morales, Computer Sciences Corporation, © 1999 IEEE.

Feasibility of Aircraft Gross Weight Estimation Using Artificial Neural Network by Miguel A. Morales and David J. Hass, presented at the American Helicopter Society 57th Annual Forum, Washington, DC, May 9-11, 2001.

Adaptive Filter Theory, Simon Haykin, Prentice Hall Information and System Sciences Series, 2nd Edition, "Maximum-Likelihood Estimation", pp. 791-794.

Applied Optimal Estimation, Arthur Gelb, MIT Press, 1974, "Optimal Linear Filtering", pp. 106-111.

* cited by examiner

Regime— Steady State Hover

| Maneuver Name | Hover | | |
|---|---|---|---|
| Category | Steady State | | |
| Type | Specific | | |
| Parameter | Operator | Threshold | Hysteresis |
| Landing Flag | = | False | None |
| Takeoff Flag | = | False | None |
| WOW | = | False | None |
| Yaw Rate | <= | 2.5 | None |
| Yaw Rate | >= | -2.5 | None |
| Rate of Climb | >= | -200 | None |
| Rate of Climb | <= | 200 | None |
| Pitch Attitude | < | 10 | None |
| Roll Attitude | <= | 3 | None |
| Roll Attitude | >= | -6 | None |
| Drift Velocity | >= | -7 | None |
| Drift Velocity | <= | 7 | None |
| Ground Speed | >= | -7 | None |
| Ground Speed | <= | 7 | None |
| Calibrated Airspeed | <= | 38 | 5 |
| Control Reversal Flag | = | 0 | None |

FIGURE 14

Regime— Steady State Forward Flight

| Maneuver Name | Forward Flight | | |
|---|---|---|---|
| Category | Steady State | | |
| Type | Specific | | |
| Parameter | Operator | Threshold | Hysteresis |
| Landing Flag | = | False | None |
| Takeoff Flag | = | False | None |
| WOW | = | False | None |
| Roll Attitude | >= | -10 | None |
| Roll Attitude | <= | 10 | None |
| Rate of Climb | >= | -500 | None |
| Rate of Climb | <= | 500 | None |
| Sideslip | <= | .05 | None |
| Sideslip | >= | -.05 | None |
| Pitch Attitude | <= | 10 | None |
| Pitch Attitude | >= | -10 | None |
| Yaw Rate | >= | -5 | None |
| Yaw Rate | <= | 5 | None |
| Calibrated Airspeed | > | 38 | 5 |
| Control Reversal Flag | = | 0 | None |

Regime - Turn

| Maneuver Name | Turn | | |
|---|---|---|---|
| Category | Transient | | |
| Parameter | Operator | Threshold | Hysteresis |
| Landing Flag | = | False | None |
| Takeoff Flag | = | False | None |
| WOW | = | False | None |
| Roll Attitude | < | -10 | 3 |
| *Roll Attitude | > | 10 | 3 |
| Rate of Climb | >= | -500 | None |
| Rate of Climb | <= | 500 | None |
| Calibrated Airspeed | > | 38 | 2 |

Regime 1 - Level Flight, up to 0.2 $V_H$

Description: Straight and level flight at close to 1.0 G conditions, airspeed less than 0.2 $V_H$

| Maneuver Name | Level Flight, 0.2 $V_H$ | | |
|---|---|---|---|
| Category | Steady State | | |
| Type | Specific | | |
| Parameter | Operator | Threshold | Hysteresis |
| Landing Flag | = | False | None |
| Takeoff Flag | = | False | None |
| WOW | = | False | None |
| Roll Attitude | >= | -10 | None |
| Roll Attitude | <= | 10 | None |
| Rate of Climb | >= | -500 | None |
| Rate of Climb | <= | 500 | None |
| Sideslip | <= | .05 | None |
| Sideslip | >= | -.05 | None |
| Pitch Attitude | <= | 10 | None |
| Pitch Attitude | >= | -10 | None |
| Yaw Rate | >= | -5 | None |
| Yaw Rate | <= | 5 | None |
| VH Fraction | <= | 0.2 | 0.01 |
| Corrected Load Factor | >= | 0.85 | None |
| Corrected Load Factor | <= | 1.18 | None |
| Calibrated Airspeed | > | 38 | 5 |
| Control Reversal Flag | = | 0 | None |

FIGURE 18

Regime 2 - Level Flight, 0.4 $V_H$

Description: Straight and level flight at close to 1.0 G conditions, airspeed from 0.2 $V_H$ to 0.4 $V_{H'}$

| Maneuver Name | Level Flight, 0.4 $V_H$ | | |
|---|---|---|---|
| Category | Steady State | | |
| Type | Specific | | |
| Parameter | Operator | Threshold | Hysteresis |
| Landing Flag | = | False | None |
| Takeoff Flag | = | False | None |
| WOW | = | False | None |
| Roll Attitude | >= | -10 | None |
| Roll Attitude | <= | 10 | None |
| Rate of Climb | >= | -500 | None |
| Rate of Climb | <= | 500 | None |
| Sideslip | <= | .05 | None |
| Sideslip | >= | -.05 | None |
| Pitch Attitude | <= | 10 | None |
| Pitch Attitude | >= | -10 | None |
| Yaw Rate | >= | -5 | None |
| Yaw Rate | <= | 5 | None |
| VH Fraction | > | 0.2 | 0.01 |
| VH Fraction | <= | 0.4 | 0.01 |
| Corrected Load Factor | >= | 0.85 | None |
| Corrected Load Factor | <= | 1.18 | None |
| Calibrated Airspeed | > | 38 | 5 |
| Control Reversal Flag | = | 0 | None |

FIGURE 19

Regime 3 - Level Flight, 0.5 $V_H$

Description: Straight and level flight at close to 1.0 G conditions, airspeed from 0.4 $V_H$ to 0.5 $V_H$.

| Maneuver Name | Level Flight, 0.5 $V_H$ | | |
|---|---|---|---|
| Category | Steady State | | |
| Type | Specific | | |
| Parameter | Operator | Threshold | Hysteresis |
| Landing Flag | = | False | None |
| Takeoff Flag | = | False | None |
| WOW | = | False | None |
| Roll Attitude | >= | -10 | None |
| Roll Attitude | <= | 10 | None |
| Rate of Climb | >= | -500 | None |
| Rate of Climb | <= | 500 | None |
| Sideslip | <= | .05 | None |
| Sideslip | >= | -.05 | None |
| Pitch Attitude | <= | 10 | None |
| Pitch Attitude | >= | -10 | None |
| Yaw Rate | >= | -5 | None |
| Yaw Rate | <= | 5 | None |
| VH Fraction | > | 0.4 | 0.01 |
| VH Fraction | <= | 0.5 | 0.01 |
| Corrected Load Factor | >= | 0.85 | None |
| Corrected Load Factor | <= | 1.18 | None |
| Calibrated Airspeed | > | 38 | 5 |
| Control Reversal Flag | = | 0 | None |

Regime 4 – Level Flight, 0.6 $V_H$

Description: Straight and level flight at close to 1.0 G conditions, airspeed from 0.5 $V_H$ to 0.6 $V_H$.

| Maneuver Name | Level Flight, 0.6 $V_H$ | | |
|---|---|---|---|
| Category | Steady State | | |
| Type | Specific | | |
| Parameter | Operator | Threshold | Hysteresis |
| Landing Flag | = | False | None |
| Takeoff Flag | = | False | None |
| WOW | = | False | None |
| Roll Attitude | >= | -10 | None |
| Roll Attitude | <= | 10 | None |
| Rate of Climb | >= | -500 | None |
| Rate of Climb | <= | 500 | None |
| Sideslip | <= | .05 | None |
| Sideslip | >= | -.05 | None |
| Pitch Attitude | <= | 10 | None |
| Pitch Attitude | >= | -10 | None |
| Yaw Rate | >= | -5 | None |
| Yaw Rate | <= | 5 | None |
| VH Fraction | > | 0.5 | 0.01 |
| VH Fraction | <= | 0.6 | 0.01 |
| Corrected Load Factor | >= | 0.85 | None |
| Corrected Load Factor | <= | 1.18 | None |
| Calibrated Airspeed | > | 38 | 5 |
| Control Reversal Flag | = | 0 | None |

FIGURE 21

Regime 5 - Level Flight, 0.7 $V_H$

Description: Straight and level flight at close to 1.0 G conditions, airspeed from 0.6 $V_H$ to 0.7 $V_H$.

| Maneuver Name | Level Flight, 0.7 $V_H$ | | |
|---|---|---|---|
| Category | Steady State | | |
| Type | Specific | | |
| Parameter | Operator | Threshold | Hysteresis |
| Landing Flag | = | False | None |
| Takeoff Flag | = | False | None |
| WOW | = | False | None |
| Roll Attitude | >= | -10 | None |
| Roll Attitude | <= | 10 | None |
| Rate of Climb | >= | -500 | None |
| Rate of Climb | <= | 500 | None |
| Sideslip | <= | .05 | None |
| Sideslip | >= | -.05 | None |
| Pitch Attitude | <= | 10 | None |
| Pitch Attitude | >= | -10 | None |
| Yaw Rate | >= | -5 | None |
| Yaw Rate | <= | 5 | None |
| VH Fraction | > | 0.6 | 0.01 |
| VH Fraction | <= | 0.7 | 0.01 |
| Corrected Load Factor | >= | 0.85 | None |
| Corrected Load Factor | <= | 1.18 | None |
| Calibrated Airspeed | > | 38 | 5 |
| Control Reversal Flag | = | 0 | None |

FIGURE 22

Regime 6 - Level Flight, 0.8 V$_H$

Description: Straight and level flight at close to 1.0 G conditions, airspeed from 0.7 V$_H$ to 0.8 V$_H$.

| Maneuver Name | Level Flight, 0.8 V$_H$ | | |
|---|---|---|---|
| Category | Steady State | | |
| Type | Specific | | |
| Parameter | Operator | Threshold | Hysteresis |
| Landing Flag | = | False | None |
| Takeoff Flag | = | False | None |
| WOW | = | False | None |
| Roll Attitude | >= | -10 | None |
| Roll Attitude | <= | 10 | None |
| Rate of Climb | >= | -500 | None |
| Rate of Climb | <= | 500 | None |
| Sideslip | <= | .05 | None |
| Sideslip | >= | -.05 | None |
| Pitch Attitude | <= | 10 | None |
| Pitch Attitude | >= | -10 | None |
| Yaw Rate | >= | -5 | None |
| Yaw Rate | <= | 5 | None |
| VH Fraction | > | 0.7 | 0.01 |
| VH Fraction | <= | 0.8 | 0.01 |
| Corrected Load Factor | >= | 0.85 | None |
| Corrected Load Factor | <= | 1.18 | None |
| Calibrated Airspeed | > | 38 | 5 |
| Control Reversal Flag | = | 0 | None |

FIGURE 23

Regime 7 - Level Flight, 0.9 $V_H$

Description: Straight and level flight at close to 1.0 G conditions, airspeed from 0.8 $V_H$ to 0.9 $V_H$.

| Maneuver Name | Level Flight, 0.9 $V_H$ | | |
|---|---|---|---|
| Category | Steady State | | |
| Type | Specific | | |
| Parameter | Operator | Threshold | Hysteresis |
| Landing Flag | = | False | None |
| Takeoff Flag | = | False | None |
| WOW | = | False | None |
| Roll Attitude | >= | -10 | None |
| Roll Attitude | <= | 10 | None |
| Rate of Climb | >= | -500 | None |
| Rate of Climb | <= | 500 | None |
| Sideslip | <= | .05 | None |
| Sideslip | >= | -.05 | None |
| Pitch Attitude | <= | 10 | None |
| Pitch Attitude | >= | -10 | None |
| Yaw Rate | >= | -5 | None |
| Yaw Rate | <= | 5 | None |
| VH Fraction | > | 0.8 | 0.01 |
| VH Fraction | <= | 0.9 | 0.01 |
| Corrected Load Factor | >= | 0.85 | None |
| Corrected Load Factor | <= | 1.18 | None |
| Calibrated Airspeed | > | 38 | 5 |
| Control Reversal Flag | = | 0 | None |

Regime 8 - Level Flight, 1.0 $V_H$

Description: Straight flight at close to 1.0 G conditions, airspeed from 0.9 $V_H$ to 1.0 $V_H$.

| Maneuver Name | Level Flight, 1.0 $V_H$ | | |
|---|---|---|---|
| Category | Steady State | | |
| Type | Specific | | |
| Parameter | Operator | Threshold | Hysteresis |
| Landing Flag | = | False | None |
| Takeoff Flag | = | False | None |
| WOW | = | False | None |
| Roll Attitude | >= | -10 | None |
| Roll Attitude | <= | 10 | None |
| Rate of Climb | >= | -500 | None |
| Rate of Climb | <= | 500 | None |
| Sideslip | <= | .05 | None |
| Sideslip | >= | -.05 | None |
| Pitch Attitude | <= | 10 | None |
| Pitch Attitude | >= | -10 | None |
| Yaw Rate | >= | -5 | None |
| Yaw Rate | <= | 5 | None |
| VH Fraction | > | 0.9 | 0.01 |
| VH Fraction | <= | 1.0 | 0.01 |
| Corrected Load Factor | >= | 0.85 | None |
| Corrected Load Factor | <= | 1.18 | None |
| Calibrated Airspeed | > | 38 | 5 |
| Control Reversal Flag | = | 0 | None |

Regime 9 - Level Flight, 1.15 $V_H$

Description: Straight flight, and in a slight dive, at close to 1.0 G conditions, airspeed from 1.0 $V_H$ to 1.15 $V_H$.

| Maneuver Name | Level Flight, 1.15 $V_H$ | | |
|---|---|---|---|
| Category | Steady State | | |
| Type | Specific | | |
| Parameter | Operator | Threshold | Hysteresis |
| Landing Flag | = | False | None |
| Takeoff Flag | = | False | None |
| WOW | = | False | None |
| Roll Attitude | >= | -10 | None |
| Roll Attitude | <= | 10 | None |
| Rate of Climb | >= | -500 | None |
| Rate of Climb | <= | 500 | None |
| Sideslip | <= | .05 | None |
| Sideslip | >= | -.05 | None |
| Yaw Rate | >= | -5 | None |
| Yaw Rate | <= | 5 | None |
| VH Fraction | > | 1.0 | 0.01 |
| VH Fraction | <= | 1.15 | 0.01 |
| Corrected Load Factor | >= | 0.85 | None |
| Corrected Load Factor | <= | 1.18 | None |
| Calibrated Airspeed | > | 38 | 5 |
| Control Reversal Flag | = | 0 | None |

FIGURE 26

Regime 10 - Level Flight, > 1.15 $V_H$

Description: Straight flight, and in a slight dive, at close to 1.0 G conditions, airspeed greater than 1.15 $V_H$.

| Maneuver Name | Level Flight, > 1.15 $V_H$ | | |
|---|---|---|---|
| Category | Steady State | | |
| Type | Specific | | |
| Parameter | Operator | Threshold | Hysteresis |
| Landing Flag | = | False | None |
| Takeoff Flag | = | False | None |
| WOW | = | False | None |
| Roll Attitude | >= | -10 | None |
| Roll Attitude | <= | 10 | None |
| Rate of Climb | >= | -500 | None |
| Rate of Climb | <= | 500 | None |
| Sideslip | >= | .05 | None |
| Sideslip | <= | -.05 | None |
| Yaw Rate | >= | -5 | None |
| Yaw Rate | <= | 5 | None |
| VH Fraction | > | 1.15 | 0.01 |
| Corrected Load Factor | >= | 0.85 | None |
| Corrected Load Factor | <= | 1.18 | None |
| Calibrated Airspeed | > | 38 | 5 |
| Control Reversal Flag | = | 0 | None |

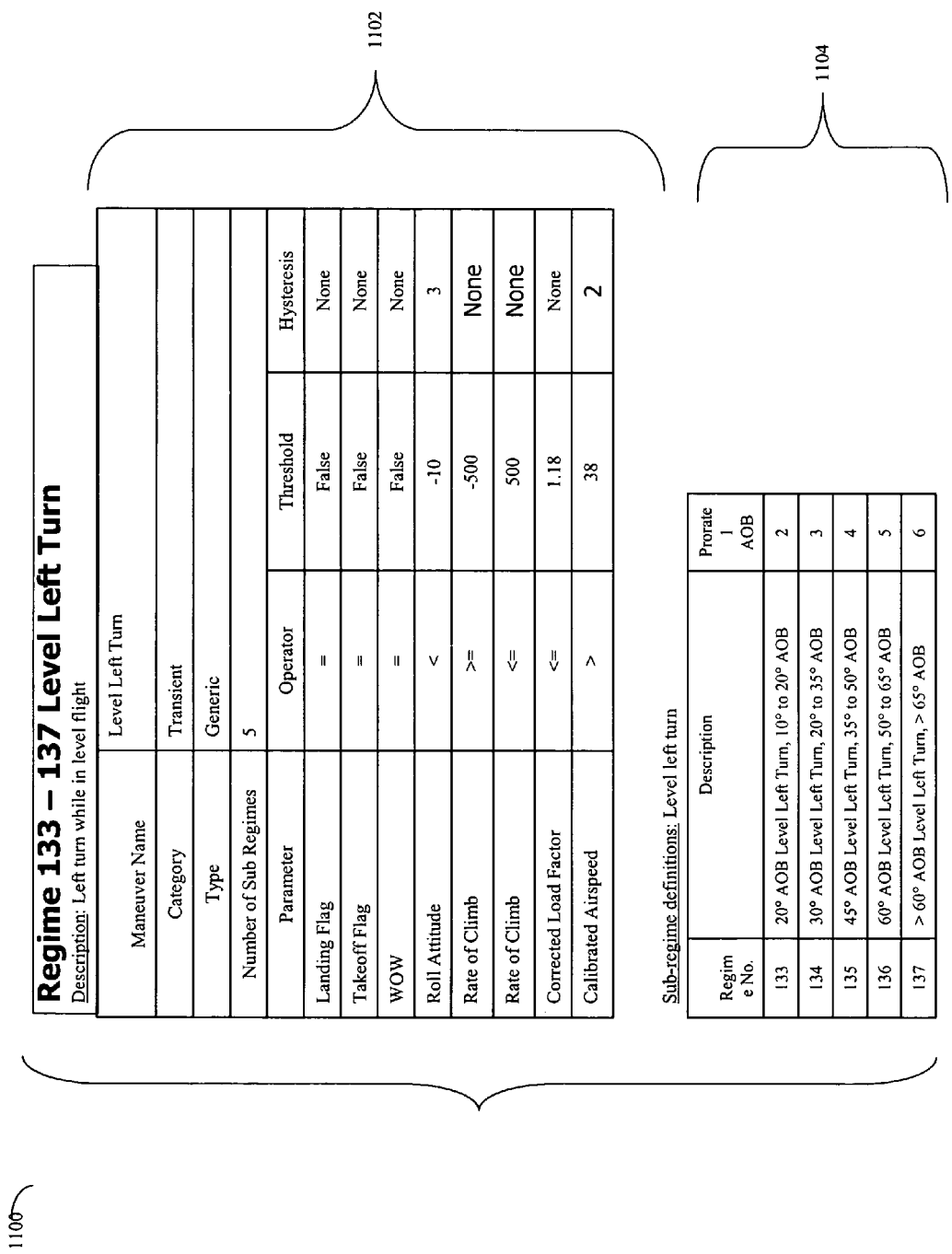

Regime 133 – 137 Level Left Turn
Description: Left turn while in level flight

| Maneuver Name | Level Left Turn | | |
|---|---|---|---|
| Category | Transient | | |
| Type | Generic | | |
| Number of Sub Regimes | 5 | | |
| Parameter | Operator | Threshold | Hysteresis |
| Landing Flag | = | False | None |
| Takeoff Flag | = | False | None |
| WOW | = | False | None |
| Roll Attitude | < | -10 | 3 |
| Rate of Climb | >= | -500 | None |
| Rate of Climb | <= | 500 | None |
| Corrected Load Factor | <= | 1.18 | None |
| Calibrated Airspeed | > | 38 | 2 |

Sub-regime definitions: Level left turn

| Regime No. | Description | Prorate 1 AOB |
|---|---|---|
| 133 | 20° AOB Level Left Turn, 10° to 20° AOB | 2 |
| 134 | 30° AOB Level Left Turn, 20° to 35° AOB | 3 |
| 135 | 45° AOB Level Left Turn, 35° to 50° AOB | 4 |
| 136 | 60° AOB Level Left Turn, 50° to 65° AOB | 5 |
| 137 | > 60° AOB Level Left Turn, > 65° AOB | 6 |

FIGURE 28

Regime 138 - 142 Level Right Turn

Description: Right turn while in level flight

| Maneuver Name | Level Right Turn | | |
|---|---|---|---|
| Category | Transient | | |
| Type | Generic | | |
| Number of Sub Regimes | 5 | | |
| Parameter | Operator | Threshold | Hysteresis |
| Landing Flag | = | False | None |
| Takeoff Flag | = | False | None |
| WOW | = | False | None |
| Roll Attitude | > | 10 | 3 |
| Rate of Climb | >= | -500 | None |
| Rate of Climb | <= | 500 | None |
| Corrected Load Factor | <= | 1.18 | None |
| Calibrated Airspeed | > | 38 | 2 |

Sub-regime definitions: Level Right turn

| Regime No. | Description | Prorate 1 AOB |
|---|---|---|
| 138 | 20° AOB Level Right Turn, 10° to 20° AOB | 2 |
| 139 | 30° AOB Level Right Turn, 10° to 35° AOB | 3 |
| 140 | 45° AOB Level Right Turn, 35° to 50° AOB | 4 |
| 141 | 60° AOB Level Right Turn, 50° to 65° AOB | 5 |
| 142 | > 60° AOB Level Right Turn, > 65° AOB | 6 |

FIGURE 29

METHOD OF INFERRING ROTORCRAFT GROSS WEIGHT

RELATED APPLICATIONS

This application claims priority to U.S. Provisional Patent Application No. 60/449,182, filed on Feb. 21, 2003, and U.S. Provisional Patent Application No. 60/453,113, filed on Mar. 7, 2003, and is a continuation-in-part of U.S. patent application Ser. No. 10/631,934, filed Jul. 31, 2003, now U.S. Pat. No. 7,203,716 which claims priority to U.S. Provisional Patent Application No. 60/429,053, filed Nov. 25, 2002, all of which are herein incorporated by reference in their entirety.

BACKGROUND OF THE INVENTION

1. Technical Field

This application relates to estimating flight data, and more particularly to estimating the weight of an aircraft.

2. Description of Related Art

Flight parameters, and estimates thereof, may be used in connection with a variety of different applications. One such application is related to aircraft parts. Systems exist that may be used in assessing the health of aircraft parts as well as detection and prediction of part failure. Such systems may use a variety of different inputs, including flight parameters, in making determinations and predictions in connection with the aircraft parts. In order to produce accurate and reliable results, the systems may rely on the accuracy of the inputs. Inputs may include, for example, the gross weight of the aircraft.

In connection with the aircraft gross weight, existing systems and techniques may use data gathered from sensors as well as crew entered values, such as weights of the cargo and passenger(s). It may also not be possible for the crew to enter these values given particular flight conditions. Such human entered values introduce a possibility of human error. Additionally, this human error may be difficult to quantify or bound.

Thus, it may be desirable to provide for an efficient technique for determining the gross weight of an aircraft. It may be desirable that this technique provide an estimation of the gross aircraft weight in a deterministic and automatic fashion while minimizing the amount of human error.

SUMMARY OF THE INVENTION

In accordance with one aspect of the invention is a method for determining a weight of an aircraft comprising: determining a flight regime in accordance with one or more inputs; selecting a neural net in accordance with said flight regime; and determining said weight using said neural net. The neural net may be trained offline prior to determining said weight of said aircraft. The step of determining said weight of said aircraft may be performed during operation of said aircraft. The neural net may be one of a plurality of neural nets. The neural net may be a feedforward neural net. The neural net may include a single hidden layer. The neural net may have a same set of interconnections between each neuron in said hidden layer and an input layer, and a same set of interconnection between said each neuron and an output layer. Each of said neurons in said hidden layer may utilize a same sigmoidal activation function. The neural net may include between 20 and 35 neurons in said hidden layer. The weight may be used as an input to another process. The flight regime may be one of a plurality of flight regimes that are mutually exclusive from one another. The flight regime may be manually selected. The flight regime may be an effective flight regime including one or more actual flight regimes using the same set of one or more neural nets. One or more neural net inputs may be used as inputs to said neural net selected, and the one or more neural net inputs may include at least one derived parameter that is determined based on mathematical and physical relationships of measured data. The one or more neural net inputs may be a first number of derived parameters determined using a second number of raw data values, the second number being greater than said first number. One or more neural net inputs may include at least one of the following:

Corrected Vertical Acceleration ($cN_z$) represented as:

$$cN_z = 1 + N_z - \left(\frac{1}{\cos[\phi]}\right)$$

Where $N_Z$ is Vertical Acceleration;

$\emptyset$ is Roll Attitude;

Torque Coefficient (Cq) represented as:

$$Cq = \frac{Q}{\rho A (\Omega R)^2}$$
$$= \frac{412.0/1.00.0 * (Eng1Q + Eng2Q)/2.0}{.0023769 * \sigma * \pi R^2 * \left(2 * \pi * \frac{Nr}{100} * \frac{257.887}{60} * R\right)^2}$$

Where

Q is total torque (RPM);

$\rho$ is density (lb-sec$^2$/ft$^4$);

A is the area of the main rotor disc (ft$^2$);

$\Omega$ is the rotation speed of the rotor (rad/s);

R is the radius of the main rotor disc (ft);

Nr is the main rotor speed (%);

$\sigma$ is the density ratio;

Advance Ratio ($\mu$) is represented as:

$$\mu = \frac{V}{\Omega R} = \frac{KIAS * 1.6890}{2 * \pi * \frac{Nr}{100} * \frac{257.887}{60}}$$

Where

KIAS is indicated airspeed in knots;

Climb rate over tip speed ($\mu_c$) is represented as:

$$\mu_c = \frac{V_c}{\Omega R} = \frac{ROC/60}{2 * \pi * \frac{Nr}{100} * \frac{257.887}{60}}$$

Where

ROC is rate of climb (ft/min);

Density Ratio (σ) is represented as:

$$\sigma = 0.0023769 * \left(\frac{288.15}{OAT + 273.15}\right) * \left(1 - \left(0.0019812 * \frac{Hp}{288.15}\right)\right)^{5.256}$$

Where
OAT is outside air temperature (° C.);
Hp is Barometric Altitude (ft).

The neural net inputs may include roll attitude and pitch attitude in accordance with the selected flight regime. One of said neural net inputs may be a derived parameter based on at least one of roll attitude and pitch attitude in accordance with the selected flight regime. The neural net may be included in a gross weight processor. The gross weight processor may be included on the aircraft for which said weight is determined. The gross weight processor may be included at a ground location and communicates with said aircraft. The one or more inputs may include at least one of: a sensor measurement, manual input, data from a storage location. The method may further comprise: determining said flight regime as a hover flight regime in accordance with the following input parameters: landing flag, takeoff flag, weight on wheels, yaw rate, rate of climb, pitch attitude, roll attitude, drift velocity, ground speed, airspeed, and control reversal flag, wherein said landing flag indicates whether said aircraft is landing, said takeoff flag indicates whether said aircraft is in takeoff mode, and said control reversal flag indicates whether said aircraft is in a reversal mode. The landing flag may indicate no landing, said takeoff flag may indicate no takeoff, said weight on wheels may indicate no weight on wheels, said control reversal flag may indicate that said aircraft is not in reversal mode, said yaw rate may have an approximate value within the inclusive range of: $-2.5 \leq$ yaw rate 2.5 degrees/second, said pitch attitude is approximately 10 degrees, said rate of climb may be approximately within the inclusive range of: $-200 \leq$ rate of climb $\leq 200$ feet/minute, said roll attitude may approximate a value within the inclusive range of: $-6 \leq$ roll attitude $\leq 3$ degrees, said drift velocity may approximate a value within the inclusive range of: $-7 \leq$ drift velocity $\leq 7$ knots, said ground speed may approximate a value within the inclusive range of: $-7 \leq$ ground speed $\leq 7$ knots, said airspeed may be an approximate value less than or equal to 38 knots. The method may also include: determining that said aircraft is in a hover flight regime at a first point in time; and determining that said aircraft remains in said hover flight regime at a second later point in time if said airspeed at said second later point in time does not exceed 43 knots. The method may also include: determining said flight regime as a forward flight regime in accordance with the following input parameters: landing flag, takeoff flag, weight on wheels, yaw rate, rate of climb, pitch attitude, roll attitude, airspeed, control reversal flag, and sideslip, wherein said landing flag indicates whether said aircraft is landing, said takeoff flag indicates whether said aircraft is in takeoff mode, and said control reversal flag indicates whether said aircraft is in a reversal mode. The landing flag may indicate no landing, said takeoff flag may indicate no takeoff, said weight on wheels may indicate no weight on wheels, said control reversal flag may indicate that said aircraft is not in reversal mode, said yaw rate may have an approximate value within the inclusive range of: $-5 \leq$ yaw rate $\leq 5$ degrees/second, said pitch attitude may be within the inclusive range of: $-10 \leq$ pitch attitude $\leq 10$ degrees, said rate of climb may be approximately within the inclusive range of: $-500 \leq$ rate of climb $\leq 500$ feet/minute, said roll attitude may approximate a value within the inclusive range of: $-10 \leq$ roll attitude $\leq 10$ degrees, said side slip may approximate a value within the inclusive range of: $-0.05 \leq$ side slip $\leq 0$, said airspeed may be an approximate value greater than 38 knots. The method may also include determining that said aircraft is in a forward flight regime at a first point in time; and determining that said aircraft remains in said forward flight regime at a second later point in time if said airspeed at said second later point in time is greater than 33 knots. The method may include determining said flight regime as a turn flight regime in accordance with the following input parameters: landing flag, takeoff flag, weight on wheels, roll attitude, airspeed, and rate of climb, wherein said landing flag indicates whether said aircraft is landing and said takeoff flag indicates whether said aircraft is in takeoff mode. The landing flag may indicate no landing, said takeoff flag may indicate no takeoff, said weight on wheels may indicate no weight on wheels, said rate of climb may be approximately within the inclusive range of: $-500 \leq$ rate of climb $\leq 500$ feet/minute, said roll attitude may approximate a value within the inclusive range of: $-10 \leq$ roll attitude $\leq 10$ degrees, said airspeed may be an approximate value greater than 38 knots. The method may include: determining that said aircraft is in a turn flight regime at a first point in time; and determining that said aircraft remains in said turn flight regime at a second later point in time unless at least one of the following is true: roll attitude is outside of the range −7,+13, and said airspeed is less than 36. One or more inputs may be scaled within a predetermined range. The method may include determining a sensitivity of said weight with respect to a parameter used in determining said weight. The sensitivity of said weight with respect to said parameter may determined in accordance with a partial derivative of said weight with respect to said parameter. The weight may be determined using a neural network and represented as:

$$\hat{W}_g(z) = \gamma\left[b2 + \sum_{i=1}^{P} W2_i * \gamma\left(b1_i + \sum_{j=1}^{m} W1_{i,j} * z_j\right)\right]$$

where z is a vector of inputs, p is a number of neurons in the hidden layer, m is a number of inputs, $W1_{i,j}$ is a weight of the $j^{th}$ input to the $i^{th}$ neuron in the hidden layer, $b1_i$ is a bias added to the $i^{th}$ neuron, $W2_i$ is a weight of the $i^{th}$ neuron to the output neuron, b2 is a bias added to an output neuron, and γ is the tanh function. The neural network may be a feedforward neural net with one hidden layer containing p sigmoidal neurons, and the sensitivity is represented as:

$$\delta \hat{W}_g(z)/\delta z_k = \gamma'\left[b2 + \sum_{i=1}^{P} W2_i * \gamma\left(b1_i + \sum_{j=1}^{m} W1_{ij} * z_j\right)\right] * \sum_{i=1}^{P} W2_i * W1_{i,k} * \gamma'\left(b1_i + \sum_{j=1}^{m} W1_{ij} * z_j\right)$$

where γ' is cos h$^{-2}$. The sensitivity with respect to an input vector z having said parameter that is a kth parameter, $z_k$, may be determined as a partial derivative of said weight with respect to the kth parameter evaluated in accordance with the input vector.

In accordance with another aspect of the invention is a method of determining a weight of an aircraft comprising: receiving one or more values; and determining said weight using a Kalman filter wherein said one or more values are used as inputs to said Kalman filter. One or more measurements may be input to said Kalman filter, and the method may include: determining a flight regime in accordance with one or more regime measurements; selecting a function based on said flight regime; and determining a covariance associated with one of said measurements in accordance with said function. The flight regime may be the hover flight regime, and said function may determine said covariance associated with a weight estimate. The function may determine the covariance in accordance with body accelerations of said aircraft along x and z axes, roll attitude, pitch attitude, airspeed and altitude. One or more measurements may be input to said Kalman filter, said one or more measurements including at least one of: a weight estimate, and engine fuel flow rate. The weight estimate may be a predetermined value based on vehicle flight and performance data. The weight estimate may be based on manually entered data representing a sum gross weight of said aircraft. The flight regime may be manually determined. The flight regime may be determined in accordance with a predetermined mapping that maps one or more values to a particular flight regime, wherein a given set of one or more inputs values uniquely maps to a flight regime. The Kalman filter may produce an output used as an input to another component.

In accordance with another aspect of the invention is a system for determining a weight of an aircraft comprising: a regime recognizer that determines a regime indicator in accordance with a portion of said one or more inputs; and a gross weight estimator that determines said weight of said aircraft, said gross weight estimator including at least one of: a Kalman filter, and one or more neural nets, and using at least one of said Kalman filter and a first of said one or more neural nets in determining said weight. The system may further comprise: an input processor that processes one or more inputs producing one or more processed inputs, said one or more inputs including at least one sensor measurement; and a portion of said one or more processed inputs are neural net inputs used by said one or more neural nets, and said gross weight estimator including: a neural net selector that selects a neural net in accordance with said regime indicator. The regime recognizer may be included in said input processor. The gross weight estimator may include one or more neural nets whose output, when said one or more neural nets is selected in accordance with said flight regime indicator, is an input to said Kalman filter.

In accordance with another aspect of the invention is a method for determining an aircraft parameter comprising: determining a flight regime in accordance with one or more inputs; selecting a neural net in accordance with said flight regime; and determining said aircraft parameter using said neural net. The neural net may use at least one derived parameter determined from a relationship between one or more raw input values.

In accordance with yet another aspect of the invention is a method of determining an aircraft parameter comprising: receiving one or more values; and determining said aircraft parameter using a Kalman filter wherein said one or more values are used as inputs to said Kalman filter. The method may include determining a flight regime in accordance with one or more regime measurements; selecting a function based on said flight regime; and determining a covariance associated with one of said measurements in accordance with said function.

In accordance with another aspect of the invention is a system for determining an aircraft parameter comprising: a regime recognizer that determines a regime indicator in accordance with a portion of said one or more inputs; and an aircraft parameter generator that determines said aircraft parameter, said aircraft parameter generator including at least one of: a Kalman filter, and one or more neural nets, and using at least one of said Kalman filter and a first of said one or more neural nets in determining said aircraft parameter.

In accordance with another aspect of the invention is a computer program product for determine a weight of an aircraft comprising code that: determines a flight regime in accordance with one or more inputs; selects a neural net in accordance with said flight regime; and determines said weight using said neural net. The neural net may be trained offline prior to determining said weight of said aircraft. The code that determines said weight of said aircraft is executed during operation of said aircraft. The neural net may be one of a plurality of neural nets. The neural net may be a feedforward neural net. The neural net may include a single hidden layer. The neural net may have a same set of interconnections between each neuron in said hidden layer and an input layer, and a same set of interconnection between said each neuron and an output layer. Each of the neurons in said hidden layer may utilize a same sigmoidal activation function. The neural net may include between 20 and 35 neurons in said hidden layer. The weight may be used as an input to another process. The flight regime may be one of a plurality of flight regimes that are mutually exclusive from one another. The flight regime may be manually selected. The flight regime may be an effective flight regime including one or more actual flight regimes using the same set of one or more neural nets. One or more neural net inputs may be used as inputs to said neural net selected, and the one or more neural net inputs may include at least one derived parameter that is determined based on mathematical and physical relationships of measured data. The one or more neural net inputs may be a first number of derived parameters determined using a second number of raw data values, the second number being greater than said first number. One or more neural net inputs may include at least one of the following:

Corrected Vertical Acceleration ($cN_z$) represented as:

$$cN_z = 1 + N_z - \left(\frac{1}{\cos[\phi]}\right)$$

Where
  $N_Z$ is Vertical Acceleration;
  $\emptyset$ is Roll Attitude;

Torque Coefficient (Cq) represented as:

$$Cq = \frac{Q}{\rho A (\Omega R)^2}$$
$$= \frac{412.0/1.00.0 * (Eng1Q + Eng2Q)/2.0}{.0023769 * \sigma * \pi R^2 * \left(2 * \pi * \frac{Nr}{100} * \frac{257.887}{60} * R\right)^2}$$

Where
Q is total torque (RPM);
ρ is density (lb-sec²/ft⁴);
A is the area of the main rotor disc (ft²);
Ω is the rotation speed of the rotor (rad/s);
R is the radius of the main rotor disc (ft);
Nr is the main rotor speed (%);
σ is the density ratio;

Advance Ratio (μ) is represented as:

$$\mu = \frac{V}{\Omega R} = \frac{KIAS * 1.6890}{2 * \pi * \frac{Nr}{100} * \frac{257.887}{60}}$$

Where
KIAS is indicated airspeed in knots;

Climb rate over tip speed ($\mu_c$) is represented as:

$$\mu_c = \frac{V_c}{\Omega R} = \frac{ROC/60}{2 * \pi * \frac{Nr}{100} * \frac{257.887}{60}}$$

Where
ROC is rate of climb (ft/min);

Density Ratio (σ) is represented as:

$$\sigma = 0.0023769 * \left(\frac{288.15}{OAT + 273.15}\right) * \left(1 - \left(0.0019812 * \frac{Hp}{288.15}\right)\right)^{5.256}$$

Where
OAT is outside air temperature (° C.);
Hp is Barometric Altitude (ft).

The neural net inputs may include roll attitude and pitch attitude in accordance with the selected flight regime. One of said neural net inputs may be a derived parameter based on at least one of roll attitude and pitch attitude in accordance with the selected flight regime. The neural net may be included in a gross weight processor. The gross weight processor may be included on the aircraft for which said weight is determined. The gross weight processor may be included at a ground location and communicates with said aircraft. The one or more inputs may include at least one of: a sensor measurement, manual input, data from a storage location. The computer program product may also include code that: determines said flight regime as a hover flight regime in accordance with the following input parameters: landing flag, takeoff flag, weight on wheels, yaw rate, rate of climb, pitch attitude, roll attitude, drift velocity, ground speed, airspeed, and control reversal flag, wherein said landing flag indicates whether said aircraft is landing, said takeoff flag indicates whether said aircraft is in takeoff mode, and said control reversal flag indicates whether said aircraft is in a reversal mode. The landing flag may indicate no landing, said takeoff flag may indicate no takeoff, said weight on wheels may indicate no weight on wheels, said control reversal flag may indicate that said aircraft is not in reversal mode, said yaw rate may have an approximate value within the inclusive range of: −2.5≦yaw rate 2.5 degrees/second, said pitch attitude may be approximately 10 degrees, said rate of climb may be approximately within the inclusive range of: −200≦rate of climb≦200 feet/minute, said roll attitude may approximate a value within the inclusive range of: −6≦roll attitude≦3 degrees, said drift velocity may approximate a value within the inclusive range of: −7≦drift velocity≦7 knots, said ground speed may approximate a value within the inclusive range of: −7≦ground speed≦7 knots, said airspeed may be an approximate value less than or equal to 38 knots. The computer program product may further comprises code that: determines said aircraft is in a hover flight regime at a first point in time; and determines said aircraft remains in said hover flight regime at a second later point in time if said airspeed at said second later point in time does not exceed 43 knots. The computer program product may also include: code that determines said flight regime as a forward flight regime in accordance with the following input parameters: landing flag, takeoff flag, weight on wheels, yaw rate, rate of climb, pitch attitude, roll attitude, airspeed, control reversal flag, and sideslip, wherein said landing flag indicates whether said aircraft is landing, said takeoff flag indicates whether said aircraft is in takeoff mode, and said control reversal flag indicates whether said aircraft is in a reversal mode. The landing flag may indicate no landing, said takeoff flag may indicate no takeoff, said weight on wheels may indicate no weight on wheels, said control reversal flag may indicate that said aircraft is not in reversal mode, said yaw rate may have an approximate value within the inclusive range of: −5≦yaw rate≦5 degrees/second, said pitch attitude may be within the inclusive range of: −10≦pitch attitude≦10 degrees, said rate of climb may be approximately within the inclusive range of: −500≦rate of climb≦500 feet/minute, said roll attitude approximates a value within the inclusive range of: −10≦roll attitude≦10 degrees, said side slip may approximate a value within the inclusive range of: −0.05≦side slip≦0, said airspeed may be an approximate value greater than 38 knots. The computer program product may further comprise code that: determines said aircraft is in a forward flight regime at a first point in time; and determines said aircraft remains in said forward flight regime at a second later point in time if said airspeed at said second later point in time is greater than 33 knots. The computer program product may also include code that: determines said flight regime as a turn flight regime in accordance with the following input parameters: landing flag, takeoff flag, weight on wheels, roll attitude, airspeed, and rate of climb, wherein said landing flag indicates whether said aircraft is landing and said takeoff flag indicates whether said aircraft is in takeoff mode. The landing flag may indicate no landing, said takeoff flag may indicate no takeoff, said weight on wheels may indicate no weight on wheels, said rate of climb may be approximately within the inclusive range of:−500≦rate of climb≦500 feet/minute, said roll attitude may approximate a value within the inclusive range of: −10≦roll attitude≦10 degrees, said airspeed may be an approximate value greater than 38 knots. The computer program product may also include code that: determines said aircraft is in a turn flight regime at a first point in time; and determines said aircraft remains in said turn flight regime at a second later point in time unless at least one of the following is true: roll attitude is outside of the range−7,+13, and said airspeed is less than 36. One or more inputs may be scaled within a predetermined range. The computer program product may also include code that: determines a sensitivity of said weight with respect to a parameter used in determining said weight. The sensitivity of said weight with respect to said parameter may be determined in accordance with a partial derivative of said weight with respect to said parameter. The weight may be determined using a neural network and represented as:

$$\hat{W}_g(z) = \gamma\left[b2 + \sum_{i=1}^{P} W2_i * \gamma\left(b1_i + \sum_{j=1}^{m} W1_{i,j} * z_j\right)\right]$$

where z is a vector of inputs, p is a number of neurons in the hidden layer, m is a number of inputs, $W1_{ij}$ is a weight of the $j^{th}$ input to the $i^{th}$ neuron in the hidden layer, $b1_i$ is a bias added to the $i^{th}$ neuron, $W2_i$ is a weight of the $i^{th}$ neuron to the output neuron, b2 is a bias added to an output neuron, and γ is the tanh function. The neural network may be a feedforward neural net with one hidden layer containing p sigmoidal neurons, and the sensitivity is represented as:

$$\delta\hat{W}_g(z)/\delta z_k = \gamma'\left[b2 + \sum_{i=1}^{P} W2_i * \gamma\left(b1_i + \sum_{j=1}^{m} W1_{i,j} * z_j\right)\right] * \sum_{i=1}^{P} W2_i * W1_{i,k} * \gamma'\left(b1_i + \sum_{j=1}^{m} W1_{i,j} * z_j\right)$$

where γ' is $\cosh^{-2}$.

The sensitivity with respect to an input vector z having said parameter that is a kth parameter, $z_k$, may be determined as a partial derivative of said weight with respect to the kth parameter evaluated in accordance with the input vector.

In accordance with another aspect of the invention is a computer program product that determines a weight of an aircraft comprising code that: receives one or more values; and determines said weight using a Kalman filter wherein said one or more values are used as inputs to said Kalman filter. One or more measurements may be input to said Kalman filter, and the computer program product may further comprise code that: determines a flight regime in accordance with one or more regime measurements; selects a function based on said flight regime; and determines a covariance associated with one of said measurements in accordance with said function. The flight regime may be the hover flight regime, and said function may determine said covariance associated with a weight estimate. The function may determine said covariance in accordance with body accelerations of said aircraft along x and z axes, roll attitude, pitch attitude, airspeed and altitude. One or more measurements may be input to said Kalman filter, said one or more measurements including at least one of: a weight estimate, and engine fuel flow rate. The weight estimate may be a predetermined value based on vehicle flight and performance data. The weight estimate may be based on manually entered data representing a sum gross weight of said aircraft. The flight regime is manually determined. The flight regime may be determined in accordance with a predetermined mapping that maps one or more values to a particular flight regime, wherein a given set of one or more inputs values uniquely maps to a flight regime. The Kalman filter produces an output used as an input to another component.

In accordance with another aspect is a computer program product for determining an aircraft parameter comprising code that: determines a flight regime in accordance with one or more inputs; selects a neural net in accordance with said flight regime; and determines said aircraft parameter using said neural net. The neural net may use at least one derived parameter determined from a relationship between one or more raw input values.

In accordance with another aspect of the invention is a computer program product that determines an aircraft parameter comprising code that: receives one or more values; and determines said aircraft parameter using a Kalman filter wherein said one or more values are used as inputs to said Kalman filter. The computer program product may also include code that determines a flight regime in accordance with one or more regime measurements; selects a function based on said flight regime; and determines a covariance associated with one of said measurements in accordance with said function.

BRIEF DESCRIPTION OF DRAWINGS

Features and advantages of the present invention will become more apparent from the following detailed description of exemplary embodiments thereof taken in conjunction with the accompanying drawings in which:

FIGS. 14-16 are examples of embodiments of effective regimes that may be included in an embodiment.

FIGS. 18-27 are examples of actual regimes that may be included in a single effective fast forward regime in one embodiment.

FIGS. 28-29 are examples of actual regimes that may be included in a single effective turn regime in one embodiment.

DESCRIPTION OF EMBODIMENT(S)

Figure 1:
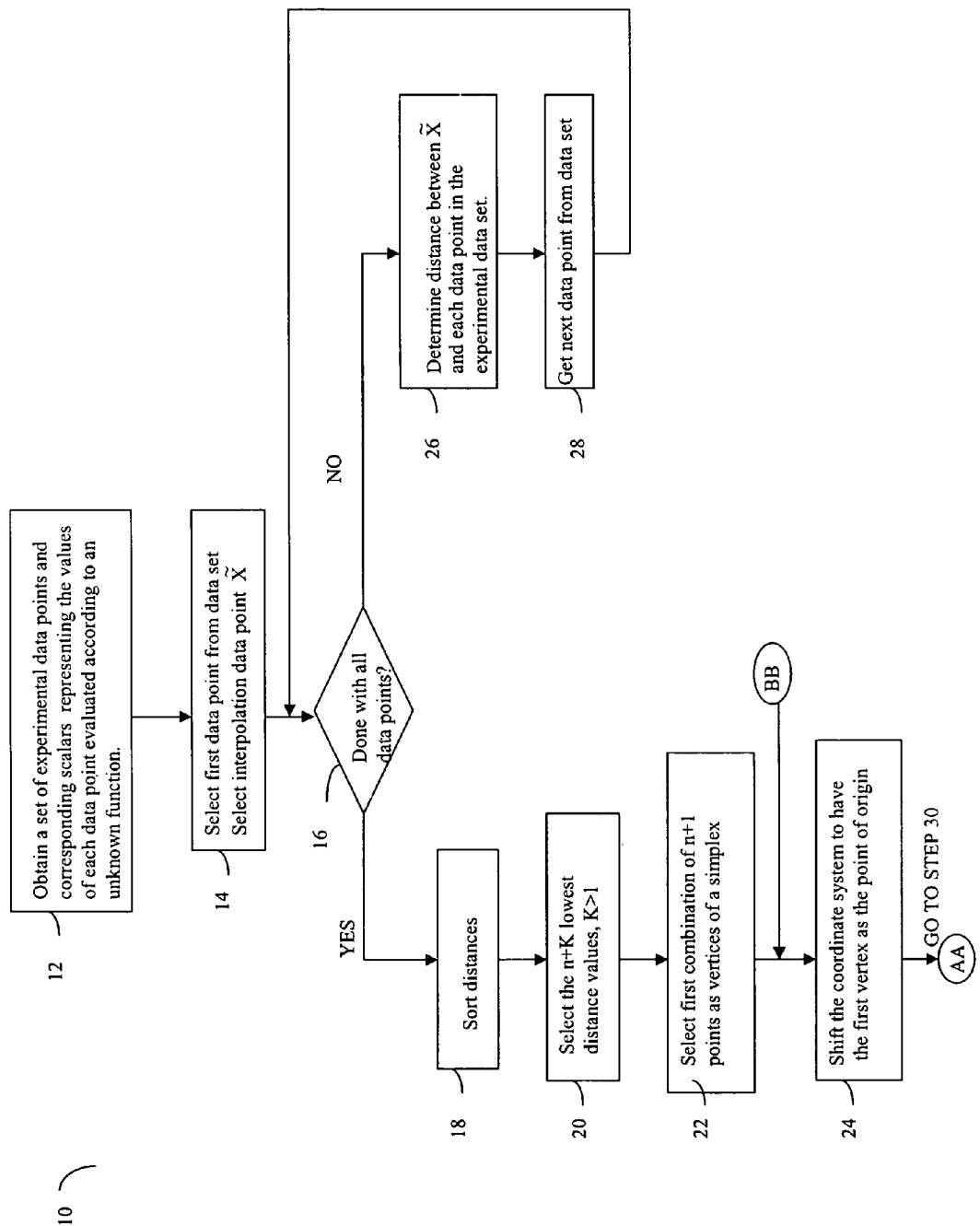
FIGS. 1-2 are steps of a flowchart of one method for performing interpolation.

Neural networks may be used to model various conditions, such as those described herein in connection with estimation of aircraft weight as well as a wide variety of other conditions. Part of effectively utilizing a neural network includes properly training the neural network using a good set of training data. It may be desirable to have the training data cover an entire range of expected inputs. However, it may not be possible to generate such data sets. In practice, it may be the case that only sparse experimental data is available making it difficult to properly train and verify the neural network. The sparse experimental data may not cover the desired range of input conditions. Interpolation techniques may be used to generate additional data. However, the particular interpolation techniques available for use may be dependent on the characteristics of the actual experimental data from which additional data is generated. For example, the experimental data may be characterized as not uniform and scattered limiting the use of certain interpolation techniques that may be better suited for use with more uniform data. The available interpolation techniques may be further limited by the data dimensionality of the model since particular interpolation techniques may not be practically used with data dimensions as described elsewhere herein in more detail.

A majority of interpolation methods may be characterized as primarily suited for use with data points arranged in a regular rectangular grid, or data that may be characterized as generally uniform and regularly structured. That is, for example, suppose that each data point consists of an n-dimensional vector x and a scalar y. For the i-th coordinate of a vector x, the measurements available for each of $m_i$ discrete values are: $x_i(1), x_i(2), \ldots, x_i(n_i-1), x_i(m_i)$. Then, measurement or experimental data is also available for each combination of all discrete values $x(k_1, k_2, \ldots, k_n)=[x_1(k_1), x_2(k_2), \ldots, x_n(k_n)]$ making the total number of available measurements in the experimental data equal to the product of numbers $m_i$. For example, if the data were two-dimensional (n=2), for uniform data sets there are $m_1$ distinct values for the first coordinate of x, $m_2$ distinct values for the second coordinate of x, a total number of data points represented as $m=m_1 m_2$, and all measurement values may be arranged into a two-dimensional array y(i,j), with i=1, ..., $m_1$, j=1, ..., $m_2$. Similarly, if the data were three-dimensional (n=3), for uniform data sets there are $m_1$ distinct values for the first coordinate of x, $m_2$ distinct values for the second coordinate of x, $m_3$ distinct values for the third coordinate of x, a total number of data points represented as $m=m_1 m_2 m_3$, and all measurement values may be arranged into a three-dimensional array y(i, j, k), with i=1, ..., $m_1$, j=1, ..., $m_2$, k=1, ..., Interpolation techniques may be used to estimate a value of the function for some intermediate value of x within the bounds given by limits $x_i(1)$ and $x_i(m_i)$, for example, assuming that the discrete values for each coordinate of x are increasing.

Different existing techniques used for interpolation of data described as above that may be characterized as regularly structured data include, for example, the multi-linear method, cubic method, and cubic spline method. Such methods are based on finding a hyper-rectangular cell of the grid containing the point x and then fitting a local approximating function whose values at the cell vertices are given by tabulated values of y. It should be noted that the size of an n-dimensional data table may grow quickly with respect to n, which may limit applicability of these interpolation approaches. Moreover, the use of these particular interpolation approaches may be better suited for use with regular or uniform experimental data set generation.

It may be desirable to use interpolation techniques over data, as described above, that does not display a regular, uniform or rectangular structure as may be the case when utilizing experimental data. For example, assume that variables x may be measured but cannot be set to arbitrary values. Let the collected data set consist of m pairs (x(k), y(k)), k=1, ..., m, such that the particular coordinate values $x_i(k)$ need not be the same for any two measurement points. Interpolation of scattered data may be more difficult in that certain interpolation techniques may not be suitable for use with such data. For example, one embodiment of a software product called Matlab provides only two such methods within its griddatan function for use with such non-uniform scattered data. These two such methods are known as the nearest neighbor interpolation and linear interpolation based on Delaunay tessellation.

Advantages of the nearest neighbor approach are its speed and modest memory requirements and it scales quite easily to higher data dimensions. However, the nearest neighbor method may generate data points that are not sufficiently accurate and may result in a piecewise-constant interpolated function that is discontinuous along lines equidistant from two nearest neighboring points. Therefore applicability of nearest neighbor interpolation may be limited to instances in which collected data is relatively dense to limit the size of any discontinuity. Additionally, the nearest neighbor technique is sensitive with respect to scaling of the coordinates of x such that two different nearest neighbors may be generated for a same data point x in instances each having different scaling.

Linear interpolation on Delaunay simplices results in an interpolation function that is everywhere continuous. The method is based on tessellation of the data set into disjoint simplices (n-dimensional polyhedra with n+1 vertices) such that a hypersphere circumscribed on vertices of any one simplex does not contain any other data point. Such tessellation is unique. Within each simplex, a linear function is fit such that its values at vertices are equal to the corresponding measurement values. In other words, linear functions fitted within neighboring simplices coincide on their boundaries, thus resulting in the overall surface being continuous. Therefore, the Delaunay-based technique may be used if accuracy and consistency of generated interpolation data are concerns. However, a limitation of the Delaunay technique is that the values at which the function is interpolated must fall within the convex hull of all the available data points. If it does not, an alternate interpolation technique, such as the nearest neighbor, may be used for nearest neighbor interpolation outside of the convex hull.

Another drawback with the Delaunay technique is the marked increase in growth of the computational and storage requirements as the data dimensionality n increases. For example, the available implementations of Delaunay tessellation may not be practical for n>10. The inventor determined that using the Delaunay technique with a Matlab implementation on a personal computer with 4 GB of RAM was adequate storage for values of n<9, and additionally, limiting the data set size. For example, for n=6, approximately 2500 data points may be used, and for n=8, approximately 250 data points may be used. Such data storage requirements may not be well suited for use with higher values of n with the Delaunay technique. A user of Matlab may, for example, use a less accurate nearest neighbor interpolation technique with larger data dimensionality and larger data sets. Additionally, because of the combinatorial nature of the tesselation problem, the computation complexity increases rapidly with the dimension of the data set size making data sets with larger dimensions, such as more than n=11 or n=12, nonscalable for use with existing computer systems.

What will now be described are techniques that may be used in generating data sets based on existing data that may be characterized as non-uniform and scattered in which the generated data is more accurate than that of the nearest neighbor technique, and the storage and computational costs are more scalable than those of the Delaunay technique as the data dimensionality increases.

Described in following paragraphs are techniques in which some advantages of the Delaunay tessellation-based method are retained while simultaneously relaxing excessive computational requirements. As described elsewhere herein, one advantage of the Delaunay tessellation-based interpolation method over the nearest neighbor method is that the Delaunay tessellation-based utilizes information about the local trends contained in the data points that surround the point of interest. In contrast, this information is not utilized within the nearest neighbor method, which uses only one—a single value at the nearest data point. The technique described in following paragraphs utilizes this advantage such that described is an interpolation technique in which the interpolated value calculated is based on linear interpolation between the data points surrounding the point of interest. That is, a simplex is determined from selected data points such that the point of interest lies within the interior of the simplex.

The following interpolation technique also relaxes the strict requirement that the surface of the overall interpolated function must be continuous, as in the case of the Delaunay tessellation. The following interpolation technique may select any simplex such that the point of interest x lies within its interior and is close to its vertices. Such simplices may be formed using n+K nearest neighbors of the point of interest. K may be characterized as a parameter selected to limit the number of candidates or points considered herein, K>1. The particular value for K used may vary in accordance with the particular considerations of each embodiment. Among those nearest neighbors, different sets of n+1 points may be used to form candidate simplices. Then a first simplex such that the given point x lies within its interior may be selected to perform linear interpolation. Determining if x lies within a simplex's interior may be performed by expressing x as a linear combination of n vertices of the simplex if the origin of the coordinate system is translated to the remaining n+1$^{th}$ vertex. If this linear combination is convex such that all coefficients are positive and summing to less then 1, then the point lies within the vertices forming the selected simplex.

Figure 2:
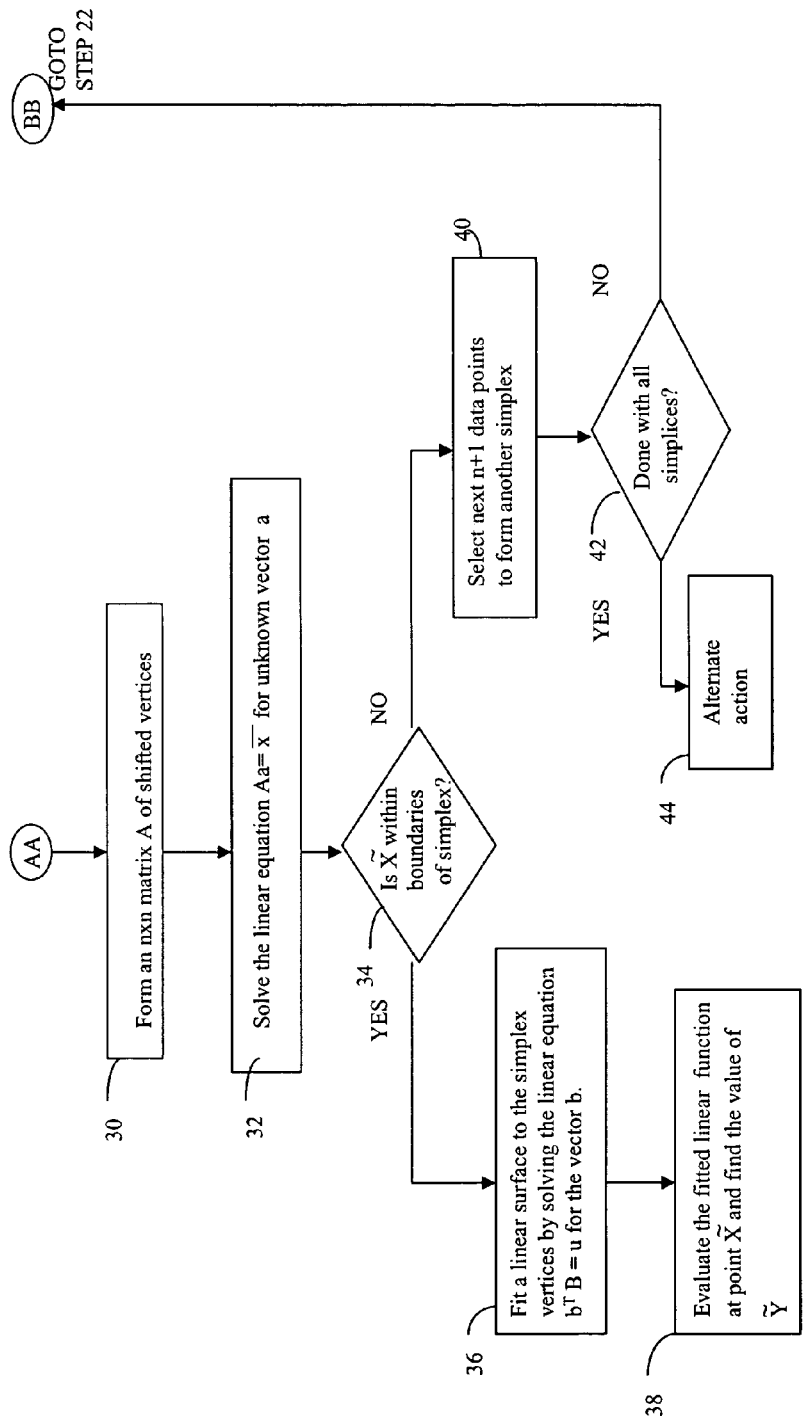

Referring now to FIGS. 1 and 2, shown is a flowchart of steps of an embodiment for performing interpolation. At step 12, a set of experimental data points and corresponding scalar values representing values of the unknown function relating the data points are obtained. This may be represented as a set of data points (x(k), y(k)) k=1, . . . , m where x(k) are n-dimensional vectors, and y(k) are the scalars representing values of the unknown function at points x(k). At step 14, a first data point x(k) is selected from the set of experimental data points, and a point x̃ is selected as the interpolation point and represents the point at which an interpolated function value ỹ is approximated. At step 16, a determination is made as to whether all data points x(k) in the experimental data set have been processed. If not, control proceeds to step 26 where a distance $d_k$ between x̃ and every x(k) is determined as:

$$dk=\|\tilde{x}-x(k)\|$$

Control proceeds to step 28 where the next data point in the experimental data set is obtained. Control then proceeds to decision point 16.

If at step 16 it is determined that all data points in the experimental data set have been processed, control proceeds to step 18 where the distances are sorted to determine the n+K lowest values, and the corresponding n+K nearest neighbors of x̃ among all the data points x(k). These n+K nearest neighbors may be denoted as z(i), i=1, . . . , n+K, with z(1) being the closest to x̃, z(2) the second closest, and so on.

Control proceeds to step 22 which is the top of a loop for processing each simplex formed by a combination of n+1 data points of the n+K nearest neighbors. This loop is performed for all combinations of n+1 data points of the n+K nearest neighbors. At step 22, the first combination of n+1 data points forming the first simplex are selected. The particular set of vertices of this selected simplex for which the current loop iteration at step 22 is performed is denoted as v(j), i=1, . . . , n+1. Control proceeds to step 24 where the origin of the coordinate system of the simplex is shifted such that the first vertex, v(1) is the origin. This is performed by defining for each vertex 2 . . . n+1 a shifted vertex denoted as:

$$\bar{v}(j)=v(j)-v(1)$$

and defining for the point of interest:

$$\bar{x}=\tilde{x}-v(1)$$

Control proceeds to step 30 where an n×n matrix A is formed from the shifted vertices. The matrix A may be represented as a series of column vectors where each column vector is one of the shifted vertices as:

$$A=[\bar{v}(2), \bar{v}(3), \ldots, \bar{v}(n+1)]$$

At step 32, the following linear equation is solved for the unknown vector a:

$$Aa=\bar{x}$$

where x̄ and A are as defined above. Any one of a variety of different techniques may be used to solve the foregoing linear equation, such as Gaussian elimination, factorization, and the like in accordance with the size of the matrix A.

At step 34, a determination is made as to whether the point of interest is within the boundaries of the selected simplex. This may be performed, for example, by determining if "a" found in step 32 satisfies the following:

$$a_i \geq 0 \text{ and } \Sigma_{i=1}^{n} a_i \leq 1$$

in which $a_1, \ldots a_n$ are the entries in the vector "a".

In this instance, the point of interest x̃ is expressed as a linear combination of n vertices having the origin translated to the remaining n+1th vertex. If this linear combination is determined to be convex, then the point lies within the simplex. Determining whether the linear combination is convex may be performed by determining if all coefficients are positive and sum to less than 1, as set forth above. Other embodiments may use different processing steps to make a determination of step 34.

If the determination at step 34 is such that the point of interest x̃ is not within the simplex or is not on the boundary of the simplex, control proceeds to step 40 where the next combination of n+1 data points is selected to form the vertices of the next simplex to be tested. At step 42, a determination is made as to whether all combinations of points have been processed indicating that all simplices have been tested. If not, control proceeds to step 22 for the next loop iteration using the next selected simplex. If all simplices have been processed, it means that no candidate simplex tested contains $\tilde{x}$, and control proceeds to step 44 to take an alternate action. Alternate actions are discussed in more detail in following paragraphs.

If, at step 34 it is determined that the $\tilde{x}$ is within the simplex or on the boundary of the simplex, control proceeds to step 36 where a linear surface is fit to the simplex vertices by solving the linear equation for a vector "b" of dimension n+1:

$$b^T B = u^T$$

where values of the function at points v(j) are denoted as u(j), j=1 . . . n+1 such that "u" is a vector defined in terms of all the u(j)'s as a transpose matrix:

$$u = [u(1), u(2), \ldots, u(n+1)]^T$$

and B is an n+1 x n+1 matrix represented as:

$$B = \begin{bmatrix} v(1) & v(2) & \ldots v(n+1) \\ 1 & 1 & 1 \end{bmatrix}$$

As described elsewhere herein, any one of a variety of different techniques may be used to solve the foregoing linear equation in accordance with particulars of the matrix B including, for example, the size of the matrix, whether data included therein is colinear, whether the matrix is singular and the like.

Control proceeds to step 38 where the fitted linear function is evaluated at point $\tilde{x}$. In other words, to obtain the corresponding interpolated value $\tilde{y}$, the function value at $\tilde{x}$ is approximated as:

$$\tilde{y} = \sum_{i=1}^{n} b_i u_i + b_{n+1}$$

where $b_1, b_2, \ldots b_{n+1}$ are elements of the vector b computed at step 36, and $u_i$ is an ith element of the transpose vector u defined above.

In connection with step 44, alternate actions may be performed in the event that the none of the candidate simplices encloses $\tilde{x}$, or alternatively includes $\tilde{x}$ on the boundary of the simplex. An embodiment may increase the size of K and select a new set of candidate data points; form new simplices and again perform processing of flowchart 10. However, it should be noted that as K increases, the number of possible combinations of n+1 points from among n+K candidates also increases sharply and may utilize an amount of computation time that is impractical. As described elsewhere herein, the foregoing proposed approach for interpolation has a goal of reducing required computational effort. Therefore, it may be preferred to keep the parameter K constant.

An embodiment may also utilize an alternate interpolation technique, such as revert to nearest neighbor interpolation upon failure to determine a suitable simplex fails. The nearest neighbor technique may provide for using the value of y corresponding to data point z(1), the closest neighbor already determined in previous processing steps described elsewhere herein. Other embodiments may use other alternative interpolation techniques besides the nearest neighbor.

Yet another possibility for alternate action taken at step 44 is to perform linear extrapolation using one of the already tested simplices. In other words, it has been determined at step 34 that the data point $\tilde{x}$ is not within the boundaries of a candidate simplex. Accordingly, select the simplex to which the data point $\tilde{x}$ is closest to its interior. In one embodiment, this may be determined by monitoring the degree to which the condition is step 34 is violated and selecting the simplex with the smallest violation such that the point it is close to its interior. In an experimental implementation, the numerical criterion to assess the degree of violation for each vector "a" consisting of elements $a_1, a_2, \ldots, a_n$ is:

$$\max\left(\max_i (-a_i), \sum_{i=1}^{n} a_i\right)$$

Other embodiments may use other determinations to assess the degree of violation An embodiment may also select the simplex consisting of the n+1 nearest neighbor data points $z(1), z(2), \ldots, z(n)$.

It should be noted that the foregoing are some alternative techniques that may be used in an embodiment and not meant to be an exhaustive list. Other embodiments may include other techniques used alone or in combination with those described herein.

The foregoing interpolation technique assumes that no colinearity exists in the experimental data points. In this instance, the matrices A and/or B are full rank as may be typical of experimental data in which no controls are placed upon generating the values for the experimental data points.

If some regularity is present in the experimental data, for example, if some components of x are controlled and appear in equal intervals, many of the candidate simplices may be degenerate. Accordingly, the method selected to solve the linear equations, such as in steps 32 and 36, may account for the possibility of A and B being singular, or approximately singular depending on the particular precision, for example, of hardware and/or software and numerical computation techniques utilized in an embodiment. An embodiment may include additional test steps prior to solving linear equations to determine of the matrices are singular. If so, appropriate techniques may be used to solve the linear equation. Possible approaches include, for example, using singular value decomposition methods or solving the equations through use of matrix pseudoinverse. Such techniques may be performed in an embodiment, for example, by invoking an available subroutine or function, such as may be available in Matlab, incorporating the functionality to solve the equations.

In the event that the matrices A and/or B are determined to be singular, an embodiment may also add a random "jiggle" factor to the data points to destroy colinearity. This "jiggle factor" may be empirically determined by execution with different values to determine how much a particular jiggle factor affects or varies the data. An embodiment may add a jiggle factor to the data points sufficient to prevent the matrix from being singular but not large enough to practically alter the results.

It should be noted that due to finite numerical accuracy, a failure determination may result from processing at step 34 even though a data point is indeed within a candidate simplex. This depends upon the precision of the data representations in an embodiment. An embodiment may add an error factor to the conditions used in making the step 34 determination to take this into consideration. For example, an embodiment may modify the conditions previously described in step 34 processing to be:

$$a_i \geq -\epsilon_1 \text{ and}$$

$$\sum_{i=1}^{n} a_i \leq 1 + \epsilon_2,$$

with $\epsilon 1$ and $\epsilon 2$ chosen to reflect condition of matrix A. An embodiment may select:

$$\epsilon 1 = n\sqrt{n}\epsilon$$

where $\epsilon$ is based on a processor or hardware and/or software characteristic.

As described above, an embodiment may use distance to select candidate simplex vertices. This may make the foregoing technique sensitive to scaling however. An embodiment may scale data before performing the foregoing interpolation technique so that the ranges of all coordinates of x are the same across the data set.

The foregoing interpolation technique blends advantages of linear interpolation and nearest neighbors approaches. The search for appropriate simplices is greatly simplified when compared to the standard Delaunay-based approach. A simple test is used to test whether the point in question lies inside the candidate simplex. Additionally, the foregoing technique does not require that all simplices be evaluated. Rather, a subset of simplices are evaluated and the foregoing embodiment stops at the first simplex within which it is determined that the desired data point exists. An embodiment may also utilize other techniques for selecting a simplex from the candidate simplices since a single data point may be found to exist within more than one simplex.

The foregoing technique selects the first simplex which contains the point of interest. An embodiment may also use other techniques in selecting a simplex, for example, when there are a plurality of simplices that are determined to enclose, or approximately enclose, the point of interest. For example, an embodiment may perform the processing steps herein until a first predetermined number of simplices are found, until a predetermined number of simplices are examined, until a predetermined time limit has expired, and the like. If there are multiple simplices, an embodiment may accordingly select one of the simplices using any one or more of a variety of evaluation techniques, for example, such as selecting the simplex within which the point of interest is closest to the center of the simplex.

Using the foregoing technique affords the advantage of scalability since the numerical complexity grows at a slower rate than that of the Delaunay method, and the foregoing technique therefore may be used with data sets having dimensions greater than those which are feasible with the Delaunay method. However, the foregoing technique may result in a surface of the overall interpolated function that is also no longer continuous. In addition, the search for a proper simplex may fail, and either linear extrapolation, the nearest neighbor approach, or another alternate action may be taken as described elsewhere herein.

What will now be described is an example of the foregoing technique. It should be noted that although this is a two-dimensional example, the techniques described herein may be applied to other dimensions. In this example, each data point in the database of experimental measurements consists of a two dimensional vector x(k) and the associated measured function value y(k). Suppose there are m=9 data points, given by:

$$x(1) = \begin{bmatrix} 0 \\ 0 \end{bmatrix}, y(1) = 0 \quad x(2) = \begin{bmatrix} 1.5 \\ 3 \end{bmatrix}, y(2) = 6 \quad x(3) = \begin{bmatrix} 0.5 \\ 4 \end{bmatrix}, y(3) = 4$$

$$x(4) = \begin{bmatrix} 3 \\ 5 \end{bmatrix}, y(4) = 17.5 \quad x(5) = \begin{bmatrix} 2 \\ 3 \end{bmatrix}, y(5) = 12 \quad x(6) = \begin{bmatrix} 1.5 \\ 1 \end{bmatrix}, y(6) = 2.0$$

$$x(7) = \begin{bmatrix} 1 \\ 1.5 \end{bmatrix}, y(7) = 2.25 \quad x(8) = \begin{bmatrix} 3 \\ 0 \end{bmatrix}, y(8) = 0 \quad x(9) = \begin{bmatrix} 0 \\ 5 \end{bmatrix}, y(9) = 2.5$$

Figure 4:
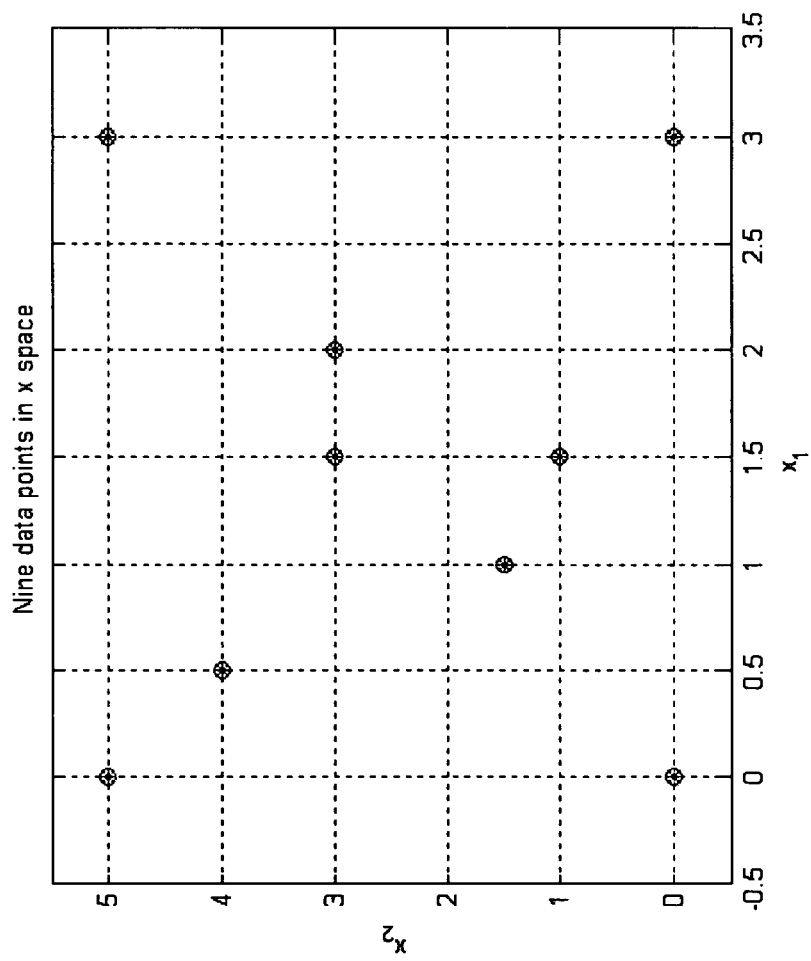
FIGS. 4-7 are graphical representations in connection with an example in which the method steps of FIGS. 1-2 are performed.
Figure 5:
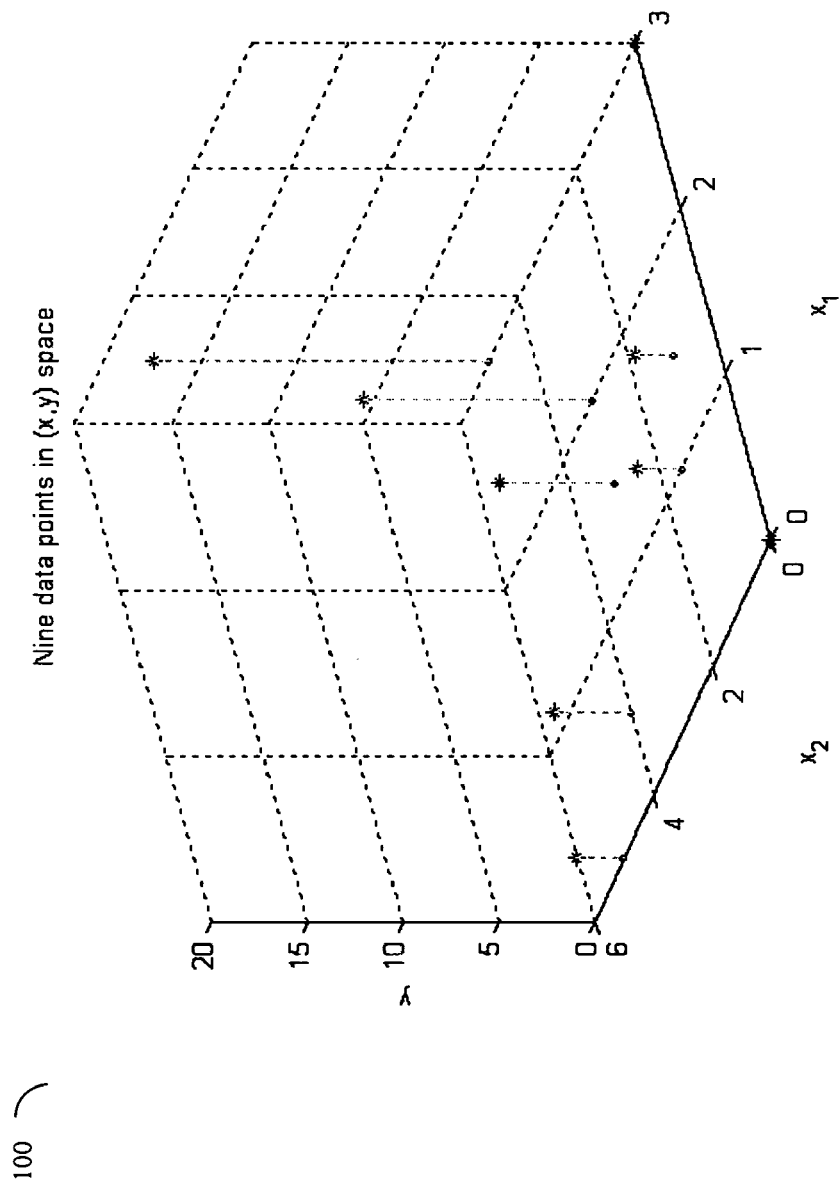

These data points x(k) are depicted in graph 80 of FIG. 4. A three dimensional graph of pairs (x(k), y(k)) is graph 100 of FIG. 5.

Using the foregoing data points, suppose the interpolated function value for $$\tilde{x} = \begin{bmatrix} 1.4 \\ 1.2 \end{bmatrix}$$

is to be computed using the methods steps set forth in the flowchart 10. The parameter K of the interpolation procedure is equal to K=2.

The distance between $\tilde{x}$ and every x(k): $d_k = \|\tilde{x} - x(k)\|$ is determined. These distances for the data points are:

$d_1 = \|\tilde{x} - x(1)\| = 1.9105$ $\quad d_2 = \|\tilde{x} - x(2)\| = 1.7029$ $\quad d_3 = \|\tilde{x} - x(3)\| = 2.8460$ $d_4 = \|\tilde{x} - x(4)\| = 4.0311$ $\quad d_5 = \|\tilde{x} - x(5)\| = 1.8028$ $\quad d_6 = \|\tilde{x} - x(6)\| = 0.3162$ $d_7 = \|\tilde{x} - x(7)\| = 0.4472$ $\quad d_8 = \|\tilde{x} - x(8)\| = 2.0616$ $\quad d_9 = \|\tilde{x} - x(9)\| = 3.9560$ This represents determining the distances described previously in processing steps 16, 26 and 28.

Through partial sorting of distances $d_k$, the n+K=4 lowest values of $d_k$ may be determined, and the corresponding n+K nearest neighbors of $\tilde{x}$ among x(k). The shortest distances among the nine values above are $d_6$, $d_7$, $d_2$, $d_5$. Therefore the four nearest neighbors of $\tilde{x}$ are denoted:

$$z(1) = x(6) = \begin{bmatrix} 1.5 \\ 1 \end{bmatrix} \quad z(2) = x(7) = \begin{bmatrix} 1 \\ 1.5 \end{bmatrix} \quad z(3) = x(2) = \begin{bmatrix} 1.5 \\ 3 \end{bmatrix} \quad z(4) = x(5) = \begin{bmatrix} 2 \\ 3 \end{bmatrix}$$

This represents processing of steps 18 and 20 as described in flowchart 10.

Iterations are performed over all combinations of n+1=3 points from among the n+K=4 selected nearest neighbors. The iterations are over the loop including the steps 24, 30, 32, and 34. In this case there are four such triples: (z(1), z(2), z(3)), (z(1), z(2), z(4)), (z(1), z(3), z(4)), (z(2), z(3), z(4)). Each of these triples are tested until it is determined that one form a simplex that encloses the point $\tilde{x}$. If there is no such triple, then alternate action may be taken as described elsewhere herein in connection with step 44.

For the first iteration, a first simplex, which in this instance is a triangle, has the following vertices:

$$v(1) = z(1) = \begin{bmatrix} 1.5 \\ 1 \end{bmatrix} \quad v(2) = z(2) = \begin{bmatrix} 1 \\ 1.5 \end{bmatrix} \quad v(3) = z(3) = \begin{bmatrix} 1.5 \\ 3 \end{bmatrix}$$

The origin of the coordinate system is shifted to v(1), as set forth in step 24. The vertices of the simplex with this new origin are:

$$\bar{v}(1) = v(1) - v(1) = \begin{bmatrix} 0 \\ 0 \end{bmatrix} \quad \bar{v}(2) = v(2) - v(1) = \begin{bmatrix} -0.5 \\ 0.5 \end{bmatrix} \quad \bar{v}(3) = v(3) - v(1) = \begin{bmatrix} 0 \\ 2 \end{bmatrix}$$

Additionally, the point at which interpolation is desired now becomes $$\bar{x} = \tilde{x} - v(1) = \begin{bmatrix} -0.1 \\ 0.2 \end{bmatrix}$$

As in step 30, an n by n matrix $$A = [v(2), v(3), K, v(n+1)] = [v(2), v(3)] = \begin{bmatrix} -0.5 & 0 \\ 0.5 & 2 \end{bmatrix}$$

is formed.

As in step 32, the linear equation $A a = \tilde{x}$ is solved for the unknown vector a. The solution in this example is a $$a = \begin{bmatrix} 0.2 \\ 0.05 \end{bmatrix}$$

In performing the determination if the point $\tilde{x}$ is within the boundaries of the simplex at step 34, it is determined if all components of a satisfy $a_i \geq 0$ and $\sum_{i=1}^{n} a_i = 0.25 \leq 1$. In this example, it is determined that the point $\tilde{x}$ lies inside the triangle formed by vertices $\bar{v}(1), \bar{v}(2), \bar{v}(3)$, or equivalently that the point $\tilde{x}$ lies inside the triangle formed by vertices v(1), v(2), v(3). The YES branch of step 34 is followed and control proceeds to step 36. Otherwise, if $\tilde{x}$ is determined not to be inside the simplex, control would have proceeds to step 40 for iteration 2 with the simplex v(1)=z(1), v(2)=z(2), v(3)=z(4)).

In connection with processing of step 36, values of the function at points v(j) are denoted as u(j), that is u(1)=2, u(2)=2.25, u(3)=6. In this instance, the following vector is formed:

$$u = \begin{bmatrix} 2 \\ 2.25 \\ 6 \end{bmatrix}.$$

An n+1 by n+1 matrix is also formed as:

$$B = \begin{bmatrix} v(1) & v(2) & v(3) \\ 1 & 1 & 1 \end{bmatrix} = \begin{bmatrix} 1.5 & 1 & 1.5 \\ 1 & 1.5 & 3 \\ 1 & 1 & 1 \end{bmatrix}$$

The vector u and the matrix B are used in solving the linear equation $b^T B = u^T$ for the unknown vector b. In this example, the result is $$b = \begin{bmatrix} 1.5 \\ 2 \\ -2.25 \end{bmatrix}$$

Processing continues with step 38 where the fitted linear function is evaluated at point $\tilde{x}$ to find the required value:

$$\tilde{y} = \sum_{i=1}^{n} b_i \tilde{x}_i + b_{n+1} = 1.5 * 1.4 + 2 * 1.2 - 2.25 = 2.25.$$

Figure 6:
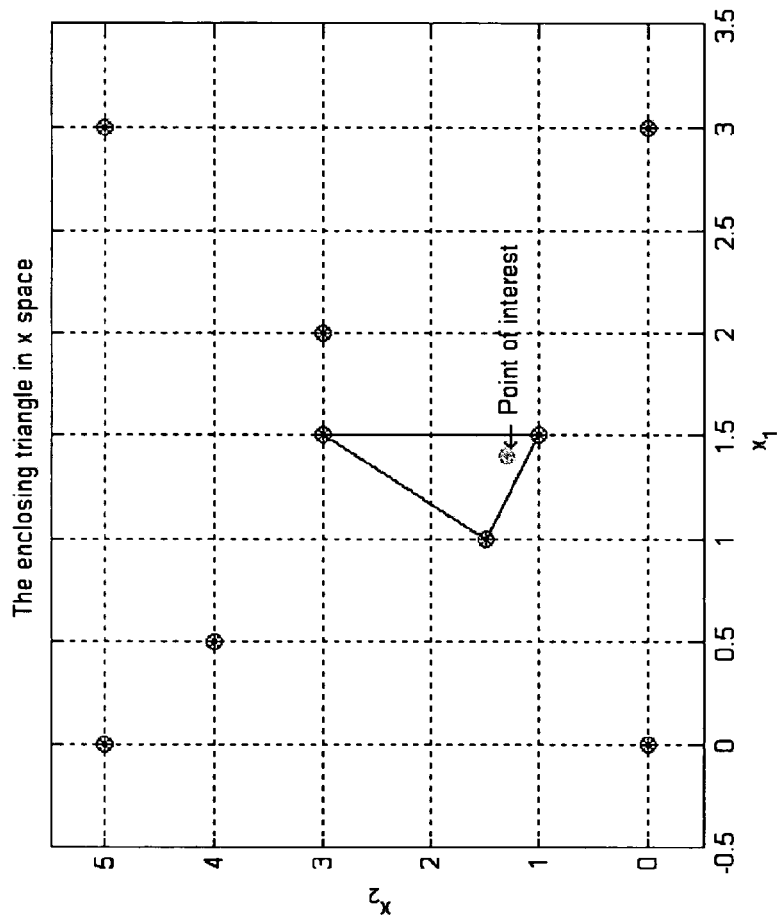
Figure 7:
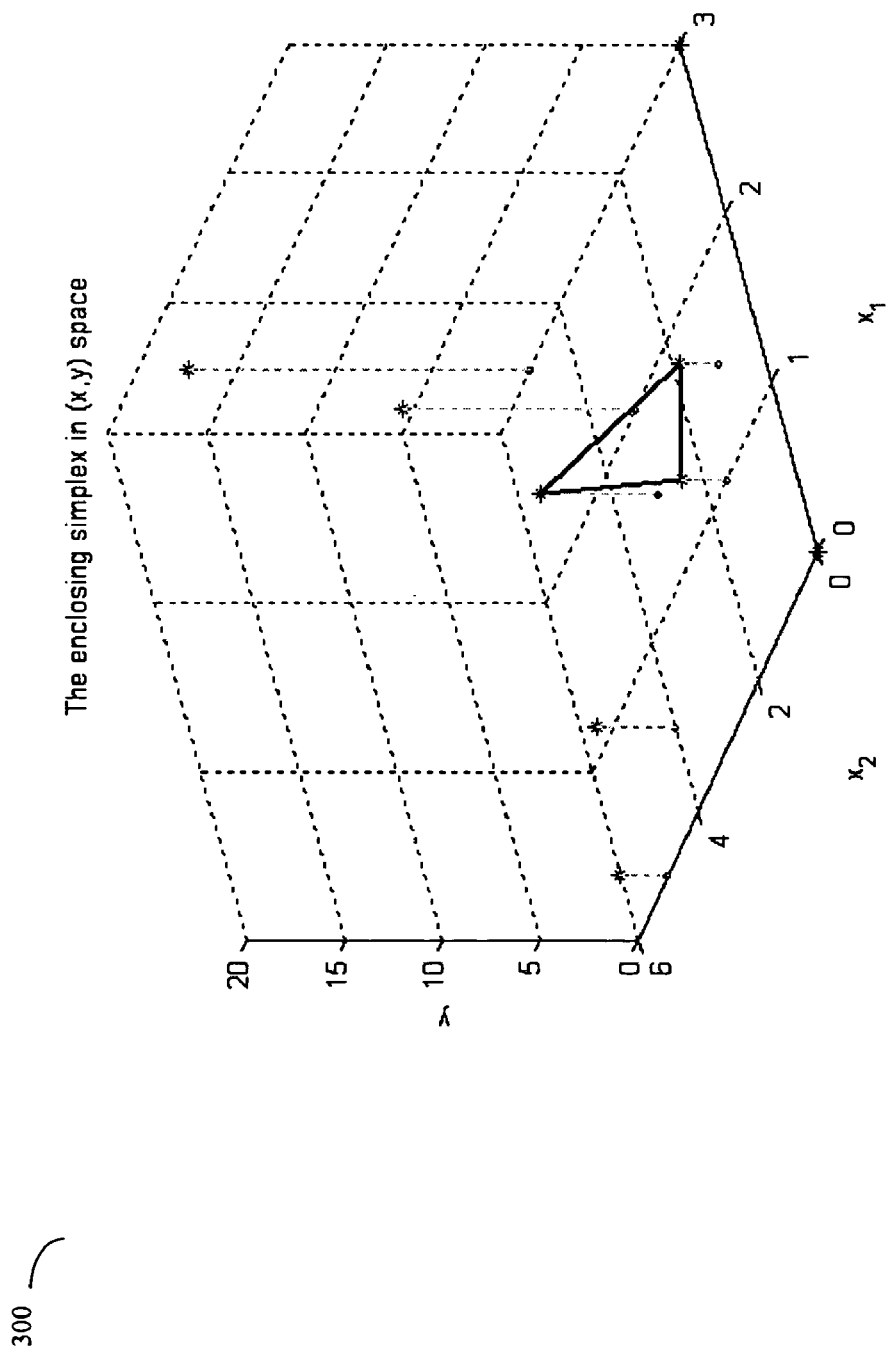

The final result of the interpolation procedure is that the interpolated function value at point $\tilde{x}$ is $f(\tilde{x}) = \tilde{y} = 2.25$. The simplex (triangle) that includes the point of interest $\tilde{x}$ is shown in the graph 200 of FIG. 6. The interpolating surface in the three-dimensional space is depicted in the graph 300 of FIG. 7.

Figure 8:
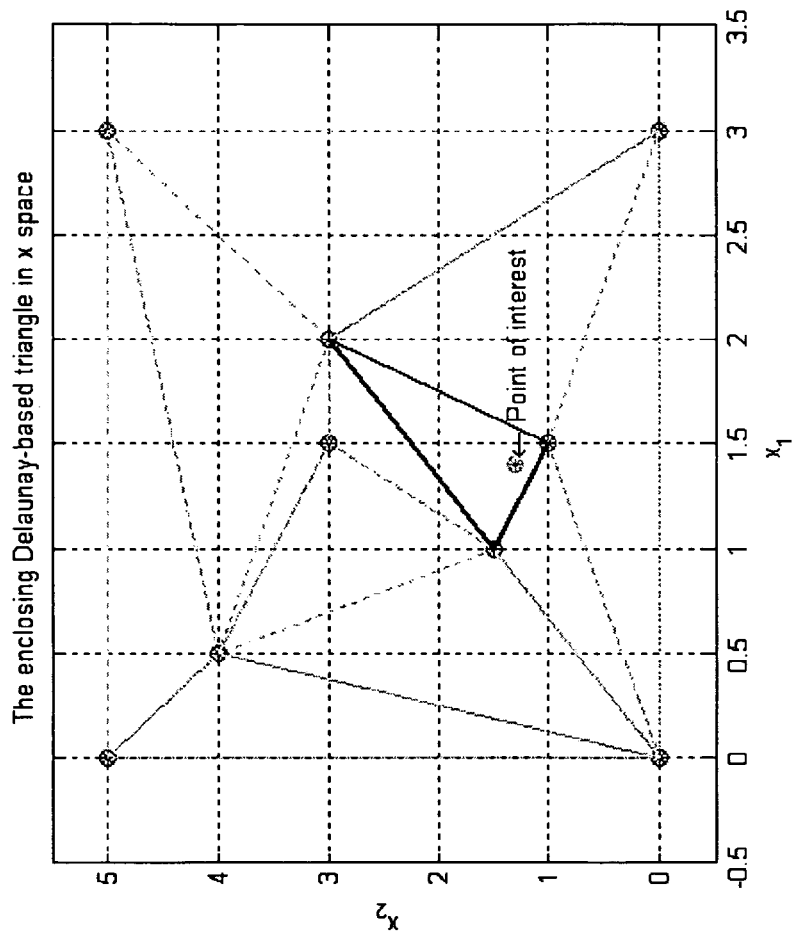
FIG. 8 is a graphical representation of a selected simplex for a point when the Delaunay technique is performed for the same point of interest as selected in the example of FIGS. 4-7.

Contrasting the foregoing technique with the Delaunay-based interpolation, the graph 400 of FIG. 8 shows the Delaunay triangulation of this data set with the enclosing triangle outlined. Note that the Delaunay technique selected a different triangle than the one described herein and the simplex selected by the Delaunay technique includes vertices that are not the three nearest neighbors of $\tilde{x}$.

Use of linear interpolation on this triangle leads to the function value $\tilde{y} = 2.46$. It should be noted that this resulting value is higher than the resulting interpolated value produced using the technique described herein. This illustrates the fact that with different choices of the enclosing triangle or other simplex, the interpolated function value may vary.

Figure 3:
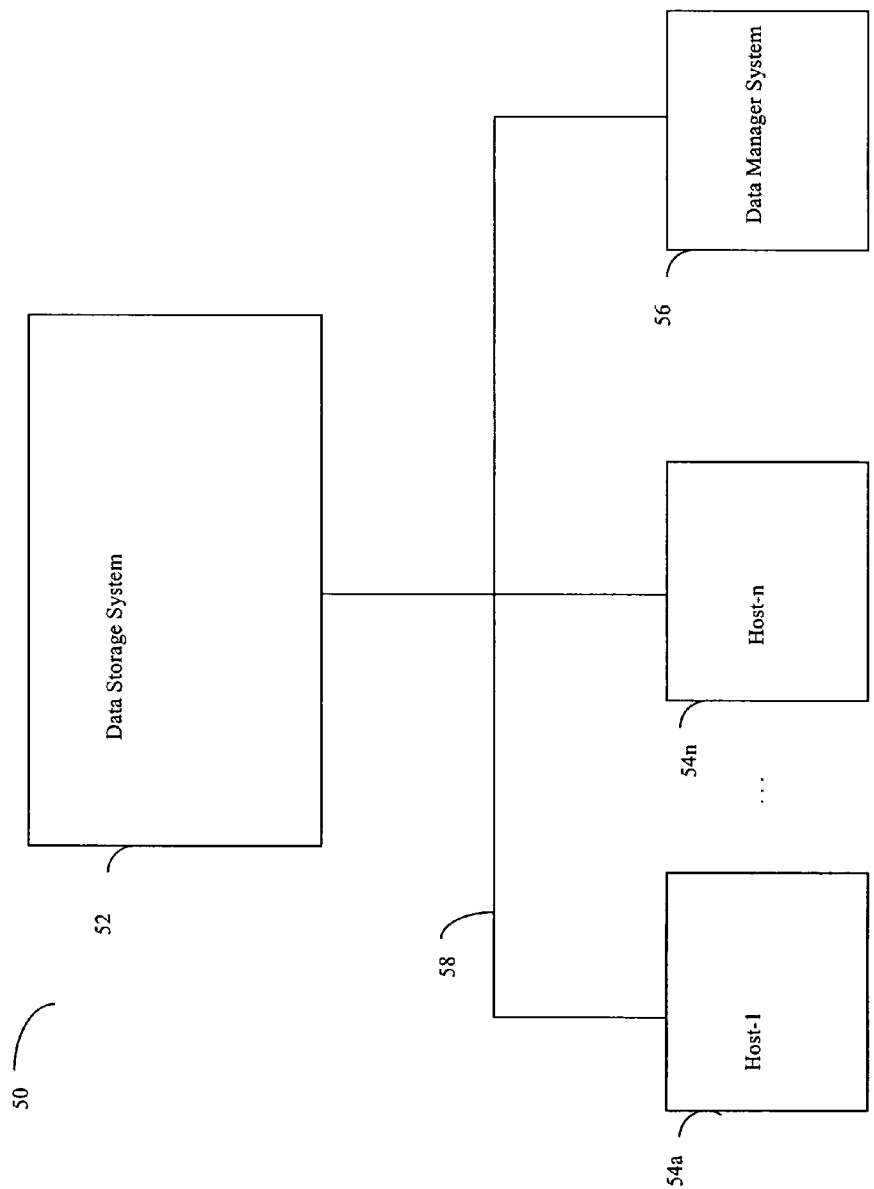
FIG. 3 is an example of an embodiment of a computer system in which the method steps of FIGS. 1-2 may be performed.

Referring now to FIG. 3, shown is an example of an embodiment of a computer system in which the foregoing interpolation technique may be executed. The computer system 50 includes a data storage system 52 connected to host systems 54a-54n, and a data manager system 56 through communication medium 58. In this embodiment of the computer system 50, the N hosts 54a-54n and the data manager system 56 may access the data storage system 52, for example, in performing input/output (I/O) operations or data requests. The communication medium 58 may be any one of a variety of networks or other type of communication connections as known to those skilled in the art. The communication medium 58 may be a network connection, bus, and/or other type of data link, such as a hardwire or other connections known in the art. For example, the communication medium 58 may be the Internet, an intranet, network or other connection(s) by which the host systems 54a-54n, and the data manager system may access and communicate with the data storage system 52, and may also communicate with others included in the computer system 50.

Each of the host systems 54a-54n, the data manager system 56, and the data storage system 52 included in the computer system 50 may be connected to the communication medium 58 by any one of a variety of connections as may be provided and supported in accordance with the type of communication medium 58. The processors included in the host computer systems 54a-54n and the data manager system 56 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 54a-54n and the data manager system 56, as well as those components that may be included in the data storage system 52 are described herein in more detail, and may vary with each particular embodiment. Each of the host computers 54a-54n, as well as the data manager system 56, may all be located at the same physical site, or, alternatively, may also be located in different physical locations. Examples of the communication medium that may be used to provide the different types of connections between the host computer systems, the data manager system, and the data storage system of the computer system 50 may use a variety of different communication protocols such as SCSI, ESCON, Fibre Channel, or GIGE (Gigabit Ethernet), and the like. Some or all of the connections by which the hosts, data manager system 56 and data storage system 52 may be connected to the communication medium 58 may pass through other communication devices, such as a Connectrix or other switching equipment that may exist such as a phone line, a repeater, a multiplexer or even a satellite.

Each of the host computer systems as well as the data manager system may perform different types of data operations in accordance with different tasks executing in each of the hosts. In the embodiment of FIG. 3, any one or more of the host computers 54a-54n may be executing instructions to perform the foregoing interpolation techniques. The host may subsequently issue a data request to the data storage system 52 to perform a data operation, for example, to retrieve experimental data and/or store generated interpolated data.

The data storage system may include any one or more data storage devices ranging from, for example, a single disk drive to a networked plurality of different types of data storage devices.

The instructions that may be executed by processors included in the host computers may be stored in any combination of hardware and/or software including, for example, machine executable instructions input from a read-only-memory (ROM), machine-language instructions stored on a data storage device in which the machine-language instructions have been generated using a language processor, software package, and the like.

Although the foregoing techniques may be used in connection with generating training data sets for use with neural networks using limited experimental data characterized as scattered and non-uniform, these same interpolation techniques may also be utilized with input data characterized as uniform. The foregoing interpolation techniques may use as input the limited experimental data to produce a more complete training data set uniformly covering a desired ranged of expected inputs. The neural networks may, for example, be used in connection with performing data fusion. The foregoing interpolation techniques are scalable for use with models having higher dimensions without incurring the limitations, such as associated computational and storage costs, that may be associated with existing techniques. The techniques described herein may also be used in generating data sets for verification of neural networks trained with limited experimental data. The interpolation techniques described herein are generally applicable for use with other applications in which existing interpolation techniques may be used to generate additional and more complete data.

One application of the foregoing techniques may be in an embodiment used to train a neural network. In one embodiment, a neural network may be trained to perform sensor fusion techniques using data generated with techniques as described herein. The neural network may be trained to estimate a quantity Y out of obtained measurements X1. . . Xn. The quantity Y being estimated may be, for example, an estimate of helicopter gross weight based on measured flight parameters. The helicopter gross weight may be determined, for example, as a sum of weights of an airframe, fuel, people, cargo, and the like. The measured flight parameters may include, for example, velocity, flight altitude, engine torque, and the like. In one embodiment, the independent variables may be the sensor measurements and the dependent variables may be the helicopter gross weight. In this application, the experimental data set may be smaller than desired to properly train the neural network. The experimental data may also, for example, include only discrete values of parameters of interest, such as, for example, flights at velocities of 100, 120, 140 and 160 knots. Obtaining data sets providing larger, more complete coverage may be costly, for example, since helicopter flights are expensive. To properly train the neural network, it may be desired to provide greater variability of the parameters in their entire range, for example, to avoid abnormal "oscillatory" behavior of the network in between training points. The experimental data set may be used with the techniques described herein to populate the input space with artificially created data points to ensure that the trained response between the actual measurement points behaves. The foregoing techniques described herein may be used to address overtraining by creating an intermediate model of the data using the interpolation techniques described herein and then accordingly training the neural network.

In another application, an embodiment may use the foregoing techniques in neural network verification. For example, as described in U.S. Pat. No. 6,473,746, which is incorporated by reference herein, a uniform grid of test points is used to verify the neural network. If such a uniform grid of test points is not available, the foregoing techniques described herein may be used to generate needed test points from available data points, which may be characterized as scattered. Use of such a uniform grid of test points may be desirable for neural network verification.

What will now be described is an embodiment of a system that may include neural nets. Training and/or verification of the neural nets may be performed with data generated utilizing the foregoing data generation techniques. It should be noted that, as described elsewhere herein, a neural network may be used to model various conditions. Part of effectively utilizing a neural network includes proper training and verification as well as other factors including, for example, properly selecting a neural network configuration and architecture. Additionally, as set forth in following paragraphs, the neural network may be used alone or in combination with other techniques and components, such as a Kalman filter, in a given system.

Figure 9:
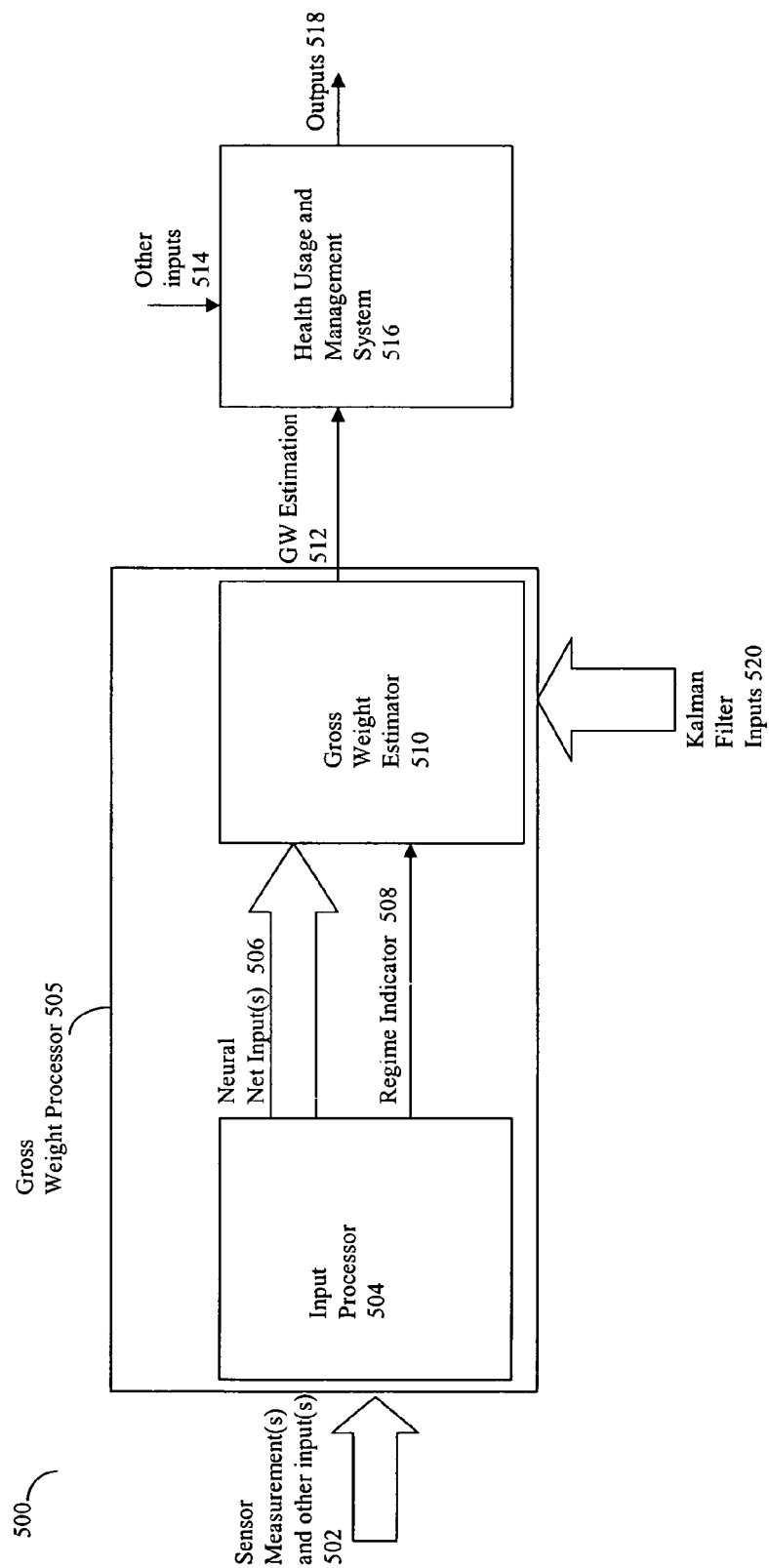
FIG. 9 is an example of a embodiment of a system that may be used in operation of an aircraft.

Referring now to FIG. 9, shown is an example of one embodiment of a system 500. The system 500 may be included onboard an aircraft, such as, for example, a helicopter. The system 500 in this example embodiment includes a gross weight processor 505 and a health and usage management system (HUMS) 516. The gross weight processor 505 produces as an output the gross weight estimation 512 which may be used in connection with other inputs 514 to the HUMS 516 to track the useful life of various components of the aircraft as well as predict with different levels of integrity premature parts failure of components within the aircraft. It should be noted that the gross weight estimation 512 of the gross weight processor 505 may be used in connection with other applications and components. The gross weight estimation 512 may be used as a sole input, or in combination with one or more other inputs, to the HUMS and other components as may be included in a particular embodiment.

It should be noted that the techniques described herein for gross weight estimation may be used in connection with other systems, such as fuel gauging. The particulars described herein should not be construed as a limitation of these techniques. The particular components included in a system may vary in accordance with each embodiment and/or application.

The gross weight processor 505 may be included onboard an aircraft and may also be in a location physically separate and apart from the HUMS system 516 or other components. The gross weight processor 505 may be located, for example, on an aircraft and may communicate data with other component(s) and/or system(s) located, for example, at a ground location. The gross weight processor 505 may also be located in a ground station and communicate with other components onboard an aircraft and on the ground.

Sensor measurements and other inputs 502 may be used by the gross weight processor 505 to produce the gross weight estimation 512. The sensor measurements and other inputs 502 may come from any one or more of a variety of different sources. For example, the sensor measurements may be obtained using sensors onboard an aircraft including the gross weight processor 505. The other inputs may include, for example, manual input from the crew, previously obtained data or data stored on a data storage device on the aircraft, data stored remotely with respect to the aircraft, data from a configuration file, data stored in a form of memory, such as a RAM, ROM, or PROM, and the like.

In an embodiment in which the gross weight processor 505 communicates with other components and/or systems not physically co-located with the gross weight processor 505, data may be transmitted therebetween using any one of a variety of known communication techniques possibly using one or more other communication devices.

Included within one embodiment of the gross weight processor 505 is an input processor 504 and a gross weight estimator 510. The input processor 504 in one embodiment takes as inputs the sensor measurements and other inputs 502, and produces as outputs one or more neural net inputs 506 and a regime indicator 508. The neural net inputs 506 and regime indicator 508 are input to the gross weight estimator 510 along with Kalman filter inputs 520 to produce a gross weight estimation output 512. The input processor 504 in this embodiment may use one or more of the sensor measurements and other inputs 502 to produce one or more derived values based thereon. One or more derived values as well as one or more of the actual inputs 502 may be used as an input to the neural net 506. Additionally, in this embodiment, the input processor 504 also determines a particular flight regime in accordance with particular inputs 502. The particular regime selected by the input processor 504 is indicated as an output on the regime indicator output 508. The input processor 504 may use some or all of the inputs 502 in connection with determining a particular regime and the neural net inputs 506. The particular portion of the inputs 502 used to produce the neural net inputs 506 and the regime indicator 508 may vary in an embodiment.

The regime indicator 508 is a determination of the aircraft's current flight regime in accordance with the one or more inputs. As known in the art, a regime is associated with different flight states of the aircraft based on one or more aircraft parameters. For example, an embodiment may define hover as a first regime, steady state forward flight as a second regime and so on. The particular flight state of an aircraft may be determined based on measurements and/or other inputs 502.

The gross weight estimator 510, as will be described in more detail in following paragraphs along with other components of the system 500, may include a Kalman filter and one or more neural nets.

Figure 10:
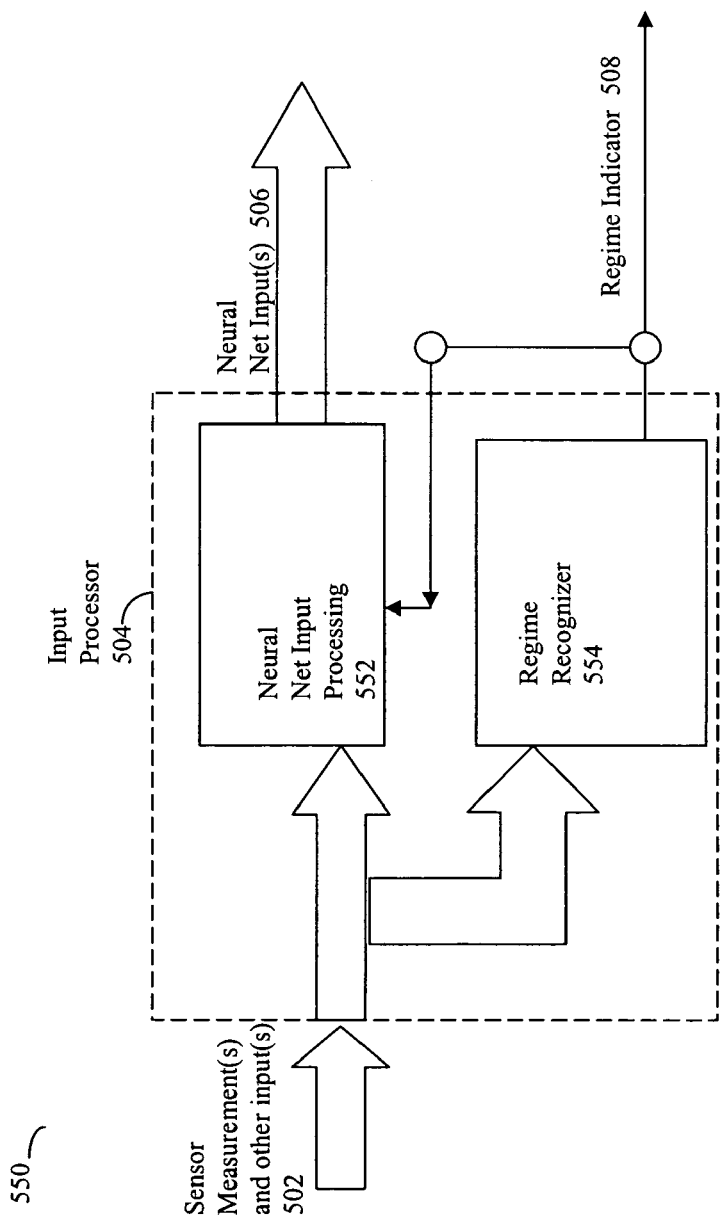
FIG. 10 is a more detailed description of one embodiment of the input processor included in the system of FIG. 9.

Referring now to FIG. 10, shown is an example 550 depicting more detail of one embodiment of the input processor 504 previously described in connection with FIG. 9. In one embodiment of the input processor 504, a neural net input processing component 552 and a regime recognizer 554 may be included. All or a portion of the sensor measurements and other inputs 502 may be used by the neural net input processing 552. Similarly, all or a portion of the sensor measurements and other inputs 502 may be input to the regime recognizer 554. In this embodiment, the regime recognizer 554 produces as an output the regime indicator 508. The neural net input processing component 552 produces as an output one or more neural net inputs 506. In this embodiment, the regime indicator output produced by the regime recognizer may also serve as a selection input to the neural net input processing 552. As described in more detail in following paragraphs, the neural net inputs may vary in accordance with the particular neural net selected based on the regime indicator. Thus, the regime indicator may also be an input to the neural net input processing 552 which generates the neural net inputs 506. In an embodiment in which the inputs to all the neural nets are the same, the regime indicator output may be omitted as an input to the neural net input processing 552.

It should be noted that although these two components, the regime recognizer 554 and neural net input processing 554, are shown structurally as two different components, an embodiment may include processing associated with the components 552 and 554 within a single structural component. It should also be noted that an embodiment may associate functionality with one or more of the components 552 and 554 with other arrangements than as described herein.

It should also be noted that a particular regime may be selected using a predefined function or regime mapping described in more detail elsewhere herein. The predefined mapping may be implemented, for example, using a programming language and logic statements or other expressions of the regime mapping. An embodiment may also determine a regime based on manual selection or input, for example, from a crew member.

Figure 11:
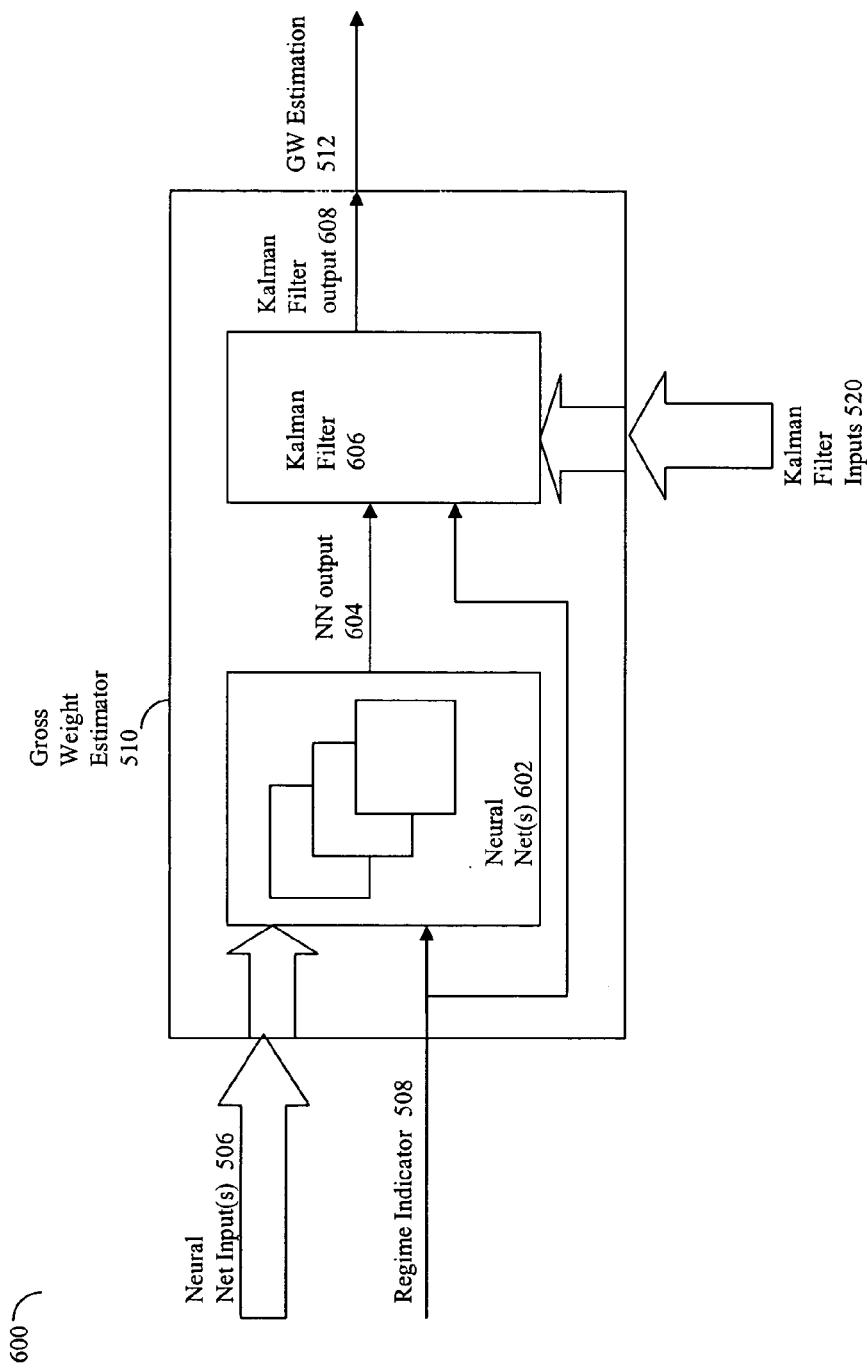
FIG. 11 is a more detailed description of one embodiment of gross weight estimator included in the system of FIG. 9.

Referring now to FIG. 11, shown is an example 600 of more detail of one embodiment of the gross weight estimator 510 previously described in connection with FIG. 9. In this embodiment, the gross weight estimator 510 includes one or more neural nets 602 and a Kalman filter 606. One or more of the neural nets 602 may be selected in accordance with the regime indicator 508 to process the neural net inputs 506. In this particular embodiment, different neural nets have been trained in accordance with differing flight regimes. Accordingly, depending on the particular flight regime of the aircraft at a point in time as indicated by the regime indicator 508, one or more specifically trained neural nets 602 may be selected to process the neural net inputs 506. The one or more neural nets selected from 602 produce one or more neural net outputs 604. In this embodiment, the neural net output 604 is a first estimation of the gross weight of the aircraft. An embodiment of the Kalman filter 606 may include as inputs the neural net output gross weight estimation 604 and other Kalman filter inputs 520 to produce a Kalman filter output 608 which is a second gross weight estimation 512. In the embodiment of the gross weight estimator 510 shown in FIG. 11, the neural net output 604 may be characterized as an intermediate gross weight estimate which may be further refined by the Kalman filter 606 in accordance with other Kalman filter inputs 520 to produce a final gross weight estimation 512 as an output of the gross weight estimator 510.

It should be noted that one or more neural net outputs 604 may be produced by the neural nets 602 and used as values input to the Kalman filter 606. For example, if two particular neural nets are trained in accordance with a particular selected flight regime, those two selected neural nets may each produce a single output. Both of the neural net outputs may be used as inputs to the Kalman filter 606. An embodiment may also combine one or more outputs of the neural net 602 selected in accordance with a regime indicator 508 as a single signal 604 used as an input to the Kalman filter 606. As will be described in more detail in following paragraphs, the Kalman filter 606 may be characterized as a data fusion module or component blending together one or more neural net outputs 604 with one or more Kalman filter inputs 520 to produce a gross weight estimation 512.

It should be noted that the regime indicator may also serve as an input to the Kalman filter in an embodiment since one or more values used in connection with the Kalman filter may vary in accordance with the particular regime selected. Note that this is described in more detail elsewhere herein.

It should be noted that although the embodiment of the gross weight estimator 510 shown in FIG. 11 includes both one or more neural nets 602 and a Kalman filter 606, an embodiment may include one or more neural nets alone 602 without the Kalman filter. Additionally, an embodiment of a gross weight estimator may include just a Kalman filter 606 without including any neural nets. An embodiment may also include one or both of the foregoing in combination with other components use to produce a gross weight output. It is known that a large amount of data may be used to properly train one or more neural nets. Additionally, the data used to train and/or verify a neural net for a particular regime may not be readily available for training and/or verification purposes. In such instances, it may be desirable to use an alternate technique in connection with estimating the gross weight of the aircraft, or alternatively augment the gross weight estimate output by a neural net. In one embodiment, for example, it may be known that the gross weight estimate produced by a neural net has an associated low rate of accuracy and reliability due to the amount and/or type of training and/or verification data. In this instance, the Kalman filter 606 may use the intermediate gross weight estimate (604) using a weighting factor to take into account a less than desirable degree of reliability. The Kalman filter may then use the neural net's gross weight estimate, in connection with other inputs, to produce a revised gross weight estimate.

An embodiment that includes both one or more neural nets as well as a Kalman filter may also include a hardware or software switching mechanism that enables and also appropriately disables one or more of the neural nets 602 and Kalman filter 606. Such a switching mechanism may be, for example, set manually or automatically.

Additional details about the components and techniques that may be used in an embodiment of the gross weight estimator 510 are described elsewhere herein.

Figure 12:
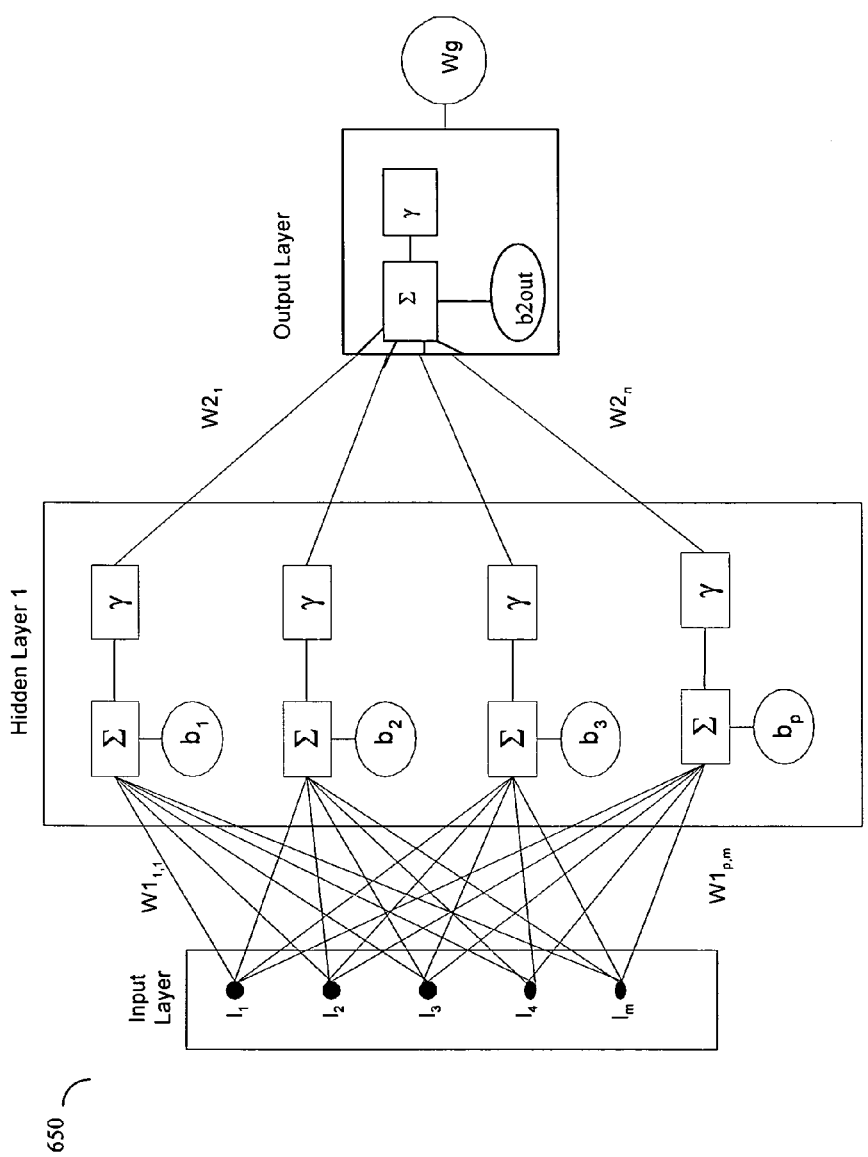
FIG. 12 is an example of one embodiment of a neural net that may be included in the gross weight estimator of FIG. 11.

Referring now to FIG. 12, shown is one example of an embodiment 650 of a neural net that may be included in a gross weight estimator 510. In connection with FIG. 12, other figures, and paragraphs included herein, the following notation may be used:

Symbols $a_x$ longitudinal acceleration, $a_z$ vertical acceleration, bn nth layer bias for a neural net (NN)

$b_W$ weight bias

H measurement transformation matrix h altitude

IAS indicated airspeed

OAT outside air temperature

Q process noise covariance matrix

Q engine torque

R measurement covariance matrix

ROC Rate of Climb

V airspeed $W_g$ gross weight $W_{gmax}$ maximum gross weight $W_H$ weight calculated at hover Wn nth layer weighting for NN $W_S$ summed gross weight w process noise $w_f$ fuel flowrate x state vector z measurement vector or input vector Δt time step ø state transition matrix Φ roll attitude Θ pitch attitude ν measurement noise Subscripts i, j, k elements of a vector m, n elements of a matrix Superscripts T transpose Referring back to FIG. 12, the neural network 650 may be characterized as a feedforward neural network with a single hidden layer. The neural network 650 includes an input layer in which each input is connected to each neuron of the hidden layer. One embodiment of the neural net 650 uses as its activation function associated with each of the neurons of the hidden layer the hyperbolic tangent (tanh) function. It should be noted that although the embodiment 650 shown in FIG. 12 contains a single hidden layer, an embodiment of a neural network used in the gross weight estimator 510 may include a different number of hidden layers as well as a different number of neurons than as shown in the embodiment 650. Similarly, an embodiment may also include other variations of a neural network than as described herein such as, for example, using a different activation function, providing for different interconnections between the input layer and the hidden layer as well as in between one or more hidden layers. The particular neural network shown in the embodiment 650 of FIG. 12 should not be construed as a limitation of the techniques described here in connection with determining the gross weight of an aircraft.

The neural nets 602 used within an embodiment of the gross weight estimator 510 may be selected from a pool of pre-trained neural networks. The particular neural nets 602 included in an embodiment of the gross estimator 510 may be determined as those neural networks providing the best estimate of gross weight for one or more particular flight regimes. Training of one or more static feedforward neural networks may be used to represent deterministic mappings for which a gross weight estimation by itself may be determined as an output value of the gross weight estimator 510. The neural nets 602 used in the gross weight estimator 510 may be trained off line prior to use. Subsequently, the one or more neural nets 602 may be operated and used on line, such as when an aircraft is in flight, to determine the gross weight of the aircraft. In other words, the particular neural nets 602 included in one embodiment of the gross weight estimator 510 are not trained on line and do not use any adaptive technique. The neural net weights determined during the offline training phase are fixed and used in subsequent on line operations of the gross weight estimator 510 such that if the same input vector is used with a neural network multiple times, the neural network produces the same output exhibiting deterministic behavior.

Figure 13:
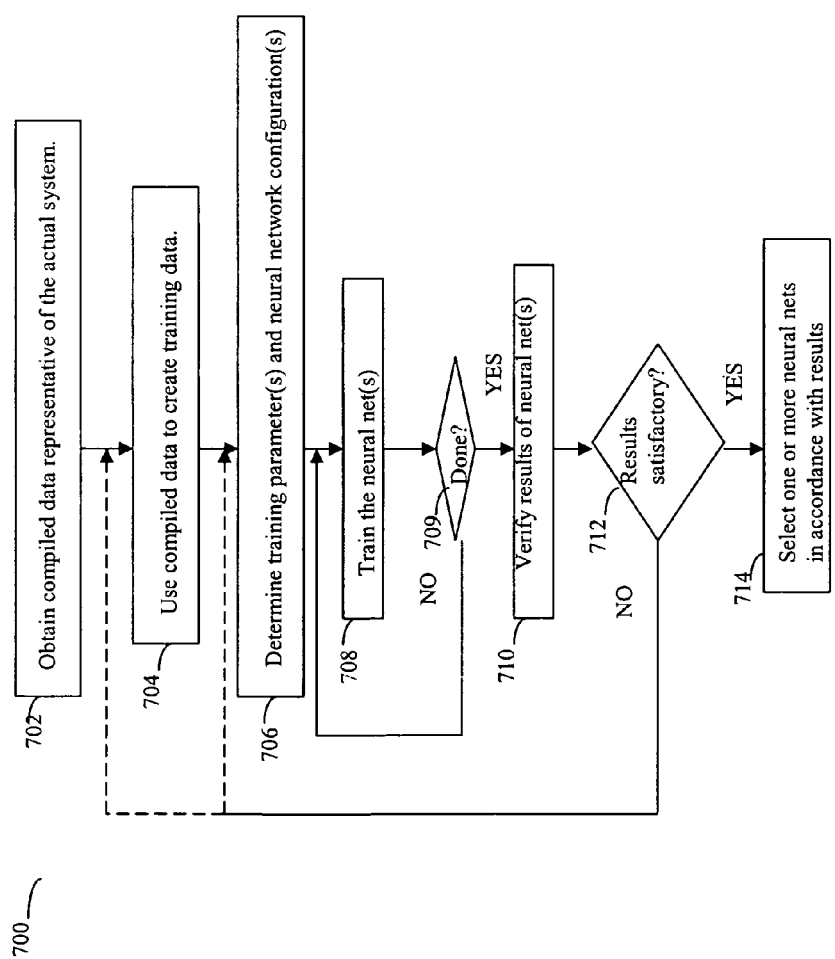
FIG. 13 is a flowchart of processing steps of one embodiment used in training, verification, and selecting one or more neural nets included in the gross weight estimator of FIG. 11.

Referring now to FIG. 13, shown is a flowchart 700 of steps that may be performed off line prior to operation of the gross weight estimator 510 in determining the aircraft's gross weight. The steps of flowchart 700 may be performed for one or more neural nets associated with one or more particular flight regimes. At step 702, compiled data representative of the actual system may be obtained. This compiled data may be, for example, from previous data acquisitions during operation of the aircraft in one or more different flight regimes. The compiled data may represent only a portion of the data actually used to train and or verify a neural net in subsequent processing steps. The compiled data may also come from experimentally generated data, such as in connection with a model. At step 704, the compiled data may be used in connection with creating training data. Any one of a variety of different techniques may be used in connection with creating the training data including, for example, one or more interpolation techniques as described elsewhere herein. At step 706, the one or more training parameters and appropriate neural network configurations may be determined. In one embodiment, multiple neural networks may be determined for one or more particular flight regimes, and one or more training parameters selected. At step 708, the one or more neural networks may be trained. At step 709, a determination is made as to whether the neural network training is done. This determination may be performed, for example, with a reserved portion of the training data as described elsewhere herein in more detail. Step 709 may be characterized as a first level determination as to whether the neural net training has been successful. If not, control proceeds to step 708 for further training. Otherwise, control processed to step 710 for verification. Step 709 processing may include, for example, determining if the neural net results for a predetermined number of iterations appear to be converging within a predetermined threshold. From step 710, control proceeds to step 712 where a determination is made as whether the neural net results of the one or more known networks for each particular flight regime are determined to be satisfactory. If so, control proceeds to 714 where one or more of the neural networks may be evaluated and selected as the ones to be used in connection with the gross weight estimator 510. For example, at step 714, one or more of the neural networks trained for a particular flight regime may be evaluated as "best" in accordance with various criteria. The criteria may include, for example, minimizing the root mean square (RMS) error between desired and actual output. At step 712, results may be determined as "satisfactory", for example, if one or more neural nets produce results that converge within predetermined limits for the verification data testing. Additionally, an embodiment may determine that results are "satisfactory" if all of the error indicators associated with each net are clustered together within a certain amount of one another such that the overall variance of all results is within a predetermined amount. The particular criteria with a determination of "satisfactory" used at step 712 may vary with each embodiment. In one embodiment, the RMS error may be determined using the actual gross weight as determined by the neural network and the actual gross weight. It should be noted that the actual gross weight may be determined, for example, by adding together known values of helicopter weight, fuel, and the like.

If it is determined at step 712 that the results are not satisfactory as produced by the verification step, control may return to either step 706 or 704 in an embodiment. Any one or more different elements used in determining the neural nets of step 714 may be adjusted. For example, the particular training parameters may be varied. The actual architecture of the neural network as well as activation functions used therein may be varied. Additional training data may be generated or checked for bad data in accordance with one or more verification techniques. An embodiment may perform any one or more of the foregoing as well as other well known variations to produce the one or more trained nets of step 714. Once one or more adjustments have been made in connection with the data, parameters and/or network configurations associated with the neural networks, the neural networks may be retrained and re-evaluated until the results are satisfactory as determined at step 712. Once the neural networks that have been trained in accordance with one or more particular flight regimes produce satisfactory results, the weight and bias vectors associated with a particular neural network may be fixed as a result of training and verification, and may be used in connection with the gross weight estimator 510 for a particular associated flight regime. Additional details of the processing steps are described in more detail elsewhere herein.

In one embodiment, data used with the neural net training and/or verification of flowchart 700 may be gathered from an existing database of an SH-60B helicopter flight test data representing a 20,000 lb max gross weight ($W_{gmax}$) twin engine helicopter with various pilots. To reduce the number of neural net inputs, mathematical and physical relationships in the measured data may also be used to generate data reduction functions. In one embodiment, information from 9 sensors may be gathered and used to derive 5 neural net inputs. Sensed data may include both engine torques ($Q_1$, $Q_2$), Outside Air Temperature (OAT), pressure altitude (Hp), Indicated Airspeed (IAS), Rate of Climb (ROC), vertical acceleration ($a_z$), pitch attitude ($\Theta$)), and roll attitude ($\phi$).

It should be noted that the particular neural net inputs used in producing a gross weight estimation may vary in accordance with a particular regime definition. For example, for the steady state forward flight regime, attitudes (Roll and Pitch) may not be used as neural net inputs due to the nature of the regime criteria, reducing the number of neural net inputs for this regime to five (5). However, an embodiment may use these as neural net inputs directly or in connection with producing a derived parameter which is a neural net input as described elsewhere herein in more detail.

The regime recognizer 554 illustrated in the on-line system of FIG. 10 may also be used in identifying what sets or vectors of training data may be used with a particular regime. In other words, the regime recognizer 554 may be used in both the off-line processing to produce the trained neural nets, and the on-line processing system 500 of FIG. 9. In connection with the off-line processing of step 706 of the flowchart 700, a particular set of data may be input to the regime recognizer 554 to determine the regime corresponding to the input data. One embodiment of the regime recognizer takes "v" aircraft parameters, such as attitudes, accelerations, velocities, Weight On Wheels (WOW), and the like, and divides the input space formed by these "v" parameters into a matrix of subspaces assigning a regime to each subspace.

Referring now to FIGS. 14-16, shown are examples of the regimes that may be defined in one embodiment as used by a regime recognizer. It should be noted that in one embodiment described herein in connection with FIG. 14-16, the regime definitions may be characterized as "effective regimes" in which each "effective regime" includes one or more "actual regimes". This may occur in an embodiment, for example, if each of the actual regimes included in an effective regime may use the same one or more trained neural nets. In an embodiment as described herein, an effective regime is a set union of all the designated actual regimes.

Referring now to FIG. 14, an embodiment of a definition of the steady state hover regime is illustrated in accordance with the flight parameters of the table 820. The WOW (weight on wheels) flag with a value of true or 1 indicates that the aircraft is on the ground. In arrangement, the WOW may be a switch set in accordance with a deflection in wheel struts. The particular technique used in determining the WOW flag may vary in accordance with the particular aircraft. With reference to the drift velocity and ground airspeed in table 820 and elsewhere herein, the units are in knots. The control reversal flag indicates whether the aircraft has made a movement from one direction to another returning to the original position. Such a movement may be made, for example, by a pilot in reaction to a gust loading.

It should be noted that in reading the data contained in tables of FIGS. 14-16, the some parameters appear in two rows of a table. This is to specify that the parameter range of values is formed by logically ORing the ranges specified with each row in the table. For example, in table 820, the Yaw rate for the hover regime is defined as those values which are both less than or equal to 2.5 and also greater than or equal to −2.5, inclusively.

The hysteresis column of data in each of the tables of FIGS. 14-16 includes a value of NONE or a numeric value. The hysteresis value may be used in the actual on-line system in determining a flight regime indicator in real time, such as when used in the on-line processing. Values of flight parameters obtained in real time may not behave in a consistent fashion once a particular regime has been entered. For example, a parameter value may increase in accordance with one mathematical representation. However, as the value decreases, the same function or representation may not apply. As such, a parameter value which changes in small amounts close to a regime border condition may cause the regime definition to constantly change if hysteresis of the appropriate parameter(s) is not taken into consideration. Referring to the hover regime of table 820, one embodiment determines that hysteresis is taken into account for only the calibrated air speed. The value, 5, included in the table 820 for the calibrated airspeed hysteresis factor specifies that once the regime indicator determines that at a time t=n the hover regime is entered, the regime indicator value does not change for values of threshold+the hysteresis value (38+5, or 43) in this instance. In order to change regimes based on the calibrated airspeed parameter value once in the hover regime, the calibrated airspeed must be more than 43 knots.

It should be noted that in this embodiment, the attitudes are in degree units, the airspeed is in knots, the yaw rate is in degrees/second, and the ROC is in feet/minute.

Referring now to FIG. 15, an embodiment of a definition of the steady state forward flight regime is illustrated in accordance with the flight parameters of the table 840.

Referring now to FIG. 16, an embodiment of a definition of the turn regime is illustrated in accordance with the flight parameters of the table 860.

Other embodiments may use other regime definitions than as described herein. The foregoing regimes may be implemented in an embodiment of a regime recognizer as sets of conditionals, i.e. set of discrete and floating point comparisons combined with logical conditions. At any single point in time, only one regime is valid. Another way of stating this is that each regime is mutually exclusive from the other regimes so that, any given input vector of flight parameters maps to only a single regime. The parameters used to define a regime space may vary based on the platform. How the entire input space is broken into subspaces, the regimes to be detected, may vary with each embodiment and particulars associated therewith. For example, the regimes may vary with aircraft manufacturer. Additional parameters used to define an actual or effective regime may be added, or also varied from those specified for a particular platform by a particular embodiment. The parameters described herein, for example, may be used with the Navy SH-60B helicopter and an embodiment of a HUMS system as illustrated in FIG. 9.

What will now be described are the "actual regimes" comprising each of the "effective regimes" used in one embodiment. In one embodiment, three effective regimes may be used: hover, forward flight, and turn, as illustrated and described elsewhere herein in connection with FIGS. 14-16. In one embodiment, it was determined that no more than five neural net inputs for any regime may be used. The particular number of neural net inputs may vary as described elsewhere herein. In one embodiment, for example, the number of neural net inputs considered was limited by the Neural Net toolbox of Matlab. Other embodiments may have other limitations and considerations in connection with selection of the number of neural net inputs as well as the neural net inputs themselves. In this embodiment, the flight envelop of possible regimes may be partitioned so that the neural nets may successfully converge on a gross weight estimate with a reasonable confidence. An embodiment for an SH-60B helicopter platform may do this by reducing the existing regime set (of "actual" regimes) into higher level ("effective") regimes. The neural net inputs that may be included in an embodiment are described in more detail elsewhere herein.

Figure 17:
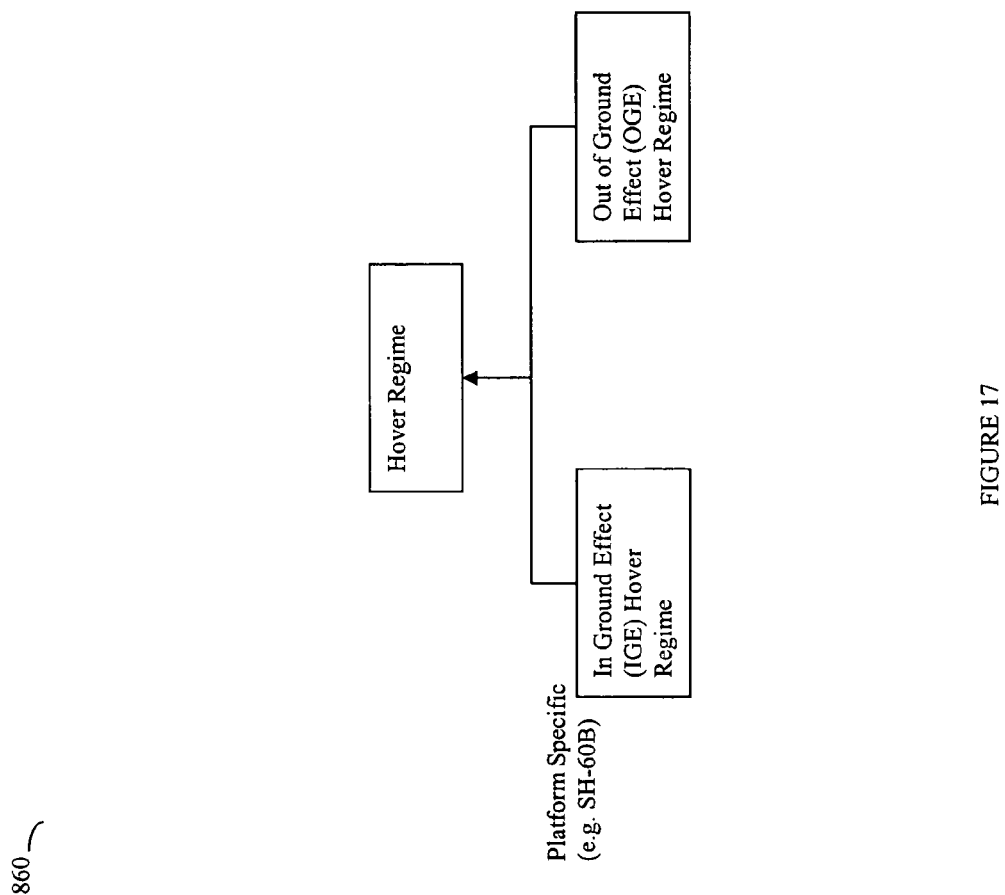
FIG. 17 is an example illustration of actual regimes that may be included in a single effective hover regime in one embodiment.

Referring now to FIG. 17, shown is an example 860 illustrating how multiple actual hover regimes are mapped to a single effective hover regime that may be included in one embodiment. It should be noted that the hover effective regime is described in connection with FIG. 14 elsewhere herein. The particular actual regimes and effective regimes included in an embodiment may vary with platform and other particulars of each embodiment.

Regarding the effective hover regime defined herein, two actual regimes, the inground effect (IGE) and out of ground effect (OGE), may be combined into a single effective regime in an embodiment. In this embodiment, the neural net for the effective hover regime may take into account for any effects between the IGE and OGE by introducing radar altitude, such as height above ground level, as a parameter. As known to those of ordinary skill in the art, ground effect is an aerodynamic and rotordynamic concept. The outcome of IGE is a reduction of power required for net lift. Whether an aircraft is in the state of IGE or OGE may be estimated based on height above ground level, such as altitude, and may also vary with the diameter of the main rotor of the aircraft.

Referring now to FIGS. 18-27, shown are examples of multiple actual fast forward regimes that may be mapped to a single effective fast forward flight regime that may be included in one embodiment. It should be noted that the fast forward effective regime is described in connection with FIG. 15 elsewhere herein.

Referring now to FIGS. 28-29, shown are examples of multiple actual turn regimes that may be mapped to a single effective turn flight regime that may be included in one embodiment. It should be noted that the turn effective regime is described in connection with FIG. 16 elsewhere herein. It should be noted as used herein, AOB refers to "angle of bank".

The foregoing definitions of actual and effective regimes may be used in an embodiment of the regime recognizer 554 to output a regime recognizer indicator 508. It should be noted that an embodiment may include a default or catchall regime which is the selected regime in the event that no other regime criteria are met. The regime recognizer in an embodiment may include any type of regime mapping. However, a regime needs to be defined for the range of possible inputs. An embodiment may also combine a manual selection technique with the use of an automated or pre-defined mapping function for regime selection.

It should also be noted that the foregoing regime definitions may be mapped to other regime definitions when the gross weight output, as produced using techniques described herein, is used as an input to other systems and/or components, such as an HUMS.

In one embodiment to reduce the number of neural net inputs, the following derived parameters are calculated from mathematical and physical relationships in the measured data:

Corrected Vertical Acceleration ($cN_z$)   NN INPUT 1

$$cN_z = 1 + N_z - \left(\frac{1}{\cos[\phi]}\right)$$

Where $N_Z$ is Vertical Acceleration

Ø is Roll Attitude

Torque Coefficient ($Cq$)   NN INPUT 2

$$Cq = \frac{Q}{\rho A (\Omega R)^2}$$
$$= \frac{412.0/100.0 * (Eng1Q + Eng2Q)/2.0}{.00237769 * \sigma * \pi R^2 * \left(2 * \pi * \frac{Nr}{100} * \frac{257.887}{60} * R\right)^2}$$

Where

Q is total torque (RPM)

$\rho$ is density (lb-sec$^2$/ft$^4$)

A is the area of the main rotor disc (ft$^2$)

$\Omega$ is the rotation speed of the rotor (rad/s)

R is the radius of the main rotor disc (ft)

Nr is the main rotor speed (%)

$\sigma$ is the density ratio

Advance Ratio ($\mu$)   NN INPUT 3

$$\mu = \frac{V}{\Omega R} = \frac{KIAS * 1.6890}{2 * \pi * \frac{Nr}{100} * \frac{257.887}{60}}$$

Where

KIAS is indicated airspeed in knots

Climb rate over tip speed ($\mu_c$)   NN INPUT 4

$$\mu_c = \frac{V_c}{\Omega R} = \frac{ROC/60}{2 * \pi * \frac{Nr}{100} * \frac{257.887}{60}}$$

Where
  ROC is rate of climb (ft/min)

Density Ratio ($\sigma$)  NN INPUT 5

$$\sigma = 0.0023769 * \left(\frac{288.15}{OAT + 273.15}\right) * \left(1 - \left(0.0019812 * \frac{Hp}{288.15}\right)\right)^{5.256}$$

Where
  OAT is outside air temperature (° C.)
  Hp is Barometric Altitude (ft)

The foregoing parameters, together with Roll Attitude and Pitch Attitude (when attitude is a factor) may be used as inputs to the appropriate neural net in accordance with the selected flight regime.

In connection with obtaining the data in step 702 of FIG. 13, an embodiment may also remove invalid data using data quality checks. These data quality checks may include, for example, discarding "stale data" not received from a bus within a predetermined time period, such as 3 seconds, data out of a predefined range or rate of change, data which may be indicated as invalid from another source, and the like. In one embodiment, the data may be aligned to a once per second frame.

In connection with step 704 of FIG. 13, compiled or gathered data may be used to create training data. In one embodiment, training data is generated for each of the foregoing defined parameters. Generation of data may include, for example, determining derived neural network inputs based on raw input data, such as sensor values. Generation of data may also include using, for example, an interpolation or other technique as described elsewhere herein and known to one of ordinary skill in the art. In one embodiment to create one training vector, a random selection for each variable, except Cq, is made from within its permitted range. An embodiment may scale the input values within a range, such as −1 to +1, and select a value randomly based on this scaled input value range for each parameter. Cq depends partially on $\sigma$. Given the value of $\sigma$, the permitted range of Cq is calculated. Then, the value of Cq is chosen randomly from within that range. This process is repeated as many times as needed to create sufficient training data. Sufficiency of training data may be determined in connection with later processing steps such as, for example, when increasing the number of data points between subsequent iterations fails to improve the neural network result, such as with respect to the RMS error rate associated with the subsequent iteration. As described elsewhere herein, different adjustments may be made when the neural networks do not produce satisfactory results. These adjustments may include, for example, increasing the amount of training data, changing the type of training data, altering the architecture of the neural network, and the like.

In connection with generation of training data of step 704 based on a smaller amount of gathered data using the foregoing defined neural net inputs, any one or more different data generation techniques may be used. For example, an embodiment may use the interpolation technique described elsewhere herein. An embodiment may also use other multivariable interpolation techniques, such as, for example, Matlab's routines for Delaunay tessellation, and then using nearest neighbor interpolation. In one embodiment, the basis for the interpolation is the original scaled data in which the original input data is scaled or normalized to a value in the range from −1 to +1, inclusively. It should be noted that such techniques for data generation are well-known. For example, Delaunay tessellation as described in Aurenhammer, F., "*Voronoi diagrams—A survey of a fundamental geometric data structure,*" ACM Computing Surveys, 1991, 23:345-405.

In one embodiment, the neural net architecture for each neural net trained at step 708 is illustrated in FIG. 12 with a single hidden layer of 35 neurons. In arriving at the choice of neural network in an embodiment, several different variations may be tested. For example, the inventors used several different feedforward neural nets with the single hidden layer and other particulars described elsewhere herein varying the number of neurons in the hidden layer. Based on experience, the inventors started with 20 neurons and tried varying the number of neurons in increments of 5. It was found that a neural net with 35 neurons converged for the fast forward flight regime with the least amount of error. An embodiment may use any one of a variety of different tools in connection with training neural networks. For example, creation and training of neural nets may be performed using Matlab's Neural Networks Toolbox. The neural network giving the least RMS testing error may be selected. In one embodiment, the RMS testing error is that obtained on the entire set of training data generated at step 704.

In connection with the actual training of the neural nets at step 708, a percentage of the original data from step 702, such as 10% of the data, may be reserved and used in connection with verification at step 710. The remaining 90% may be used to generate training data used to train the nets in step 708. In one embodiment, the verification in step 710 may be performed by cross-validation of the neural net results. In one embodiment, the original input data obtained at step 702 may be split randomly into ten partitions, divided as evenly as possible. For each of the ten partitions, 10% of the original input data may be reserved for use in the verification step 710. The remaining 90% of the data of each partition may be used to create the training data in step 704 for training the five nets for the fast forward steady state flight regime as described above in step 708.

It should be noted that an embodiment may use more than 10 partitions and different techniques in connection with selection of a neural net for each regime. The particular number of partitions may vary in accordance with the amount of data available.

In connection with the outputs of the neural nets, the values in one embodiment are scaled outputs between −1 and 1, inclusively. In this embodiment, a neural net is said to converge with a threshold value of 0.001, i.e., if the weight updates reach an equilibrium such that the difference between two successive weight values for two successive iterations is less than 0.001. Other embodiments may use other criteria in connection with determining convergence.

It should be noted that in connection with the processing steps of flowchart 700 of FIG. 13, there are many possible sources of error, including, but not limited to one or more of the following:
  1. inherent errors in the use of neural nets,
  2. interpolation error in the creation of training data from the original input data,
  3. the possibility of a greater number or a better choice of parameters,
  4. uncertainty in the parameters themselves,
  5. extrapolation, if used in an embodiment The foregoing are some factors that may be taken into consideration, for example, when step 712 of FIG. 13 evaluates to NO for a current configuration of neural nets and data used in training and/or verification. The foregoing factors represent a set of possible conditions to be examined in order to determine possible adjustments, data modifications, and the like, in one or more iterations of the steps of flowchart 700.

As generally known, extrapolation is a technique in which a known set of relationships of input(s) and output(s) for a neural net may be used to determine relationships for values outside of the known set. For example, values for a first regime may be used to determine similar relationships for values outside the first regime. There may be error introduced using data in this manner to train a net for a second regime, for example, given a set of data for a second different regime. Extrapolation may be used in making a determination as to how "fragile" the neural net results are to changes in the inputs. It may be desirable to be able to estimate weight a bit away from nominal input values for a given regime. With use of extrapolated data, loss of accuracy is expected, but the portion of parameter space for which no estimate is available would be reduced. In one embodiment using extrapolation, all the inputs of the compiled actual data at step 702 may be scaled to lie between −1 and +1. The data set may then be split into basis and testing sets. The basis set may be used to create training data, which was then used to train the best net for this situation. With reference to FIG. 13, the basis data is used to create the training data at step 704. The basis data in one embodiment is the raw data values used to produce derived parameters, the training data of step 704. The net was then tested on: a. the data it was trained with from step 704, b. all of the input data, from step 702, and c. the testing set alone, as part of verification processing of step 710. The basis set included those data points in the set from step 702 where all of the inputs are between −0.9 and +0.9. The testing set was the remainder of the original data. This may be repeated with a basis set having all inputs between −0.8 and +0.8 and a testing set correspondingly defined.

Based on results determined by the inventors with the foregoing extrapolation, the inventors have determined that extrapolation may be used to make a reasonable estimate of weight outside of a defined parameter space for at least those values extrapolating slightly away from nominal range of parameters.

An embodiment may also perform cross-validation with respect to interpolated data. For example, if an embodiment has insufficient data at step 702 for proper training of the neural nets, as described elsewhere herein, interpolation techniques may be used to generate additional training data. In connection with step 710 verification processing, an embodiment may also perform cross validation with respect to the interpolated data. In one embodiment, ten-fold cross validation processing may be performed in which a reserved set of 10% of the actual data from step 702 may be used for verification. From this reserved 10%, additional verification data may be generated using one or more interpolation techniques.

In connection with determining gross weight using a set of input parameters, a sensitivity analysis may be performed to assess which parameters are most important in determining the $W_g$, the inferred gross weight. The sensitivity of $\hat{W}_g$ with respect to the $k^{th}$ parameter can be expressed as:

$$\partial(\hat{W}_g)/\partial z_k \qquad \text{WGT SENSITIVITY 1}$$

where z is the vector of input parameters. The functional form of $\hat{W}_g$ is assumed unknown. However, it can be estimated to within a few percent by the results obtained from the neural net calculation. FIG. 12 shows the standard form of the feedforward NN using sigmoid node functions to solve a multiple input single output system (MIMO). Based on this architecture, the formula for $\hat{W}_g$ obtained from the neural net calculation may be expressed as:

$$\hat{W}_g(z) = \qquad \text{WGT SENSITIVITY 2}$$

$$\gamma\left[b2out + \sum_{i=1}^{P} W2_i * \gamma\left(b1_i + \sum_{j=1}^{m} W1_{i,j} * z_j\right)\right]$$

where z is the vector of inputs, p is the number of neurons in the hidden layer, m is the number of inputs, $W1_{ij}$ is the weight of the $j^{th}$ input to the $i^{th}$ neuron in the hidden layer, $b1_i$ is the bias added to the $i^{th}$ neuron, $W2_i$ is the weight of the $i^{th}$ neuron to the output neuron, b2out is the bias added to the output neuron, and γ is the tanh function.

If a feedforward neural net with one hidden layer containing p sigmoidal neurons is assumed, the functional form is known and can be differentiated and expressed as:

$$\delta\hat{W}_g(z)/\delta z_k = \qquad \text{WGT SENSITIVITY 3}$$

$$\gamma'\left[b2out + \sum_{i=1}^{P} W2_i * \gamma\left(b1_i + \sum_{j=1}^{m} W1_{i,j} * z_j\right)\right] *$$

$$\sum_{i=1}^{P} W2_i * W1_{i,k} * \gamma'\left(b1_i + \sum_{j=1}^{m} W1_{i,j} * z_j\right)$$

where γ' is cosh^(−2) of the same argument.

Sensitivity with respect to $z_k$ can be expressed as: [δf(z)/δ$z_k$], evaluated at the desired place(s) in the parameter space, and a relative sensitivity by dividing through by the sum of the absolute values of the derivatives.

In an embodiment in which the inputs are scaled to approximately a −1 to +1 range for input to the neural net, the value for $\hat{W}_g$ output may also be a value similarly scaled. It should be noted that the foregoing expresses terms of scaled $\hat{W}_g$ to scaled inputs. It may be preferable to examine unscaled $\hat{W}_g$ to unscaled inputs using the following:

desired_sens(k)=calc_sens(k)*factor(k)/factor(6)

WGT SENSITIVITY 4 where factor(k) is the scale factor for the kth input and factor(6) is the weight scale factor.

Based on the foregoing, the inventors determined that the calculation of $W_g$ is most sensitive to Q, the engine torque(s) with the relative sensitivity to Q about 99% everywhere in the parameter space covered by the input data of test results. The remainder of the sensitivity is about equal for the other variables. The sensitivity with respect to the other parameters may vary in accordance with what portion of a parameter space is evaluated for a given parameter.

Figure 30:
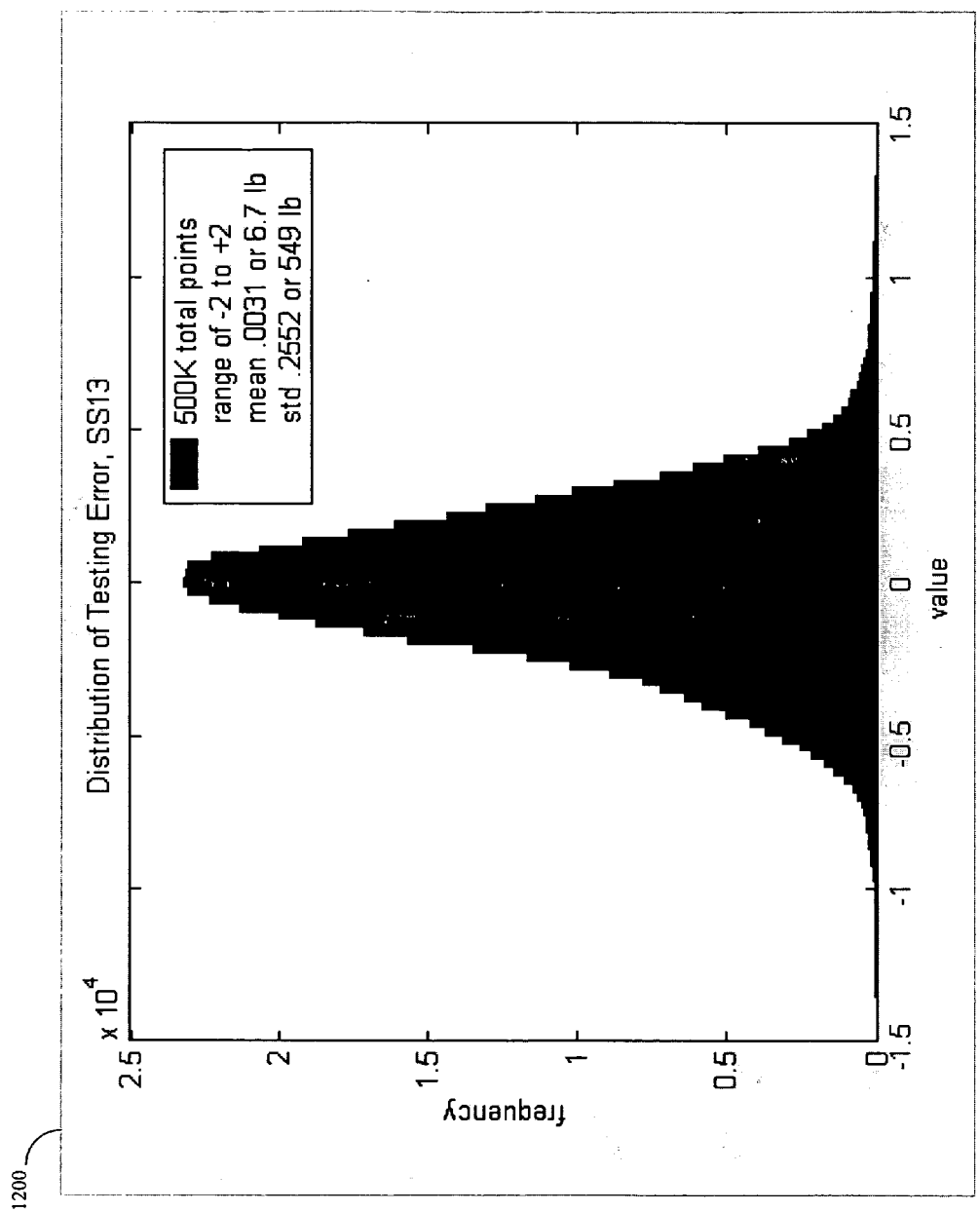
FIG. 30 is an example graphical illustration of sample results of the testing error distribution with neural nets.

The inventors evaluated results of the 5 neural nets for the forward flight regime using the parameters and other particulars as described herein. Based on this, the results of the neural nets produced a distribution of testing error as shown in the histogram 1200 of FIG. 30. It should first be noted that the results of all the nets trained for a given regime are quite close to each other. For example, in the test run where the best net gave a RMS testing error of 548.8 lbs., the worst gave a RMS testing error of 549.6 lbs.

Referring to the histogram 1200, the distribution of testing error may be characterized as Gaussian. In this particular example, there is a mean of −6.7 lbs. and a standard deviation of 549 lbs.

It may also be desirable to estimate the error in inferred gross weight due to error in the inputs. The relative error in $W_g$ may be expressed as:

$$(\Delta \hat{W}_g/\hat{W}_g)^2 = \Sigma[(\partial \hat{W}_g/\partial z_k)(\Delta z_k/z_k)]^2$$

where $z_k$ is the $k^{th}$ input, the sum is taken over all the inputs, and the partials are the same as those derived in the sensitivity section.

In connection with results and data used by the inventors such that values for weights and biases from the best NN approximation to $W_g$ for the forward flight regime are used with a 1% uncertainty in each of the input parameters, a value for $(\Delta \hat{W}_g/\hat{W}_g)$ of about 1.5%, or about 300 lbs. on a 20,000 lbs. machine, is obtained. It should be noted that this evaluation may be dependent on where a point is in the parameter space.

An embodiment may combine the foregoing relative error value, associated with error introduced by the neural nets, with an RMS error value associated with the use of mass interpolation to obtain an expected RMS error.

In connection with the use of neural nets, a large amount of empirical data may be required covering every regime during which the net must supply a reliable estimate. Such data may not be readily available, for example, such as in connection with new aircraft development, as well as difficulties in obtaining actual data for different flight regimes. In such cases, an embodiment may include an alternate technique to use in place of a neural net, or to augment any weight estimate value produced as a neural net output. An embodiment may use a Kalman filter in either of the foregoing configurations as well as other described herein.

Use of a Kalman filter in connection with determining a gross weight estimate for the aircraft such as a helicopter will now be described. Use of a Kalman filter can be used in a gross weight calculation by casting the system into a state/measurement formulation. Let a recursive relationship for gross weight at successive time values be represented by:

$$x_k = \emptyset_{k-1} x_{k-1} + w_{k-1} \qquad \text{KALMAN EQTN 1}$$

where the $k^{th}$ value of $x(x_k)$ is related to the $k^{th}-1$ value through the transformation matrix Ø. Also note the system is affected by process noise, w, which in general has covariance Q.

For the problem of gross weight calculation, the system states (x) may be defined as:

$$x = (W_g \; wf1 \; wf2)^T \qquad \text{KALMAN EQTN 2}$$

where $W_g$ is the gross weight and $wf_x$ is the fuel flow rate for each of engine. The superscript $^T$ denotes the transpose operation.

The transformation matrix, Ø, may be given by:

$$\varphi = \begin{pmatrix} 1 & -\Delta t & -\Delta t \\ 0 & 1 & 0 \\ 0 & 0 & 1 \end{pmatrix} \qquad \text{KALMAN EQTN 3}$$

An optimal estimate of x can be developed using a state estimation technique such as a Kalman filter. Kalman filter are well known as described, for example in Gelb, Arthur, *Applied Optimal Estimation*, MIT Press, 1974.

In this formulation, the measurement equation for the system is specified to have the form:

$$z_k = H_k x + v_k \qquad \text{KALMAN EQTN 4}$$

where z represents the system measurements:

$$z = (W_H wf1 wf2)^T \qquad \text{KALMAN EQTN 5}$$

In this formulation, standard vehicle performance information can be used to augment the measurements. For example, hover performance calculations may be used as an additional source of gross weight information. Hover gross weight ($W_H$) calculations, such as those found in vehicle flight and performance data, relate gross weight at hover to altitude (h), Outside Air Temperature (OAT), and engine torque (Q) and may be expressed as:

$$W_H = f(Q, h, OAT) \qquad \text{KALMAN EQTN 6}$$

The resulting measurement vector z with m weight related measurements may be represented as:

$$z = (W_S wf1 wf2 W_H)^T \qquad \text{KALMAN EQTN 7}$$

where:

$W_H$ is the 'pseudo-measurement' of gross weight calculated at hover conditions;

wf1 and wf2 are fuel flow measurements (or pseudo-measurements); and $W_S$ is gross weight totalized from various sources, including fuel quantity measures, equipment weights, aircraft empty weight, and the like. In an embodiment, weights such as the empty aircraft weight, crew member weights, and the like may be manually entered or read from a data store, such as non-volatile computer memory. The empty aircraft weight varies in accordance with the type of aircraft and may be obtained from an aircraft log book. Similarly, other weights, such as related to equipment on-board, may also be obtained and entered into the system.

The system has n states (x) which contains that information required to define the differential equation for gross weight (W). Since the gross weight computed as the sum of weights ($W_S$) may be in error such as, for example, due to human error or other factors also described elsewhere herein, the system states may be augmented to include a bias term, $b_w$:

$$x = (W \; wf1 wf2 bw)^T \qquad \text{KALMAN EQTN 8}$$

The corresponding transition matrix (Ø) (of size n×n) which relates the states at a future time to the current states is given by:

$$\varphi = \begin{pmatrix} 1 & -\Delta t & -\Delta t & 0 \\ 0 & 1 & 0 & 0 \\ 0 & 0 & 1 & 0 \\ 0 & 0 & 0 & 1 \end{pmatrix} \qquad \text{KALMAN EQTN 9}$$

H represents the m×n measurement transformation matrix. It relates the measurements to the states given by:

$$H = \begin{pmatrix} 1 & 0 & 0 & 1 \\ 0 & 1 & 0 & 0 \\ 0 & 0 & 1 & 0 \\ 1 & 0 & 0 & 0 \end{pmatrix}$$ KALMAN EQTN 10

The measurements are also affected by a random measurement error v, which is assumed to have covariance R, which is an m×m diagonal matrix. Q, the process noise, is an n×n diagonal matrix. Note that the elements of Q and R do not need to be constant. For example, since the 'pseudo-measurement' of $W_H$ is only accurate at hover, the element of R associated with $W_H$ may be varied as the vehicle maneuvers from hover to non-hover flight conditions. As confidence in the measurement decreases, the measurement's corresponding element in R increases. The matrix Q confidence corresponds to the confidence in the mathematical model as represented by the state equations of the Kalman filter. For the element of Q, it should be noted that as the confidence in the mathematical state equation model decreases, a corresponding element in Q increases.

An embodiment may use a function to vary the element of R associated with $W_H$:

$$^R W_H = g(a_x, a_z, \Phi, \Theta, V, h)$$ KALMAN EQTN 11 where $a_x$ and $a_z$ are body accelerations along the x and z axis respectively, $\Phi$ is roll attitude, $\Theta$ is pitch attitude, V is airspeed, and h is altitude.

The Kalman filter process may then be formulated as:

Filter Initialization $$P_0^+ = 0$$

$$\hat{x}_0^+ = x(t=0)$$

$$k = 1$$

where $P_0^+$ represents the initial error covariance matrix and $\hat{x}_0^+$ is the initial state vector;

use of the "^" symbol represents that the associated quantity, such as x is denoted above, is an estimate; and k is a time step.

During filter initialization, the previous values of the state vector estimate and the error covariance matrix are being set. The use "−" as a superscript denotes a value of a quantity prior to the filter update. The use of "+" as a superscript denotes a value of a quantity after a filter update. The Kalman filter generates initial values (the "−" values) and then applies corrections to them as part of the filtering process (the "+" values). The Kalman filter propagates the state one step forward at a time, calculates the Kalman gain (which combines the measurement and process noise covariance elements together), compares predicted and actual measurements, and uses the error between the predicted and measured values with the gain to modify the state estimate producing an updated state estimate.

State Estimate Extrapolation $$\hat{x}_k^- = \emptyset_{k-1} \hat{x}_{k-1}^+$$

Error Covariance Extrapolation $$P_k^- = \emptyset_{k-1} P_{k-1}^+ \emptyset_{k-1}^T + Q_{k-1}$$

Kalman Gain Matrix $$K_k = P_k^- H_k^T [H_k P_k^- H_k^T + R_k]^{-1}$$

where $K_k$ is the Kalman gain computed at a time step k.

State Estimate Update $$\hat{x}_k^+ = \hat{x}_k^- + K_k [z_k - H_k \hat{x}_k^-]$$

It should be noted that the value $\hat{x}_k^+$ is the resulting updated state matrix from KALMAN EQTN 8 above which contains the optimal estimates of vehicle gross weight, fuel flow rate, and the weight bias estimate.

Error Covariance Update $$P_k^+ = [I - K_k H_k] P_k^-$$

At the end of one iteration of processing in connection with the Kalman filter, the system states, as represented by KALMAN EQTN 8 above, are recomputed. The filter is re-run as new data is available at the next time step.

What will now be described is additional detail on the measurement noise covariance matrix R.

In the foregoing example, the 'pseudo-measurement' of $W_H$ is only accurate at hover. Its corresponding element of the measurement noise covariance matrix, R, varies as there is more or less confidence in the fact that the aircraft is in a hover state at any particular time. It is known that an exact state of hovering may not be known since the parameters used to characterize hovering behavior (e.g., airspeed, altitude, accelerations, attitude angles) are not exactly known. For example, the airspeed measurement of a hovering vehicle may be characterized as typically very inaccurate.

The element of the measurement noise covariance matrix R associated with the hover gross weight measurement may be represented by a function B.

$$^R W_H = B(a_x, a_z, \Phi, \Theta, V, h)$$

The specific form of B included in an embodiment may be determined from consideration of vehicle flight mechanics.

When a vehicle of mass m hovers, the weight vector is directly balanced by the propulsive forces. No additional dynamic forces are applied. For such cases, the longitudinal propulsive force is balanced by the component of weight in the longitudinal axis. Likewise, the vertical propulsive force is balanced by the vertical component of weight and each component, a, may be represented as:

$$a_x m = m\, G \sin(\theta)$$ EQTN R1

$$a_z m = m\, G\, (1+\cos(\theta)\sin(\emptyset))$$ EQTN R2 where G is the acceleration due to gravity. At hover, the forces balance out and EQTNS R1 and R2 above may be rewritten, respectively as EQTNS R1A and R2A:

$$a_x - G \sin(\theta) = 0$$ EQTN R1A $$a_z - G - \cos(\theta)\sin(\emptyset) = 0$$ EQTN R2A At hover, the product of EQTNS R1A and R2A:

$$|(a_x - G\sin(\theta))(a_z - G - \cos(\theta)\sin(\emptyset))| = 0$$ EQTN R3

If a condition is detected near the foregoing, there is a high probability that the aircraft is in the hovering regime. Note that the vehicle speed must be zero to ignore the dynamic forces. Since the speed measurement may be characterized as inaccurate, an embodiment may use a function for determining values of B. Based on normal vehicle operations, it may be stated that the vehicle only hovers if the altitude is between $h_{min}$ and $h_{max}$ feet, and the airspeed is less than $V_{low}$.

It should be noted that input values to the function B, such as altitude, speed, and the like, may have an amount of extraneous noise or interference causing the calculated output value of the function B to also be characterized as "noisy". Once a value for B is determined, an embodiment may use one or more smoothing techniques to take into account unwanted noise that may be introduced through the input values to the function B. Smoothing techniques, such as first order lag functions, are known to those of ordinary skill in the art and may be used to reduce the unwanted interference. Below is a definition of a blending function for $R_{WH}$ that may be used to augment initial values for $R_{WH}$.

The function, B, for determining $R_{WH}$ that may be included in an embodiment is represented as:

At time=0:

$$R_{WH}(0)=k1;$$

$$B(0)=k2;$$

$$B_s(0)=k2;$$

wherein B and $B_s$ represent the values for the hover weight measurement noise, Bs being the smoothed value generated using the first order lag filter.

```
For time = i (i > 0):
    R_WH (i) = (k3*R_WH (i−1) + k4) / (1+k3);
    if B_s(i−1) < k5 then R_WH (i) = (k3*R_WH (i−1) + k6) / (1+k3);
    B(i) = k2;
    if h > h_min & h < h_max & V < V_min /* If hover conditions exist */
        B(i) = |(a_x − G sin(θ)) (a_z − G − cos(θ) sin(φ)))|
    B_s(i) = ( k7 g_s(i−1) + k8 g(i) ) / (k7 + k8)
```

The foregoing function B may be characterized as continuous function producing a peak and valley as specific predetermined values for a given flight regime. As described elsewhere herein, the function B represents the level of confidence in the value associated with the value, the weight pseudo-measurement, in the hover regime. Although the foregoing function B is for use with the hover weight measurement $R_{WH}$, other functions may be determined for use with other regimes and other values of R varying inversely with the level of confidence in the particular value at a point in time. For example, an embodiment may include as an input to the Kalman filter the neural network estimated weight in the hover regime. In determining the neural net estimate weight's corresponding element in the R matrix, RMS error or standard deviation information may be obtained as determined from the neural network training. As the confidence in the neural network estimated weight for the hover regime decreases, its corresponding element in the R matrix should increase.

The constants k1-k8 are determined by trial and error such that the estimated and actual gross weight track correctly and have a reasonable dynamic response. Their values are all positive and non-zero. If properly defined, the value of $R_{WH}$ should increase as Bs increases and the level of confidence in the corresponding $W_H$ measurement value decreases. (e.g., as the value of the smoothed blending function increases, confidence decreases that the aircraft is in a hover condition). Likewise, $R_{WH}$ should decrease as Bs decreases.

The foregoing definition for $R_{WH}$ may be used in an embodiment in connection with a weight value in the hover regime. Other values of R may be determined and used in other regimes and/or for other values.

In connection with the Q and R matrices, Q may be characterized as process noise or model error. Q values may be determined empirically using known data from previous runs as well as on a trial and error. Q may be tuned or selected for each filter for each particular application. R may be characterized as representing the model noise used to blend out or appropriately weight corresponding measurements. The matrix R is recomputed each frame. $W_H$ may be determined for each frame based on other values related to one another as defined, for example, in a flight manual. The fuel flow inputs wf1 and wj2 may be measured directly or indirectly in an embodiment. The bias weight term, bw, in the foregoing is determined by the Kalman filter processing steps. In summary, for each new set of inputs to the Kalman filter, the following are updated: all elements of the measurement vector z, elements of the vector x (including the bias), some entries of the transition matrix involving the difference in time elements (in the event that the time steps are not constant), selection of a particular R function based on regime, updating of terms/variables of the selected R function, the Kalman gain, the updated state vector, and the filter error covariance matrix.

Using the foregoing, a recursive filter scheme can be utilized in which the initial state estimates are blended with the measurements using known physical relationships, such as fuel depletion and hover performance. In one embodiment, a discrete, linear Kalman filter may be used.

The inventors used flight data from a twin-engine helicopter to evaluate the performance of the Kalman filter for estimating vehicle gross weight. A series of runs were performed for various flight operations and for a series of simulated weight errors. In the flight data, fuel flow rate was not directly measurable. Engine performance data was used to develop a model of fuel flow rate as a function of engine torque, altitude, and outside air temperature. In addition, the helicopter airdata transducer only gave an airspeed measurement down to 30 kts. As airspeed is used to set the element of R associated with the hover gross weight measurement error, the associated calculation had to account for the rather broad range of airspeed between 0 and 30 kts.

Figure 31:
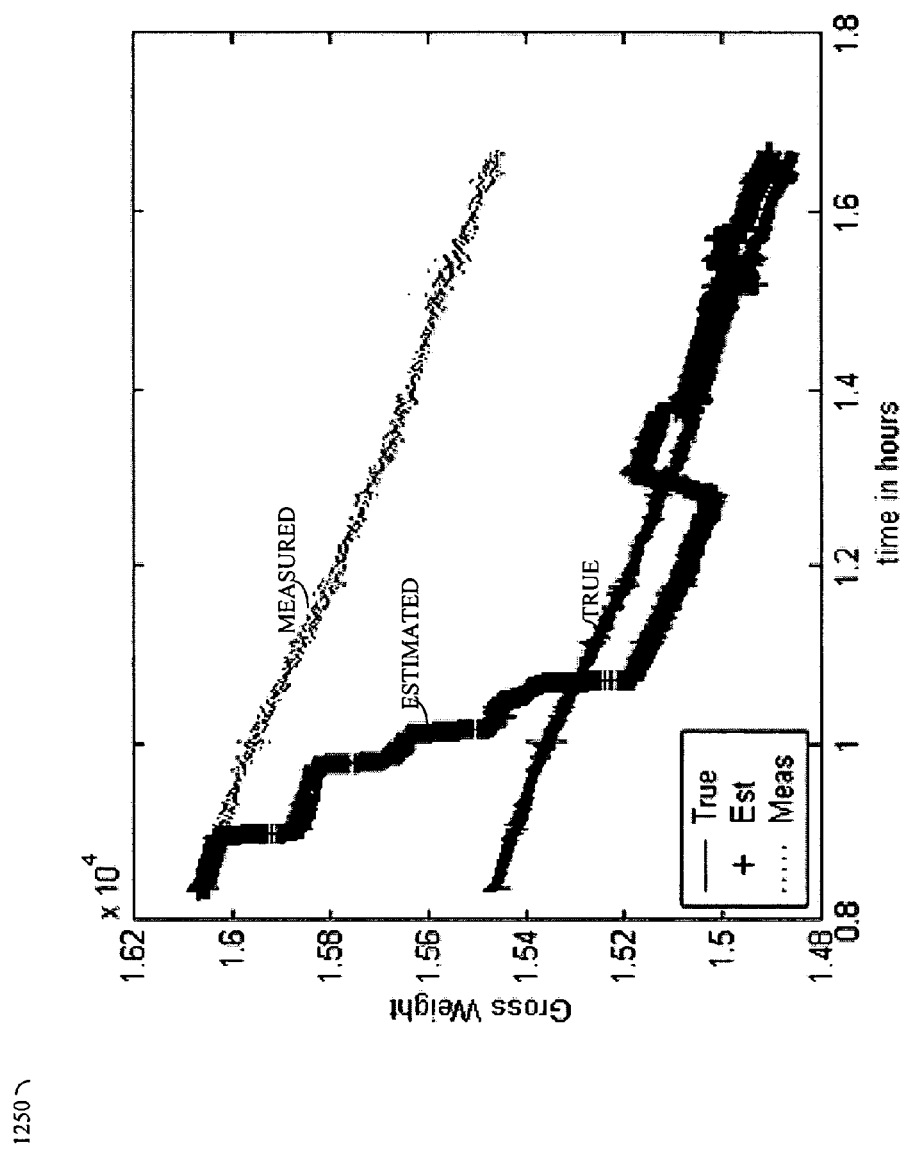
FIGS. 31-32 are example graphical illustrations of sample results of the Kalman filter performance.
Figure 32:
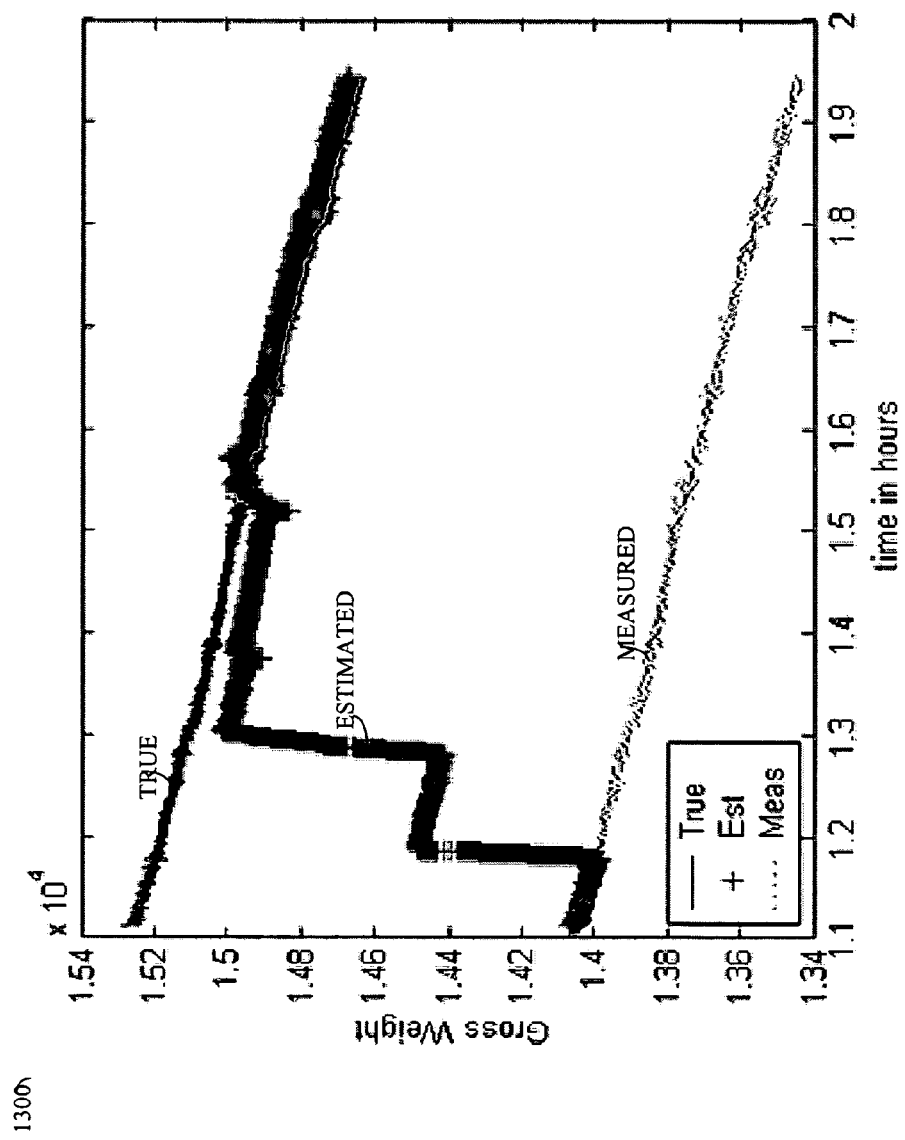

As illustrated in FIGS. 31 and 32 based on results obtained by the inventors, the Kalman filter is able to estimate the weight bias within 44 lbs. for a 600 lb. weight offset error, and 32 lbs. for a −1200 lb. weight offset error. Note that in these two illustrations of FIGS. 31 and 32, the performance of the Kalman filter is represented by the ESTIMATED curve. These results may be characterized as illustrating favorable performance of the Kalman filter in determining aircraft gross weight given the lack of fuel flow rate and low airspeed information in the particular runs performed by the inventors. Note that the filter would not provide any improvement in the foregoing gross weight estimation if there were no hover maneuvers during the flight.

An embodiment may use one aspect of the Kalman filter formulation in determination of a lower bound for the state estimates. The well-known Cramer Rao lower bound may be determined from the system Fisher Information matrix, as described, for example, in T. M. Cover and J. A. Thomas, *Elements of Information Theory*, John Wiley & Sons, Inc, 1991; L. L. Scharf, *Statistical Signal Processing*, Addison-Wesley, 1991 and B. Noble and J. W. Daniel, *Applied Linear Algebra*, Prentice-Hall, 1988. As is also well-known, the Fisher Information matrix is a measure of the information content of the measured signal relative to a particular parameter. The Cramer-Rao bound is a lower bound on the error variance of the best estimator for the given system. The Cramer Rao bounds can be determined and used to assess the quality of the gross weight estimates, such as in connection with the weight bias, $b_W$.

In an embodiment utilizing both the neural net(s) and the Kalman filter, as described in connection with FIG. 11 for example, the neural net output may be used as a 'pseudo-measurement' in the filter's measurement vector, z. The corresponding element of the measurement covariance matrix, R, may then be updated to reflect the relative accuracy of the neural net output. Additionally, use of a corresponding value in the R matrix for a particular pseudo-measurement may be used as a weighting or confidence factor to use a pseudo-measurement from one regime to be used in determining the weight for a second different regime. Use of the Kalman filter in an embodiment not only allows for the estimate to be propagated into regime space unknown by the neural net, but the use of Cramer-Rao lower bounds calculation provides a continual measure of confidence. This confidence information may be used as a qualifier, forcing the structural usage calculations to assign worst case damage when confidence falls below predetermined limits. The stochastic nature of the Kalman filter enables calculation of the Cramer-Rao lower bounds.

It should be noted that an embodiment may use the same set of aircraft sensor data in connection with the neural net formulation and the Kalman filter formulation.

The foregoing describes techniques used to determine gross weight using sensed data. A neural net may use empirical relationships existing in the data to make a gross weight determination. A recursive state filter, the Kalman filter, may also be used separately, or in combination with, the neural net(s) in making a gross weight determination. In one embodiment described herein, the Kalman filter may be used to blend the neural net gross weight determination with other inputs to make final gross weight determination.

Figure 33:
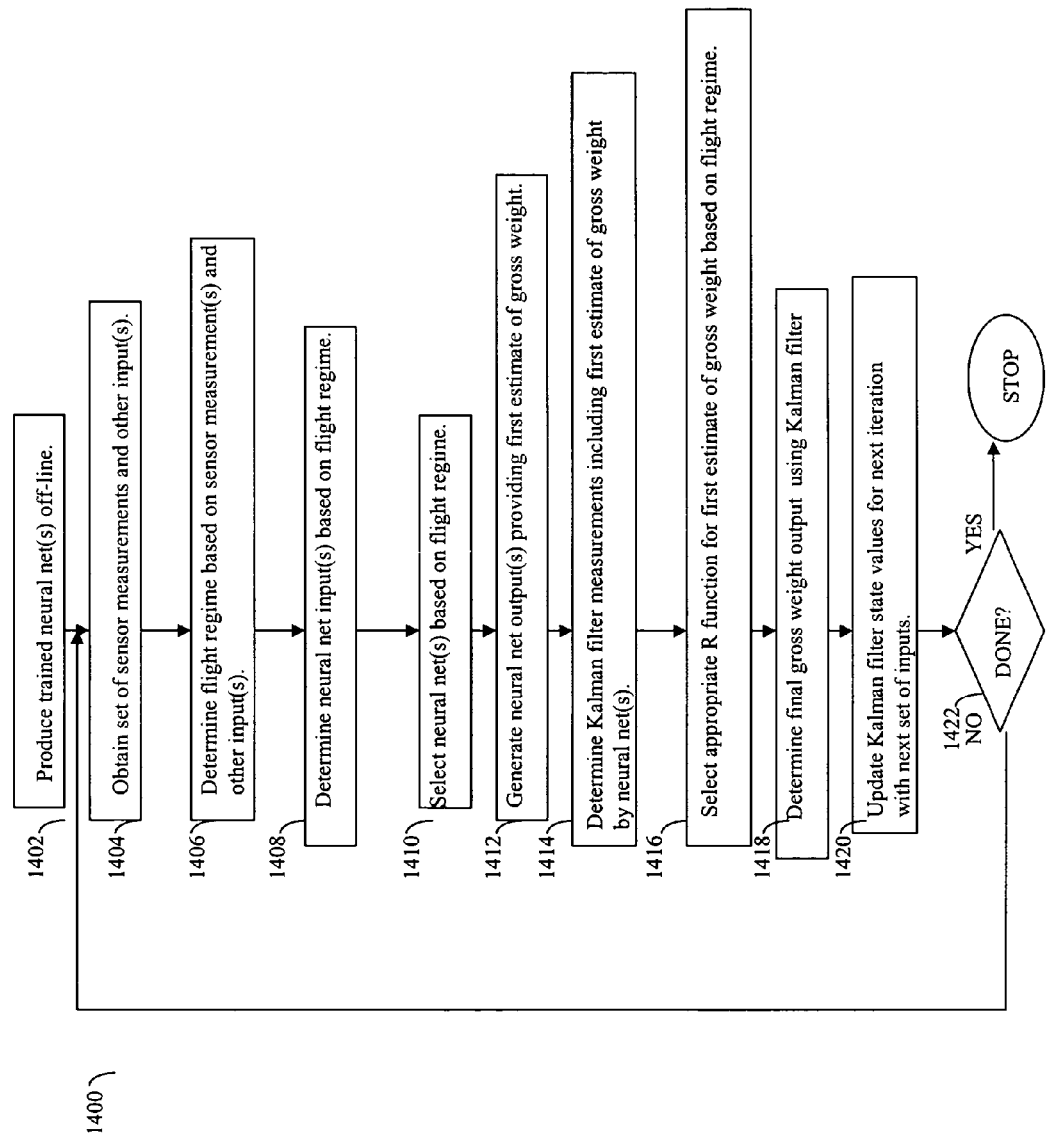
FIG. 33 is a flowchart of processing steps of one embodiment for estimating the gross weight of an aircraft using a Kalman filter.

Referring now to FIG. 33, shown is a flowchart of processing steps that may be performed in an embodiment to estimate the gross weight of an aircraft. The processing steps of flowchart 1400 summarizes the steps of one embodiment in which the Kalman filter and the neural net techniques as described herein are included. Additionally, the flowchart 1400 uses an output of the neural net, a first gross weight estimate, as an input to the Kalman filter in determining a final gross weight estimate, such as output 512 included in FIG. 11.

At step 1402, one or more neural nets are trained and selected for inclusion in the gross weight estimator 510. It should be noted that step 1402 may be performed offline prior to execution of the gross weight estimator, such as during online flight operation of the aircraft. The remaining steps of flowchart 1400 may be performed when the gross weight estimator is running online in determining the gross weight of the helicopter or other aircraft. At step 1404, a set of sensor measurements and other inputs are obtained. At step 1406, the flight regime is determined based on sensor measurements and the other inputs. At step 1408, one or more neural net inputs are determined based on the flight regime determined at step 1406. At step 1410, one or more neural nets are selected based on the flight regime. At step 1412, the neural net(s) generate output(s) providing a first estimate of the gross weight. At step 1414, the Kalman filter measurements are determined including the first gross weight estimate. At step 1416, the appropriate R function(s) are selected for the first gross weight, and possibly other weight estimates, based on the flight regime. At step 1418, the final gross weight estimate is determined using the Kalman filter. At step 1420, the Kalman filter state values are updated for the next iteration using the next set of inputs. At step 1422, a determination is made as to whether processing is complete. In this embodiment, the gross weight estimator may keep running as long as the unit is enabled for processing. If processing is complete, processing stops. Otherwise, control proceeds to step 1404 to obtain the next set of data.

It should be noted that the processing steps of flowchart 1400 are an example steps that may be performed in one embodiment of the gross weight estimator using both neural nets and a Kalman filter. Other embodiments may include and/or utilize just one of the foregoing components. An embodiment may also use other inputs to the Kalman filter than as described herein and other variations of the neural net, parameters, and the like than as described herein. The specific examples and illustrations should not be construed as a limitation of the techniques described herein.

It should be noted that the foregoing techniques used for gross weight estimation may be used as a cross-checking of other gross weight data or as a replacement for other gross weight data. Although the foregoing embodiments illustrate the use of techniques with neural networks and/or Kalman filters for determining aircraft weight, techniques described herein may be used in connection with determining other aircraft parameters.

While the invention has been disclosed in connection with various embodiments, modifications thereon will be readily apparent to those skilled in the art. Accordingly, the spirit and scope of the invention is set forth in the following claims.

What is claimed is:

1. A method for determining a weight of an aircraft comprising:
   determining a flight regime corresponding to a current flight state of the aircraft in accordance with one or more inputs characterizing said current flight state of the aircraft;
   selecting a neural net in accordance with said flight regime, wherein said neural net is selected from a plurality of neural nets, each of said plurality of neural nets being trained to determine said weight of said aircraft for at least one flight regime based on a relationship between said weight and one or more neural net inputs, and wherein said neural net selected is trained to determine said weight of said aircraft in said flight regime; and
   determining said weight using said neural net.

2. The method of claim 1, wherein said neural net is trained offline prior to determining said weight of said aircraft.

3. The method of claim 2, wherein said determining said weight of said aircraft is performed during operation of said aircraft.

4. The method of claim 1, wherein said neural net is a feedforward neural net.

5. The method of claim 4, wherein said neural net includes a single hidden layer.

6. The method of claim 5, wherein said neural net has a same set of interconnections between each neuron in said hidden layer and an input layer, and a same set of interconnection between said each neuron and an output layer.

7. The method of claim 6, wherein each of said neurons in said hidden layer utilizes a same sigmoidal activation function.

8. The method of claim 7, wherein said neural net includes more than 20 neurons in said hidden layer.

9. The method of claim 1, wherein said weight is used as an input to another process.

10. The method of claim 1, wherein the flight regime is one of a plurality of flight regimes that are mutually exclusive from one another.

11. The method of claim 1, wherein the flight regime is manually selected.

12. The method of claim 1, wherein the flight regime is an effective flight regime including one or more actual flight regimes using the same set of one or more neural nets.

13. The method of claim 1, wherein one or more neural net inputs are used as inputs to said neural net selected, and the one or more neural net inputs include at least one derived parameter that is determined based on mathematical and physical relationships of measured data.

14. The method of claim 13, wherein the one or more neural net inputs are a first number of derived parameters determined using a second number of raw data values, the second number being greater than said first number.

15. The method of claim 13, wherein said one or more neural net inputs include at least one of the following:
Corrected Vertical Acceleration ($cN_z$) represented as:

$$cN_z = 1 + N_z - \left(\frac{1}{\cos[\phi]}\right)$$

Where
$N_z$ is Vertical Acceleration;
$\emptyset$ is Roll Attitude, wherein cos $\emptyset$ is not equal to zero;
Torque Coefficient (Cq) represented as:

$$Cq = \frac{Q}{\rho A(\Omega R)^2} = \frac{412.0/100.0*(Eng1Q+Eng2Q)/2.0}{.0023769*\sigma*\pi R^2 *\left(2*\pi*\frac{Nr}{100}*\frac{257.887}{60}*R\right)^2}$$

Where
Q is total torque (RPM);
$\rho$ is density (lb-sec$^2$/ft$^4$);
A is the area of the main rotor disc (ft$^2$);
$\Omega$ is the rotation speed of the rotor (rad/s);
R is the radius of the main rotor disc (ft);
Nr is the main rotor speed (%);
$\sigma$ is the density ratio; and
wherein $\rho$ A($\Omega$R)$^2$ is not equal to 0;
Advance Ratio ($\mu$) is represented as:

$$\mu = \frac{V}{\Omega R} = \frac{KIAS*1.6890}{2*\pi*\frac{Nr}{100}*\frac{257.887}{60}}$$

Where
KIAS is indicated airspeed in knots; and wherein $\Omega$R is not equal to 0;

Climb rate over tip speed ($\mu_c$) is represented as:

$$\mu_c = \frac{V_c}{\Omega R} = \frac{ROC/60}{2*\pi*\frac{Nr}{100}*\frac{257.887}{60}}$$

Where
ROC is rate of climb (ft/min); and wherein $\Omega$R is not equal to 0;
Density Ratio ($\sigma$) is represented as:

$$\sigma = 0.0023769*\left(\frac{288.15}{OAT+273.15}\right)*\left(1-\left(0.0019812*\frac{Hp}{288.15}\right)\right)^{5.256}$$

Where
OAT is outside air temperature (° C.);
Hp is Barometric Altitude (ft).

16. The method of claim 15, wherein said neural net inputs include roll attitude and pitch attitude in accordance with the selected flight regime.

17. The method of claim 15, wherein one of said neural net inputs is a derived parameter based on at least one of roll attitude and pitch attitude in accordance with the selected flight regime.

18. The method of claim 1, wherein the neural net is included in a gross weight processor.

19. The method of claim 1, wherein the gross weight processor is included on the aircraft for which said weight is determined.

20. The method of claim 1, wherein the gross weight processor is included at a ground location and communicates with said aircraft.

21. The method of claim 1, wherein the one or more inputs include at least one of: a sensor measurement, manual input, data from a storage location.

22. The method of claim 1, further comprising:
determining said flight regime as a hover flight regime in accordance with the following input parameters: landing flag, takeoff flag, weight on wheels, yaw rate, rate of climb, pitch attitude, roll attitude, drift velocity, ground speed, airspeed, and control reversal flag, wherein said landing flag indicates whether said aircraft is landing, said takeoff flag indicates whether said aircraft is in takeoff mode, and said control reversal flag indicates whether said aircraft is in a reversal mode.

23. The method of claim 22, wherein said landing flag indicates no landing, said takeoff flag indicates no takeoff, said weight on wheels indicates no weight on wheels, said control reversal flag indicates that said aircraft is not in reversal mode, said yaw rate has an approximate value within the inclusive range of: $-2.5 \leq$ yaw rate 2.5 degrees/second, said pitch attitude is approximately 10 degrees, said rate of climb is approximately within the inclusive range of: $-200 \leq$ rate of climb $\leq 200$ feet/minute, said roll attitude approximates a value within the inclusive range of: $-6 \leq$ roll attitude $\leq 3$ degrees, said drift velocity approximates a value within the inclusive range of: $-7 \leq$ drift velocity $\leq 7$ knots said ground speed approximates a value within the inclusive range of: $-7 \leq$ ground speed $\leq 7$ knots, said airspeed is an approximate value less than or equal to 38 knots.

24. The method of claim 23, further comprising:
determining that said aircraft is in a hover flight regime at a first point in time; and determining that said aircraft remains in said hover flight regime at a second later point in time if said airspeed at said second later point in time does not exceed 43 knots.

25. The method of claim 1, further comprising:
determining said flight regime as a forward flight regime in accordance with the following input parameters: landing flag, takeoff flag, weight on wheels, yaw rate, rate of climb, pitch attitude, roll attitude, airspeed, control reversal flag, and sideslip, wherein said landing flag indicates whether said aircraft is landing, said takeoff flag indicates whether said aircraft is in takeoff mode, and said control reversal flag indicates whether said aircraft is in a reversal mode.

26. The method of claim 25, wherein said landing flag indicates no landing, said takeoff flag indicates no takeoff, said weight on wheels indicates no weight on wheels, said control reversal flag indicates that said aircraft is not in reversal mode, said yaw rate has an approximate value within the inclusive range of: $-5 \leq$ yaw rate $\leq 5$ degrees/second, said pitch attitude is within the inclusive range of: $-10 \leq$ pitch attitude $\leq 10$ degrees, said rate of climb is approximately within the inclusive range of: $-500 \leq$ rate of climb $\leq 500$ feet/minute, said roll attitude approximates a value within the inclusive range of: $-10 \leq$ roll attitude $\leq 10$ degrees, said side slip approximates a value within the inclusive range of: $-0.05 \leq$ side slip $\leq 0$, said airspeed is an approximate value greater than 38 knots.

27. The method of claim 26, further comprising:
determining that said aircraft is in a forward flight regime at a first point in time; and
determining that said aircraft remains in said forward flight regime at a second later point in time if said airspeed at said second later point in time is greater than 33 knots.

28. The method of claim 1, further comprising:
determining said flight regime as a turn flight regime in accordance with the following input parameters: landing flag, takeoff flag, weight on wheels, roll attitude, airspeed, and rate of climb, wherein said landing flag indicates whether said aircraft is landing and said takeoff flag indicates whether said aircraft is in takeoff mode.

29. The method of claim 28, wherein said landing flag indicates no landing, said takeoff flag indicates no takeoff, said weight on wheels indicates no weight on wheels, said rate of climb is approximately within the inclusive range of: $-500 \leq$ rate of climb $\leq 500$ feet/minute, said roll attitude approximates a value within the inclusive range of: $-10 \leq$ roll attitude $\leq 10$ degrees, said airspeed is an approximate value greater than 38 knots.

30. The method of claim 29, further comprising:
determining that said aircraft is in a turn flight regime at a first point in time; and
determining that said aircraft remains in said turn flight regime at a second later point in time unless at least one of the following is true: roll attitude is outside of the range $-7,+13$, and said airspeed is less than 36.

31. The method of claim 1, wherein said one or more inputs are scaled within a predetermined range.

32. The method of claim 1, further comprising:
determining a sensitivity of said weight with respect to a parameter used in determining said weight.

33. The method of claim 32, wherein said sensitivity of said weight with respect to said parameter is determined in accordance with a partial derivative of said weight with respect to said parameter.

34. The method of claim 33, wherein said weight is determined using a neural network and represented as:

$$\hat{W}_g(z) = \gamma \left[ b2 + \sum_{i=1}^{P} W2_i * \gamma \left( b1_i + \sum_{j=1}^{m} W1_{i,j} * z_j \right) \right]$$

where z is a vector of inputs, p is a number of neurons in the hidden layer, m is a number of inputs, $W1_{i,j}$ is a weight of the $j^{th}$ input to the $i^{th}$ neuron in the hidden layer, $b1_i$ is a bias added to the $i^{th}$ neuron, $W2_i$ is a weight of the $i^{th}$ neuron to the output neuron, b2 is a bias added to an output neuron, and $\gamma$ is the tanh function, and wherein tanh is not equal to zero.

35. The method of claim 34, wherein, said neural network is a feedforward neural net with one hidden layer containing p sigmoidal neurons, and the sensitivity is represented as:

$$\delta \hat{W}_g(z)/\delta z_k = \gamma' \left[ b2 + \sum_{i=1}^{P} W2_i * \gamma \left( b1_i + \sum_{j=1}^{m} W1_{i,j} * z_j \right) \right] *$$

$$\sum_{i=1}^{P} W2_i * W1_{i,k} * \gamma' \left( b1_i + \sum_{j=1}^{m} W1_{i,j} * z_j \right)$$

where $\gamma'$ is $\cosh^{-2}$, wherein tanh and $\cosh^{-2}$ are not equal to zero.

36. The method of claim 35, wherein said sensitivity with respect to an input vector z having said parameter that is a kth parameter, $z_k$, is determined as a partial derivative of said weight with respect to the kth parameter evaluated in accordance with the input vector.

37. A method of determining a weight of an aircraft comprising:
receiving one or more values related to the aircraft and used in determining the weight of the aircraft; and
determining said weight at a point in time using a Kalman filter wherein said one or more values are used as inputs to said Kalman filter and said Kalman filter produces the weight as an output, a state as determined by said Kalman filter corresponding to state parameters including a weight of the aircraft at said point in time and fuel flow rate at said point in time, a measurement vector for said Kalman filter including a weight of the aircraft, a fuel flow rate, and a second weight of the aircraft determined in accordance with a flight regime of the aircraft characterizing a flight state of the aircraft, a covariance matrix used by said Kalman filter including an element associated with said second weight wherein a value of said element varies in accordance with whether said aircraft is determined to be in said flight regime when said determining step is performed.

38. The method of claim 37, wherein one or more measurements are input to said Kalman filter, and the method further comprising:
selecting a function based on said flight regime; and
determining, using said function, said value of said element of said covariance matrix associated with said second weight, said function using said one or more measurements to determine whether said aircraft is currently in said flight regime and to accordingly determine said value.

39. The method of claim 38, wherein said flight regime is the hover flight regime.

40. The method of claim 39, wherein said function determines said value of said element of said covariance matrix in accordance with body accelerations of said aircraft along x and z axes, roll attitude, pitch attitude, airspeed and altitude.

41. The method of claim 39, wherein said aircraft is a rotorcraft and said hover flight regime corresponds to said rotorcraft hovering.

42. The method of claim 38, wherein said flight regime is manually determined.

43. The method of claim 38, wherein said flight regime is determined in accordance with a predetermined mapping that maps one or more values to a particular flight regime, wherein a given set of one or more inputs values uniquely maps to a flight regime.

44. The method of claim 37, wherein said second weight of the aircraft is an estimate that is a predetermined value based on vehicle flight and performance data.

45. The method of claim 37, wherein said second weight of the aircraft is an estimate based on manually entered data representing a sum gross weight of said aircraft.

46. The method of claim 37, wherein said Kalman filter produces the weight as an output used as an input to another component.

47. A system for determining a weight of an aircraft comprising:
a regime recognizer that determines a regime indicator in accordance with a portion of said one or more inputs, said regime indicator indicating a flight regime associated with a current flight state of the aircraft based on said portion of the one or more inputs; and
a gross weight estimator that determines said weight of said aircraft, said gross weight estimator including at least one of: a Kalman filter, and one or more neural nets, and using at least one of said Kalman filter and a first of said one or more neural nets in determining said weight, each of said one or more neural nets being trained to determine said weight of the aircraft for at least one flight regime based on a relationship between said weight and one or more neural net inputs, a state as determined by said Kalman filter at a point in time corresponding to state parameters including the weight of the aircraft and fuel flow rate at said point in time.

48. The system of claim 47, wherein said system further comprises:
an input processor that processes one or more inputs producing one or more processed inputs, said one or more inputs including at least one sensor measurement; and
a portion of said one or more processed inputs are neural net inputs used by said one or more neural nets, and said gross weight estimator including:
a neural net selector that selects a neural net in accordance with said regime indicator, said neural net selected being trained to determine said weight of said aircraft in said flight regime.

49. The system of claim 48, wherein said regime recognizer is included in said input processor.

50. The system of claim 47, wherein said gross weight estimator includes one or more neural nets whose output, when said one or more neural nets is selected in accordance with said flight regime indicator, is an input to said Kalman filter.

51. A method for determining an aircraft parameter comprising:
determining a flight regime corresponding to a current flight state of an aircraft in accordance with one or more inputs characterizing said current flight state of the aircraft;
selecting a neural net in accordance with said flight regime, wherein said neural net is selected from a plurality of neural nets, each of said plurality of neural nets being trained to determine said aircraft parameter when the aircraft is in at least one flight regime based on a relationship between said aircraft parameter and one or more neural net inputs, and wherein said neural net selected is trained to determine said aircraft parameter when the aircraft is in said flight regime; and
determining said aircraft parameter using said neural net.

52. The method of claim 51, wherein said neural net uses at least one derived parameter determined from a relationship between one or more raw input values.

53. A system for determining an aircraft parameter comprising:
a regime recognizer that determines a regime indicator in accordance with a portion of said one or more inputs, said regime indicator representing a flight regime of an aircraft being associated with a current flight state of the aircraft based on said portion of the one of more inputs; and
an aircraft parameter generator that determines said aircraft parameter, said aircraft parameter generator including at least one of: a Kalman filter, and one or more neural nets, and using at least one of said Kalman filter and a first of said one or more neural nets in determining said aircraft parameter, each of said one or more neural nets being trained to determine said aircraft parameter when said aircraft is in at least one flight regime based on a relationship between said aircraft parameter and one or more neural net inputs, a state as determined by said Kalman filter including said aircraft parameter at a point in time.

54. A computer readable medium comprising code stored thereon for determining a weight of an aircraft, the computer readable medium comprising code that:
determines a flight regime corresponding to a current flight state of the aircraft in accordance with one or more inputs characterizing said current flight state of the aircraft;
selects a neural net in accordance with said flight regime, wherein said neural net is selected from a plurality of neural nets, each of said plurality of neural nets being trained to determine said weight of said aircraft for at least one flight regime based on a relationship between said weight and one or more neural net inputs, and wherein said neural net selected is trained to determine said weight of said aircraft in said flight regime; and
determines said weight using said neural net.

55. The computer readable medium of claim 54, wherein said neural net is trained offline prior to determining said weight of said aircraft.

56. The computer readable medium of claim 55, wherein said code that determines said weight of said aircraft is executed during operation of said aircraft.

57. The computer readable medium of claim 54, wherein said neural net is a feedforward neural net.

58. The readable medium of claim 57, wherein said neural net includes a single hidden layer.

59. The computer readable medium of claim 58, wherein said neural net has a same set of interconnections between each neuron in said hidden layer and an input layer, and a same set of interconnection between said each neuron and an output layer.

60. The computer readable medium of claim 59, wherein each of said neurons in said hidden layer utilizes a same sigmoidal activation function.

61. The computer readable medium of claim 60, wherein said neural net includes more than 20 neurons in said hidden layer.

62. The computer readable medium of claim 54, wherein said weight is used as an input to another process.

63. The computer readable medium of claim 54, wherein the flight regime is one of a plurality of flight regimes that are mutually exclusive from one another.

64. The computer readable medium of claim 54, wherein the flight regime is manually selected.

65. The computer readable medium of claim 54, wherein the flight regime is an effective flight regime including one or more actual flight regimes using the same set of one or more neural nets.

66. The computer readable medium of claim 54, wherein one or more neural net inputs are used as inputs to said neural net selected, and the one or more neural net inputs include at least one derived parameter that is determined based on mathematical and physical relationships of measured data.

67. The computer readable medium of claim 66, wherein the one or more neural net inputs are a first number of derived parameters determined using a second number of raw data values, the second number being greater than said first number.

68. The computer readable medium of claim 66, wherein said one or more neural net inputs include at least one of the following:
Corrected Vertical Acceleration ($cN_z$) represented as:

$$cN_z = 1 + N_z - \left(\frac{1}{\cos[\phi]}\right)$$

Where
$N_z$ is Vertical Acceleration;
$\emptyset$ is Roll Attitude, wherein cos $\emptyset$ is not equal to zero;
Torque Coefficient (Cq) represented as:

$$Cq = \frac{Q}{\rho A(\Omega R)^2} = \frac{412.0/100.0 * (Eng1Q + Eng2Q/2.0)}{.0023769 * \sigma * \pi R^2 * \left(2 * \pi * \frac{Nr}{100} * \frac{257.887}{60} * R\right)^2}$$

Where
Q is total torque (RPM);
$\rho$ is density (lb-sec$^2$/ft$^4$);
A is the area of the main rotor disc (ft$^2$);
$\Omega$ is the rotation speed of the rotor (rad/s);
R is the radius of the main rotor disc (ft);
Nr is the main rotor speed (%);
$\sigma$ is the density ratio; and
wherein $\rho A(\Omega R)^2$ not equal to 0;

Advance Ratio ($\mu$) is represented as:

$$\mu = \frac{V}{\Omega R} = \frac{KIAS * 1.6890}{2 * \pi * \frac{Nr}{100} * \frac{257.887}{60}}$$

Where
KIAS is indicated airspeed in knots; and
wherein $\Omega R$ is not equal to 0;
Climb rate over tip speed ($\mu_c$) is represented as:

$$\mu_c = \frac{V_c}{\Omega R} = \frac{ROC/60}{2 * \pi * \frac{Nr}{100} * \frac{257.887}{60}}$$

Where
ROC is rate of climb (ft/min);
and wherein $\Omega R$ is not equal to 0;
Density Ratio ($\sigma$) is represented as:

$$\sigma = 0.0023769 * \left(\frac{288.15}{OAT + 273.15}\right) * \left(1 - \left(0.0019812 * \frac{Hp}{288.15}\right)\right)^{5.256}$$

Where
OAT is outside air temperature (° C.);
Hp is Barometric Altitude (ft).

69. The computer readable medium of claim 68, wherein said neural net inputs include roll attitude and pitch attitude in accordance with the selected flight regime.

70. The computer readable medium of claim 68, wherein one of said neural net inputs is a derived parameter based on at least one of roll attitude and pitch attitude in accordance with the selected flight regime.

71. The computer readable medium of claim 54, wherein the neural net is included in a gross weight processor.

72. The computer readable medium of claim 54, wherein the gross weight processor is included on the aircraft for which said weight is determined.

73. The computer readable medium of claim 54, wherein the gross weight processor is included at a ground location and communicates with said aircraft.

74. The computer readable medium of claim 54, wherein the one or more inputs include at least one of: a sensor measurement, manual input, data from a storage location.

75. The computer readable medium of claim 54, further comprising code that:
determines said flight regime as a hover flight regime in accordance with the following input parameters: landing flag, takeoff flag, weight on wheels, yaw rate, rate of climb, pitch attitude, roll attitude, drift velocity, ground speed, airspeed, and control reversal flag, wherein said landing flag indicates whether said aircraft is landing, said takeoff flag indicates whether said aircraft is in takeoff mode, and said control reversal flag indicates whether said aircraft is in a reversal mode.

76. The computer readable medium of claim 75, wherein said landing flag indicates no landing, said takeoff flag indicates no takeoff, said weight on wheels indicates no weight on wheels, said control reversal flag indicates that said aircraft is not in reversal mode, said yaw rate has an approximate value within the inclusive range of: $-2.5 \leq$ yaw rate 2.5 degrees/second, said pitch attitude is approximately 10 degrees, said rate of climb is approximately within the inclusive range of: −200≦rate of climb≦200 feet/minute, said roll attitude approximates a value within the inclusive range of: −6≦roll attitude≦3 degrees, said drift velocity approximates a value within the inclusive range of: −7≦drift velocity≦7 knots said ground speed approximates a value within the inclusive range of: −7≦ground speed≦7 knots, said airspeed is an approximate value less than or equal to 38 knots.

77. The computer readable medium of claim 76, further comprising code that:
   determines said aircraft is in a hover flight regime at a first point in time; and
   determines said aircraft remains in said hover flight regime at a second later point in time if said airspeed at said second later point in time does not exceed 43 knots.

78. The computer readable medium of claim 54, further comprising:
   code that determines said flight regime as a forward flight regime in accordance with the following input parameters: landing flag, takeoff flag, weight on wheels, yaw rate, rate of climb, pitch attitude, roll attitude, airspeed, control reversal flag, and sideslip, wherein said landing flag indicates whether said aircraft is landing, said takeoff flag indicates whether said aircraft is in takeoff mode, and said control reversal flag indicates whether said aircraft is in a reversal mode.

79. The computer readable medium of claim 78, wherein said landing flag indicates no landing, said takeoff flag indicates no takeoff, said weight on wheels indicates no weight on wheels, said control reversal flag indicates that said aircraft is not in reversal mode, said yaw rate has an approximate value within the inclusive range of: −5≦yaw rate≦5 degrees/second, said pitch attitude is within the inclusive range of: −10≦pitch attitude≦10 degrees, said rate of climb is approximately within the inclusive range of: −500≦rate of climb≦500 feet/minute, said roll attitude approximates a value within the inclusive range of:−10≦roll attitude≦10 degrees, said side slip approximates a value within the inclusive range of: −0.05≦side slip≦0, said airspeed is an approximate value greater than 38 knots.

80. The computer readable medium of claim 79, further comprising code that:
   determines said aircraft is in a forward flight regime at a first point in time; and
   determines said aircraft remains in said forward flight regime at a second later point in time if said airspeed at said second later point in time is greater than 33 knots.

81. The computer readable medium of claim 54, further comprising code that:
   determines said flight regime as a turn flight regime in accordance with the following input parameters: landing flag, takeoff flag, weight on wheels, roll attitude, airspeed, and rate of climb, wherein said landing flag indicates whether said aircraft is landing and said takeoff flag indicates whether said aircraft is in takeoff mode.

82. The computer readable medium of claim 81, wherein said landing flag indicates no landing, said takeoff flag indicates no takeoff, said weight on wheels indicates no weight on wheels, said rate of climb is approximately within the inclusive range of: −500≦rate of climb≦500 feet/minute, said roll attitude approximates a value within the inclusive range of: −10≦roll attitude≦10 degrees, said airspeed is an approximate value greater than 38 knots.

83. The computer readable medium of claim 82, further comprising code that:
   determines said aircraft is in a turn flight regime at a first point in time; and
   determines said aircraft remains in said turn flight regime at a second later point in time unless at least one of the following is true: roll attitude is outside of the range −7,+13, and said airspeed is less than 36.

84. The computer readable medium of claim 54, wherein said one or more inputs are scaled within a predetermined range.

85. The computer readable medium of claim 54, further comprising code that:
   determines a sensitivity of said weight with respect to a parameter used in determining said weight.

86. The computer readable medium of claim 85, wherein said sensitivity of said weight with respect to said parameter is determined in accordance with a partial derivative of said weight with respect to said parameter.

87. The computer readable medium of claim 86, wherein said weight is determined using a neural network and represented as:

$$\hat{W}_g(z) = \gamma \left[ b2 + \sum_{i=1}^{P} W2_i * \gamma \left( b1_i + \sum_{j=1}^{m} W1_{i,j} * z_j \right) \right]$$

where z is a vector of inputs, p is a number of neurons in the hidden layer, m is a number of inputs, $W1_{i,j}$ is a weight of the $j^{th}$ input to the $i^{th}$ neuron in the hidden layer, $b1_i$ is a bias added to the $i^{th}$ neuron, $W2_i$ is a weight of the $i^{th}$ neuron to the output neuron, b2 is a bias added to an output neuron, and γ is the tanh function and wherein tanh is not equal to zero.

88. The computer readable medium of claim 87, wherein, said neural network is a feedforward neural net with one hidden layer containing p sigmoidal neurons, and the sensitivity is represented as:

$$\delta \hat{W}_g(z) / \delta z_k = \gamma' \left[ b2 + \sum_{i=1}^{P} W2_i * \gamma \left( b1_i + \sum_{j=1}^{m} W1_{i,j} * z_j \right) \right] *$$

$$\sum_{i=1}^{P} W2_i * W1_{i,k} * \gamma' \left( b1_i + \sum_{j=1}^{m} W1_{i,j} * z_j \right)$$

where γ' is $\cosh^{-2}$, wherein tanh and $\cosh^{-2}$ are not equal to zero.

89. The computer readable medium of claim 88, wherein said sensitivity with respect to an input vector z having said parameter that is a kth parameter, $z_k$, is determined as a partial derivative of said weight with respect to the kth parameter evaluated in accordance with the input vector.

90. A computer readable medium comprising code stored thereon that determines a weight of an aircraft, the computer readable medium comprising code that:
   receives one or more values related to the aircraft and used in determining the weight of the aircraft; and
   determines said weight at a point in time using a Kalman filter wherein said one or more values are used as inputs to said Kalman filter and said Kalman filter produces the weight as an output, a state as determined by said Kalman filter corresponding to state parameters including a weight of the aircraft at said point in time and fuel flow rate at said point in time, a measurement vector for said Kalman filter including a weight of the aircraft, a fuel flow rate, and a second weight of the aircraft determined in accordance with a flight regime of the aircraft characterizing a flight state of the aircraft, a covariance matrix used by said Kalman filter including an element associated with said second weight wherein a value of said element varies in accordance with whether said aircraft is determined to be in said flight regime when said determines is performed.

91. The computer readable medium of claim 90, wherein one or more measurements are input to said Kalman filter, and the computer program product further comprising code that:
   selects a function based on said flight regime; and
   determines, using said function, said value of said element of said covariance matrix associated with said second weight, said function using one or more measurements to determine whether said aircraft is currently in said flight regime and accordingly determine said value.

92. The computer readable medium of claim 91, wherein said flight regime is the hover flight regime.

93. The computer readable medium of claim 92, wherein said function determines said value of said element of said covariance matrix in accordance with body accelerations of said aircraft along x and z axes, roll attitude, pitch attitude, airspeed and altitude.

94. The computer readable medium of claim 92, wherein said aircraft is a rotorcraft and said hover flight regime corresponds to said rotorcraft hovering.

95. The computer readable medium of claim 91, wherein said flight regime is manually determined.

96. The computer readable medium of claim 91, wherein said flight regime is determined in accordance with a predetermined mapping that maps one or more values to a particular flight regime, wherein a given set of one or more inputs values uniquely maps to a flight regime.

97. The computer readable medium of claim 90, wherein said second weight of the aircraft is an estimate that is a predetermined value based on vehicle flight and performance data.

98. The computer readable medium of claim 90, wherein said second weight of the aircraft is an estimate based on manually entered data representing a sum gross weight of said aircraft.

99. The computer readable medium of claim 90, wherein said Kalman filter produces the weight as an output used as an input to another component.

100. A computer readable medium comprising code stored thereon for determining an aircraft parameter, the computer readable medium comprising code that:
   determines a flight regime corresponding to a current flight state of an aircraft in accordance with one or more inputs characterizing said current flight state of the aircraft;
   selects a neural net in accordance with said flight regime, wherein said neural net is selected from a plurality of neural nets, each of said plurality of neural nets being trained to determine said aircraft parameter when the aircraft is in at least one flight regime based on a relationship between said aircraft parameter and one or more neural net inputs, and wherein said neural net selected is trained to determine said aircraft parameter when the aircraft is in said flight regime; and
   determines said aircraft parameter using said neural net.

101. The computer readable medium of claim 100, wherein said neural net uses at least one derived parameter determined from a relationship between one or more raw input values.

102. A method of determining a weight of an aircraft comprising:
   receiving one or more measurements characterizing a current flight state of the aircraft;
   determining a flight regime indicating the current flight state of the aircraft using at least a portion of said one or more measurements;
   selecting, in accordance with said flight regime, a neural net from a plurality of neural nets, each of said plurality of neural nets being trained to determine said weight of said aircraft for at least one flight regime based on a relationship between said weight and one or more neural net inputs, wherein said neural net selected is trained to determine said weight of said aircraft in said flight regime;
   determining said weight using said neural net; and
   using a Kalman filter to determine an updated weight of the aircraft, a state as determined by said Kalman filter corresponding to state parameters at a point in time including a weight of the aircraft and an engine fuel flow rate at said point in time, a measurement vector for said Kalman filter including said weight from said neural net.

103. The method of claim 102, wherein said aircraft is a rotorcraft.

104. The method of claim 102, wherein said Kalman filter uses a covariance matrix with an entry corresponding to said weight from said neural net, and wherein the method further comprising:
   determining a value for said entry using at least a second portion of said one or more measurements indicating a current flight state of the aircraft.

* * * * *